United States Patent
Couchot et al.

(10) Patent No.: US 11,208,583 B1
(45) Date of Patent: Dec. 28, 2021

(54) ENVIRONMENTALLY FRIENDLY REFRIGERANT COMPOSITIONS HAVING LOW FLAMMABILITY AND LOW GWP

(71) Applicant: FluoroTek, L.L.C., Clayton, NC (US)

(72) Inventors: David L. Couchot, Mason, OH (US); Sankara N. Ramanan, Raleigh, NC (US)

(73) Assignee: Fluorotek, L.L.C., Clayton, NC (US)

( * ) Notice: Subject to any disclaimer, the term of this patent is extended or adjusted under 35 U.S.C. 154(b) by 0 days.

(21) Appl. No.: 17/236,354

(22) Filed: Apr. 21, 2021

(51) Int. Cl.
*C09K 5/04* (2006.01)

(52) U.S. Cl.
CPC ........ *C09K 5/045* (2013.01); *C09K 2205/106* (2013.01); *C09K 2205/40* (2013.01)

(58) Field of Classification Search
CPC .............. C09K 5/045; C09K 2205/126; C09K 2205/106

See application file for complete search history.

(56) References Cited

U.S. PATENT DOCUMENTS

| | | | |
|---|---|---|---|
| 2006/0243945 A1* | 11/2006 | Minor .................. | A62D 1/0057 252/67 |
| 2008/0230738 A1* | 9/2008 | Minor ................ | C10M 171/008 252/67 |
| 2018/0355269 A1* | 12/2018 | Low ....................... | C09K 21/02 |
| 2018/0362441 A1* | 12/2018 | Low ................... | C10M 171/008 |

* cited by examiner

*Primary Examiner* — John R Hardee
(74) *Attorney, Agent, or Firm* — Robert Goozher

(57) ABSTRACT

A refrigerant composition includes R-125 (pentafluoroethane), R-134a (1,1,1,2-tetrafluoroethane), R-32 (difluoromethane), R-227ea (1,1,1,2,3,3,3-heptafluoropropane), R-152a (1,1-difluoroethane), $CO_2$ and 1234ze (1,3,3,3-tetrafluoropropene). In one exemplary embodiment, the refrigerant includes about 14-16 wt % R-125, about 14-16 wt % R-134a, about 25-27 wt % R-32, about 3-5 wt % R-227ea, about 2-4 wt % R-152a, about 6-8 wt % $CO_2$ and about 29-31 wt % 1234ze. In another embodiment, the refrigerant composition includes about 15 wt % R-125, about 15 wt % R-134a, about 26 wt % R-32, about 4 wt % R-227ea, about 3 wt % R-152a, about 5 wt % $CO_2$ and about 30 wt % 1234ze. Optionally, R-152a can be replaced with dimethyl ether. Formulating with reclaimed material lowers the global warming potential to about 400-750.

20 Claims, 12 Drawing Sheets

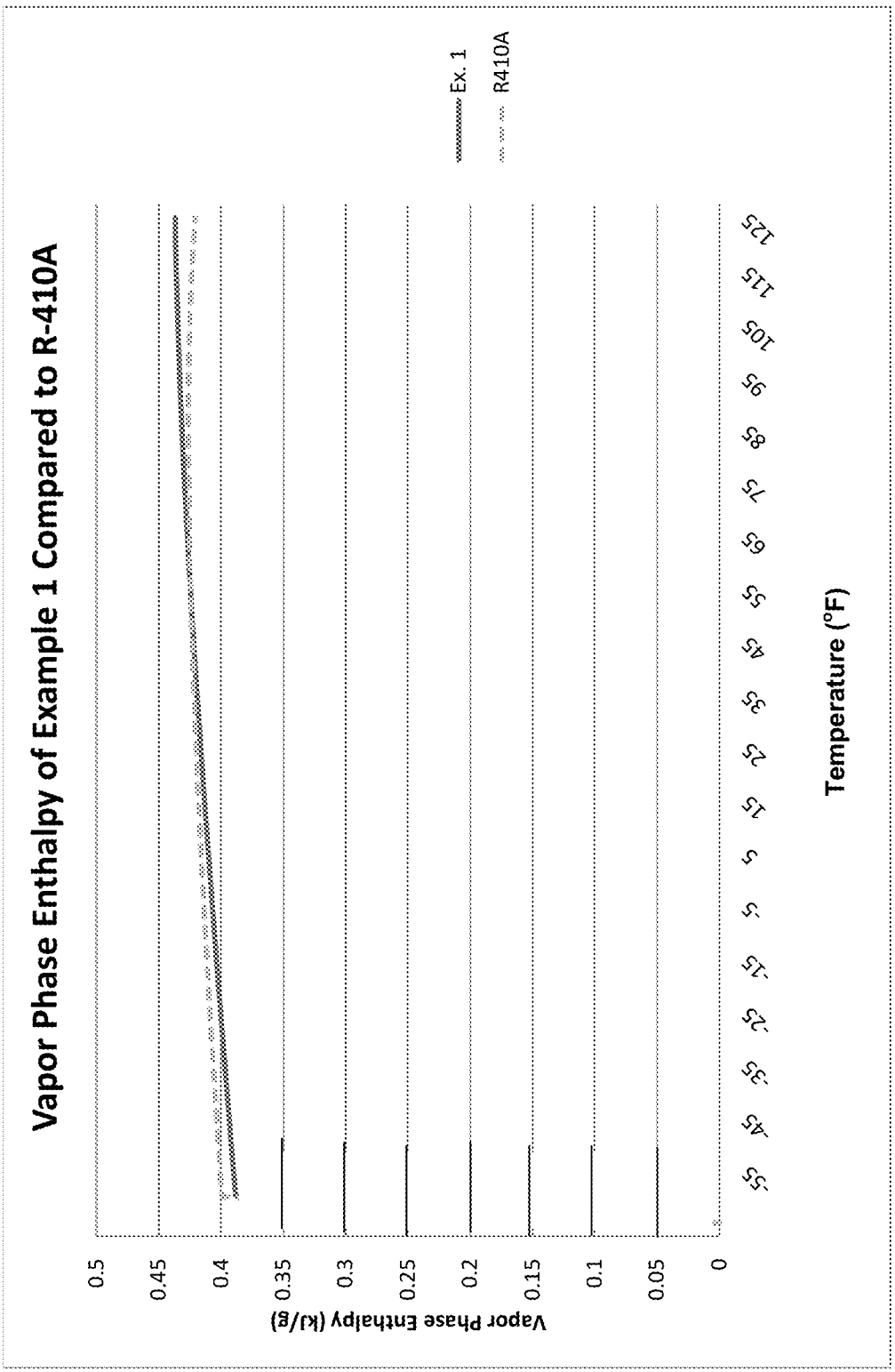

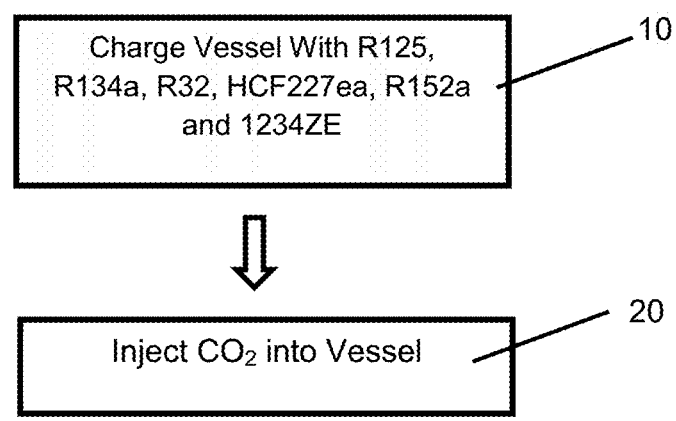
FIG. 10. MANUFACTURE OF THE REFRIGERANT OF THE DISCLOSURE

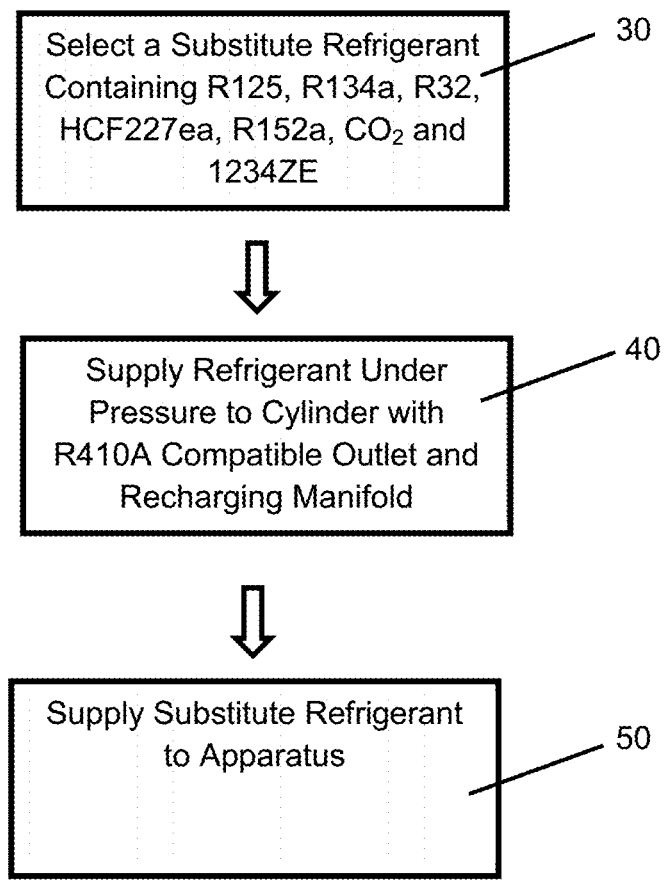
FIG. 11. METHOD OF FILLING AN APPARATUS DESIGNED FOR R410A WITH THE REFRIGERANT OF THE DISCLOSURE FIG.12. Phase Diagram of $CO_2$.
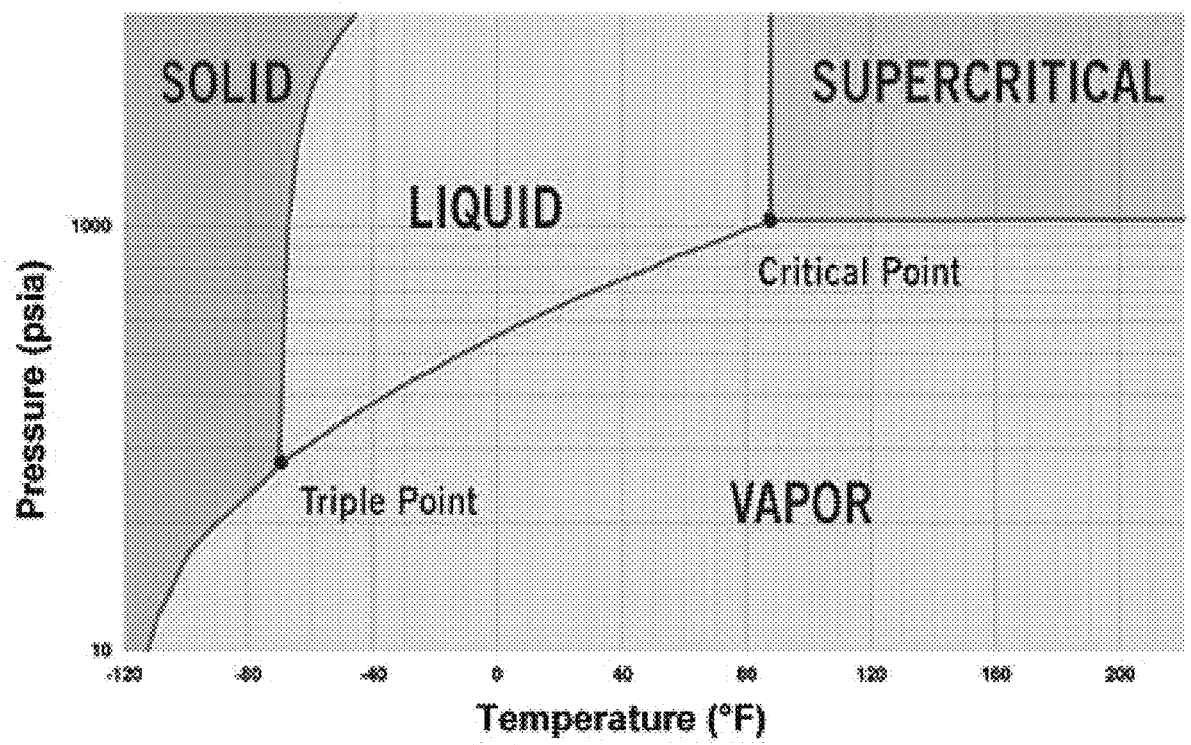

ENVIRONMENTALLY FRIENDLY REFRIGERANT COMPOSITIONS HAVING LOW FLAMMABILITY AND LOW GWP

FIELD OF DISCLOSURE

The present disclosure relates generally to environmentally friendly refrigerant compositions that include pentafluoroethane, 1,1,1,2-tetrafluoroethane, difluoromethane, 1,1,1,2,3,3,3-heptafluoropropane, 1,1-difluoroethane, $CO_2$ and 1,3,3,3-tetrafluoropropene.

BACKGROUND

Refrigeration and air conditioning equipment frequently employ refrigerants to remove heat from a conditioned space. A refrigerant is a fluid used for heat transfer in a refrigerating system, which absorbs heat at a low temperature and a low pressure of the fluid and rejects heat at a higher temperature and a higher pressure of the fluid, usually involving changes of the state of the fluid.

Since the 1930s, R-12 ($CCl_2F_2$) and R-22 ($CHCl_2F_2$) have been commonly used as refrigerants in refrigeration and air conditioning equipment. R-12 is a chlorofluorocarbon (CFC) refrigerant and R-22 is a hydrochlorofluorocarbon (HCFC) refrigerant. The release of CFC and HCFC refrigerants into the atmosphere has been found to deplete the Earth's protective ozone layer and contribute to climate change. The United States signed the Montreal Protocol on Substances that Deplete the Ozone Layer in 1987 and ultimately established proper refrigerant management procedures and a phase-out schedule that would ban the production and import of R-12 in 1996 and R-22 in 2020.

In response to the Montreal Protocol on Substances that Deplete the Ozone Layer, a non-ozone depleting refrigerant known as R-410A was developed in 1991. R-410A is a hydrofluorocarbon (HFC) refrigerant used primarily in residential and light commercial comfort cooling applications. Over the past decade, approximately 50 million pounds of R-410A was introduced into new and existing equipment each year.

HFC refrigerants released into the atmosphere have been found to contribute to global warming and climate change. In 2020, the US passed the American Innovation and Manufacturing (AIM) Act which gave the US Environmental Protection Agency (EPA) authority to establish a schedule to phasedown HFC refrigerants and a requirement to recover, reclaim, and reuse, or destroy, HFC refrigerants contained within equipment being repaired or taken out of service. Beginning in 2022, the phasedown schedule takes into account each refrigerant's Global Warming Potential (GWP) and gradually moves toward a cap on the consumption and production of HFC refrigerants equal to 15% of baseline (average annual production and consumption from 2011 to 2013) in 2036 and beyond. Starting in 2023, California Air Resources Board (CARB) has proposed regulations to reduce HFC emissions by requiring new air conditioning equipment to contain either R-410A refrigerant made up of 10% to 15% reclaimed R-410A or a refrigerant with a GWP rating of 750 or less.

As the supply of R-410A falls below demand and CARB regulations come into existence, servicing R-410A equipment will rely on R-410A substitutes, reclaimed R-410A, and declining stockpiles of R-410A refrigerant. A low-GWP substitute for R-410A will be needed to service the existing installed equipment base and provide a solution to reuse, as feedstock, HFC refrigerants recovered from R-410A equipment. The disclosed formulation solves both of these challenges.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, an embodiment of the present disclosure relates to a refrigerant composition that includes R-125 (pentafluoroethane), R-134a (1,1,1,2-tetrafluoroethane), R-32 (difluoromethane), R-227ea (1,1,1,2,3,3,3-heptafluoropropane), R-152a (1,1-difluoroethane), $CO_2$ and R-1234ze (1,3,3,3-tetrafluoropropene).

In one embodiment, the disclosure pertains to a refrigerant composition that includes about 14-16 wt % R-125, about 14-16 wt % R-134a, about 25-27 wt % R-32, about 3-5 wt % R-227ea, about 2-4 wt % R-152a, about 6-8 wt % $CO_2$ and about 29-31 wt % R-1234ze.

In one embodiment, the disclosure pertains to a refrigerant composition that includes about 15 wt % R-125, about 15 wt % R-134a, about 26 wt % R-32, about 4 wt % R-227ea, about 3 wt % R-152a, about 5 wt % $CO_2$ and about 30 wt % R-1234ze.

In another embodiment, the disclosure pertains to a refrigerant composition that includes about 14-16 wt % R-125, about 14-16 wt % R-134a, about 25-27 wt % R-32, about 3-5% HFC-227ea, about 2-4 wt % DME (dimethyl ether), about 6-8 wt % $CO_2$, and about 29-31 wt % R-1234ze.

In another embodiment, the refrigerant composition has a low GWP of about 1000 to 1100, or about 1048.

In another embodiment, the refrigerant has a pressure of about 181 psi at 70° F. In another embodiment, at least part of the R-134a is reclaimed R-134a. In another embodiment, at least part of the R-125 is reclaimed R-125. In another embodiment, at least part of the R-32 is reclaimed R-32. In another embodiment, at least part of the R-227ea is recycled R-227ea. In another embodiment, at least part of the R-32 is reclaimed R-32. In another embodiment, at least part of the R-152a is reclaimed R-152a.

In the disclosure, adding up to 30 wt % reclaimed material yields a GWP of about 400-750. When the refrigerant composition contains about 10 wt % reclaimed R-410A this yields a global warming potential of about 630, or when the refrigerant composition contains about 10 wt % reclaimed R-407C, the global warming potential is about 487.

In another embodiment, the refrigerant composition has a liquid phase pressure of about 222 psia at 70° F., a vapor phase pressure of about 139 psia at 70° F., a liquid phase density of about 1.10 g/cm³ at 70° F., a vapor phase density of about 0.037 g/cm³ at 70° F., a liquid phase enthalpy of about 0.2323 kJ/g at 70° F., a vapor phase enthalpy of about 0.4283 kJ/g at 70° F., a liquid phase entropy of about $6.177 \times 10^{-4}$ kJ/gR at 70° F. and a vapor phase entropy of about $9.988 \times 10^{-4}$ kJ/gR at 70° F.

In another embodiment, the refrigerant composition has low flammability.

In another embodiment, a method for manufacturing a refrigerant includes charging a vessel with about 14-16 wt % R-125, about 14-16 wt % R-134a, about 25-27 wt % R-32, about 3-5 wt % R-227ea, about 2-4 wt % R-152a, about 6-8 wt % $CO_2$ and about 29-31 wt % R-1234ze. The $CO_2$ may be injected into the vessel last.

In another embodiment, a method for manufacturing a refrigerant includes charging a vessel with about 15 wt % R-125, about 15 wt % R-134a, about 26 wt % R-32, about 7 wt % $CO_2$ and about 30 wt % R-1234ze.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 9 depicts the vapor enthalpy curve of Example 1 compared to R-410A

FIG. 10 is a block diagram of a method of manufacturing the refrigerant composition of the disclosure.

FIG. 11 is a block diagram of a method of filling an apparatus designed for R-410A with the refrigerant of the disclosure.

FIG. 12 is a phase diagram of $CO_2$.

DETAILED DESCRIPTION

Figure 1:
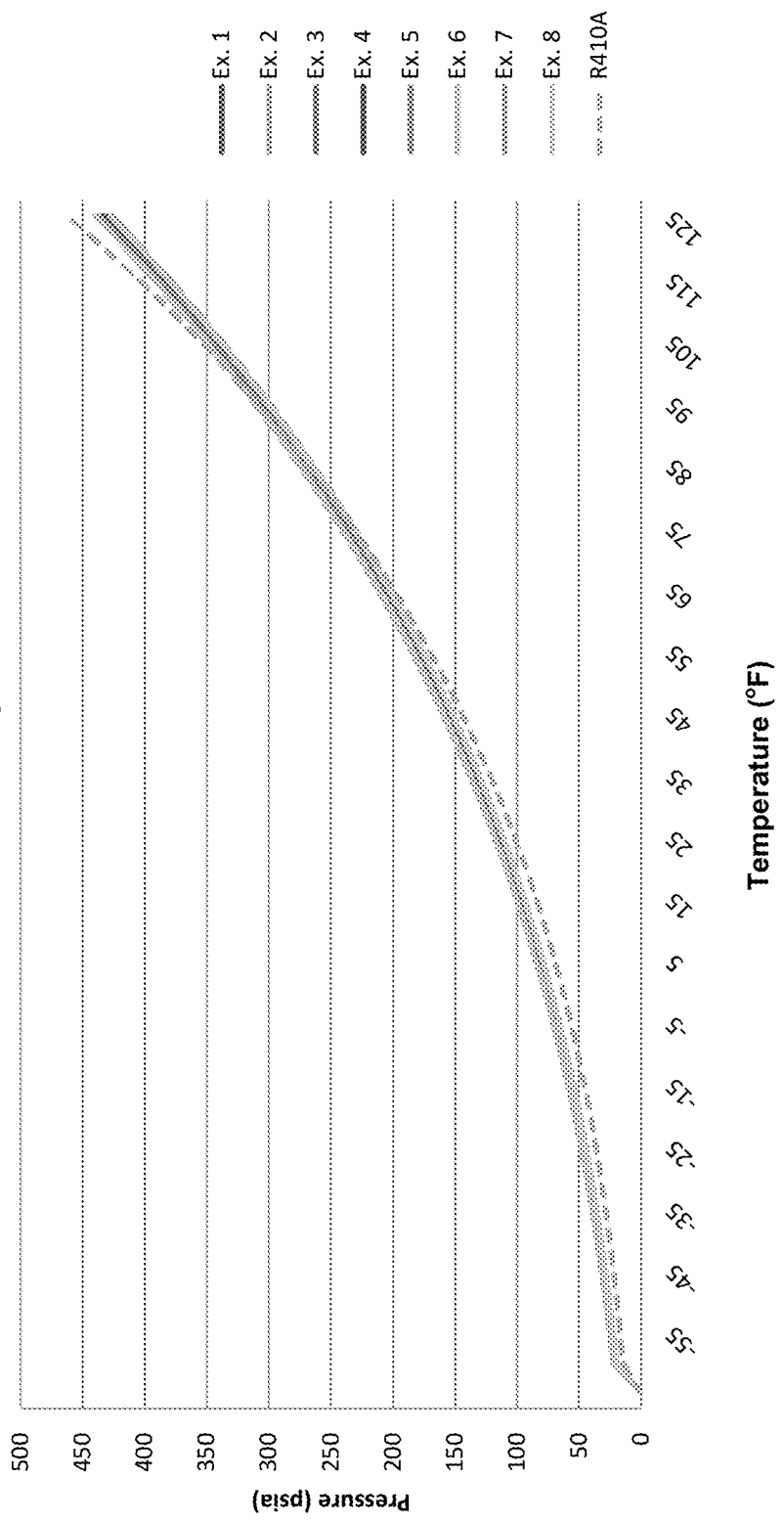
FIG. 1 depicts the liquid phase pressure-temperature curve of the refrigerant compositions of the disclosure compared to R-410A.

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

The disclosure relates to low GWP refrigerant mixtures that can replace high GWP refrigerants such as R-410A while yielding similar or superior refrigeration performance. All new home air conditioning units in North America use R-410A, also known as AZ-20, EcoFluor R-410, Forane 410A, Genetron R-410A, Puron, and Suva 410A. But this refrigerant will consequently be phased out. This is due to a continued focus on reducing compounds known to have an effect on the environment. R-410A is a zeotropic but near-azeotropic mixture of R-32 and R-125.

The disclosure includes a refrigerant composition of R-125, R-134a, R-32, R-227ea, R152, $CO_2$ and R-1234ze that performs similar to R-410A. In one embodiment, the composition includes about 14-16 wt % R-125, about 14-16 wt % R-134a, about 25-27 wt % R-32, about 3-5 wt % R-227ea, about 2-4 wt % R-152a, about 6-8 wt % $CO_2$ and about 29-31 wt % R-1234ze. In another embodiment, the refrigerant composition includes about 15 wt % R-125, about 15 wt % R-134a, about 26 wt % R-32, about 4 wt % R-227ea, about 3 wt % R-152a, about 5 wt % $CO_2$ and about 29-31 wt % R-1234ze.

The compositions of the disclosure was developed from a formulation, which is about 14-18 wt % R-134a, about 14-18 wt % R-125, about 23-27 wt % R-32, about 2-4 wt % R-152a, about 6-8 wt % $CO_2$ and about 29-31 wt % R-1234ze It was unexpectedly found that the addition of R-227ea, which acts as a fire retardant, unexpectedly reduces the flammability of the refrigerant composition while matching the properties and performance of R-410A. In an embodiment, it was found that R-152a could be replaced with DME to achieve similar refrigeration performance.

Refrigerant compositions of the disclosure are set forth in Examples 1-8. Examples 1-8 compared to the formulation for R-410A are tabulated in Table 1.

TABLE 1

Refrigerant Compositions Examples 1-8 of the Disclosure Compared to R-410A.

| Generic Name | Product | Ex. 1 | Ex. 2 | Ex. 3 | Ex. 4 |
|---|---|---|---|---|---|
| 1,1,1,2-tetrafluoroethane | R-134a | 15.00% | 15.00% | 17.00% | 15.00% |
| pentafluoroethane | R-125 | 15.00% | 15.00% | 15.00% | 17.00% |
| difluoromethane | R-32 | 26.00% | 24.00% | 24.00% | 24.00% |
| 1, 1,1,2, 3, 3,-heptafluoropropane | R-227ea | 4.00% | 4.00% | 4.00% | 4.00% |
| 1,1-difluoroethane | R-152a | 3.00% | 3.00% | 3.00% | 3.00% |
| dimethyl ether (DME) | R-E170 | 0.00% | 0.00% | 0.00% | 0.00% |

TABLE 1-continued

Refrigerant Compositions Examples 1-8 of the Disclosure Compared to R-410A.

| | | | | | |
|---|---|---|---|---|---|
| $CO_2$ | $CO_2$ | 7.00% | 7.00% | 7.00% | 7.00% |
| 1,3,3,3-tetrafluoropropene | R-1234ze(E) | 30.00% | 32.00% | 30.00% | 30.00% |
| | TOTAL | 100.00% | 100.00% | 100.00% | 100.00% |
| | Liquid Phase Pressure at 70° F. (psia) | 221.7 | 218.9 | 219.1 | 221.2 |
| | GWP | 1048 | 1034 | 1063 | 1104 |
| | Theo BP* (° F.) | −73.07 | −72.85 | −72.92 | −73.34 |

| Generic Name | Product | Ex. 5 | Ex. 6 | Ex. 7 | Ex. 8 | R-410A |
|---|---|---|---|---|---|---|
| 1,1,1,2-tetrafluoroethane | R-134a | 15.00% | 15.00% | 15.00% | 15.00% | 0.00% |
| pentafluoroethane | R-125 | 15.00% | 15.00% | 15.00% | 15.00% | 50.00% |
| difluoromethane | R-32 | 26.00% | 21.00% | 24.00% | 26.00% | 50.00% |
| 1,1,1,2,3,3,3-heptafluoropropane | R-227ea | 4.50% | 4.00% | 4.00% | 4.00% | 0.00% |
| 1,1-difluoroethane | R-152a | 2.50% | 5.00% | 5.00% | 0.00% | 0.00% |
| dimethyl ether (DME) | R-E170 | 0.00% | 0.00% | 0.00% | 3.00% | 0.00% |
| $CO_2$ | $CO_2$ | 7.00% | 7.00% | 7.00% | 7.00% | 0.00% |
| 1,3,3,3-tetrafluoropropene | R-1234ze(E) | 30.00% | 30.00% | 30.00% | 30.00% | 0.00% |
| | TOTAL | 100.00% | 100.00% | 100.00% | 100.00% | 100.00% |
| | Liquid Phase Pressure at 70° F. (psia) | 222.2 | 227.9 | 217.8 | 218.1 | 216.5 |
| | GWP | 1063 | 1017 | 1037 | 1044 | 2088 |
| | Theo BP* (° F.) | −73.17 | −77.34 | −72.67 | −72.44 | −60.60 |

*Calculated from REFPROP

The refrigerant formulations of the disclosure have a low Global Warming Potential (GWP) between 1000 and about 1100. In contrast, R-410A has a GWP of 2087.5, which is almost 2 times the GWP of the formulations of the disclosure. It is notable that in 2014, the United States, Canada and Mexico proposed an amendment to the Montreal Protocol to reduce production and consumption of HFCs by 85% during the period 2016-2035. Having a low GWP weighs the amount of HFC consumption downwards.

Thermodynamic values for the formulations of the disclosure compared to R-410A were evaluated using the REFPROP software from NIST.

The liquid and vapor phase pressures of Ex. 1 to 8 compared to R-410A at 70° F. is shown in Table 2.

TABLE 2

70° F. Liquid and Vapor Phase Pressure, Enthalpy and Entropy of R-410A Compared to Ex. 1 to 8 of the Disclosure.

| Material | Liquid Phase Pressure (psia) | Vapor Phase Pressure (psia) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|---|---|
| R-410A | 216.5 | 215.8 | 0.2334 | 0.4259 | $6.197 \times 10^{-4}$ | $9.832 \times 10^{-4}$ |
| Ex. 1 | 221.7 | 139.1 | 0.2323 | 0.4283 | $6.177 \times 10^{-4}$ | $9.988 \times 10^{-4}$ |
| Ex. 2 | 218.9 | 135.2 | 0.2321 | 0.4260 | $6.173 \times 10^{-4}$ | $9.947 \times 10^{-4}$ |
| Ex. 3 | 219.1 | 135.9 | 0.2321 | 0.4263 | $6.174 \times 10^{-4}$ | $9.951 \times 10^{-4}$ |
| Ex. 4 | 221.2 | 137.5 | 0.2321 | 0.4250 | $6.173 \times 10^{-4}$ | $9.925 \times 10^{-4}$ |
| Ex. 5 | 222.2 | 139.4 | 0.2323 | 0.4273 | $6.176 \times 10^{-4}$ | $9.970 \times 10^{-4}$ |
| Ex. 6 | 227.9 | 137.5 | 0.2329 | 0.4264 | $6.189 \times 10^{-4}$ | $9.963 \times 10^{-4}$ |
| Ex. 7 | 217.8 | 134.8 | 0.2322 | 0.4285 | $6.177 \times 10^{-4}$ | $9.994 \times 10^{-4}$ |
| Ex. 8 | 218.1 | 134.2 | 0.2310 | 0.4322 | $7.056 \times 10^{-4}$ | $10.97 \times 10^{-4}$ |

As can be seen, the correspondence of the Examples of the disclosure approximate that of R-410A for liquid phase pressure, liquid phase enthalpy, vapor phase enthalpy, liquid phase entropy and vapor phase entropy.

The theoretical vapor pressure versus temperature relationship was calculated for Examples 1-8 of the disclosure compared to R-410A. The results are in Table 3.

TABLE 3

Liquid Pressure Versus Temperature Relationship of Examples 1-8 of the Disclosure Compared to R-410A.

| Temperature (° F.) | Ex. 1 Liquid Phase Pressure (psia) | Ex. 2 Liquid Phase Pressure (psia) | Ex. 3 Liquid Phase Pressure (psia) | Ex. 4 Liquid Phase Pressure (psia) |
|---|---|---|---|---|
| −60 | 20.57 | 20.44 | 20.47 | 20.71 |
| −55 | 23.25 | 23.09 | 23.12 | 23.38 |
| −50 | 26.19 | 26.00 | 26.04 | 26.32 |
| −45 | 29.41 | 29.19 | 29.23 | 29.54 |
| −40 | 32.92 | 32.67 | 32.71 | 33.06 |
| −35 | 36.74 | 36.45 | 36.49 | 36.89 |
| −30 | 40.89 | 40.56 | 40.61 | 41.04 |
| −25 | 45.39 | 45.01 | 45.06 | 45.54 |
| −20 | 50.26 | 49.83 | 49.88 | 50.40 |
| −15 | 55.51 | 55.02 | 55.07 | 55.65 |
| −10 | 61.16 | 60.60 | 60.66 | 61.29 |
| −5 | 67.23 | 66.60 | 66.66 | 67.35 |
| 0 | 73.74 | 73.03 | 73.10 | 73.85 |
| 5 | 80.70 | 79.91 | 79.98 | 80.80 |
| 10 | 88.15 | 87.27 | 87.34 | 88.23 |
| 15 | 96.09 | 95.11 | 95.19 | 96.15 |
| 20 | 104.5 | 103.5 | 103.5 | 104.6 |
| 25 | 113.5 | 112.3 | 112.4 | 113.5 |
| 30 | 123.1 | 121.7 | 121.8 | 123.1 |
| 35 | 133.2 | 131.7 | 131.8 | 133.1 |
| 40 | 143.9 | 142.3 | 142.4 | 143.8 |
| 45 | 155.2 | 153.5 | 153.6 | 155.1 |
| 50 | 167.2 | 165.2 | 165.4 | 167.0 |
| 55 | 179.8 | 177.7 | 177.8 | 179.5 |
| 60 | 193.1 | 190.7 | 190.9 | 192.7 |
| 65 | 207.0 | 204.5 | 204.7 | 206.6 |
| 70 | 221.7 | 218.9 | 219.1 | 221.2 |
| 75 | 237.1 | 234.1 | 234.3 | 236.5 |
| 80 | 253.2 | 250.0 | 250.2 | 252.6 |
| 85 | 270.1 | 266.6 | 266.9 | 269.4 |
| 90 | 287.8 | 284.0 | 284.3 | 286.9 |
| 95 | 306.3 | 302.2 | 302.5 | 305.3 |
| 100 | 325.6 | 321.2 | 321.6 | 324.5 |
| 105 | 345.8 | 341.0 | 341.4 | 344.5 |
| 110 | 366.8 | 361.7 | 362.1 | 365.3 |
| 115 | 388.6 | 383.1 | 383.6 | 387.0 |
| 120 | 411.4 | 405.5 | 406.0 | 409.6 |
| 125 | 435.0 | 428.7 | 429.2 | 433.0 |

| Temperature (° F.) | Ex. 5 Liquid Phase Pressure (psia) | Ex. 6 Liquid Phase Pressure (psia) | Ex. 7 Liquid Phase Pressure (psia) | Ex. 8 Liquid Phase Pressure (psia) | R-410A Liquid Phase Pressure (psia) |
|---|---|---|---|---|---|
| −60 | 20.63 | 22.71 | 20.33 | 20.25 | 14.95 |
| −55 | 23.31 | 25.56 | 22.97 | 22.89 | 17.17 |
| −50 | 26.26 | 28.67 | 25.87 | 25.78 | 19.65 |
| −45 | 29.48 | 32.06 | 29.03 | 28.94 | 22.41 |
| −40 | 33.00 | 35.76 | 32.49 | 32.40 | 25.45 |
| −35 | 36.83 | 39.77 | 36.26 | 36.16 | 28.82 |
| −30 | 40.10 | 44.11 | 40.34 | 40.24 | 32.52 |
| −25 | 45.51 | 48.80 | 44.77 | 44.66 | 36.58 |
| −20 | 50.38 | 53.86 | 49.55 | 49.45 | 41.03 |
| −15 | 55.64 | 59.30 | 54.71 | 54.61 | 45.88 |
| −10 | 61.31 | 65.14 | 60.27 | 60.17 | 51.17 |
| −5 | 67.39 | 71.40 | 66.23 | 66.14 | 56.91 |
| 0 | 73.92 | 78.10 | 72.63 | 72.54 | 63.13 |
| 5 | 80.90 | 85.26 | 79.48 | 79.39 | 69.86 |
| 10 | 88.36 | 92.88 | 86.79 | 86.71 | 77.12 |
| 15 | 96.32 | 101.0 | 94.58 | 94.52 | 84.95 |
| 20 | 104.8 | 109.6 | 102.9 | 102.8 | 93.36 |
| 25 | 113.8 | 118.8 | 111.7 | 111.7 | 102.4 |
| 30 | 123.4 | 128.5 | 121.1 | 121.1 | 112.1 |
| 35 | 133.5 | 138.8 | 131.0 | 131.0 | 122.4 |
| 40 | 144.2 | 149.6 | 141.5 | 141.5 | 133.5 |
| 45 | 155.6 | 161.0 | 152.6 | 152.8 | 145.3 |
| 50 | 167.6 | 173.1 | 164.3 | 164.4 | 157.9 |
| 55 | 180.2 | 185.8 | 176.7 | 176.8 | 171.2 |
| 60 | 193.5 | 199.2 | 189.7 | 189.9 | 185.4 |
| 65 | 207.5 | 213.2 | 203.4 | 203.6 | 200.5 |
| 70 | 222.2 | 227.9 | 217.8 | 218.1 | 216.5 |
| 75 | 237.6 | 243.3 | 232.9 | 233.2 | 233.4 |
| 80 | 253.8 | 259.5 | 248.7 | 249.1 | 251.2 |
| 85 | 270.7 | 276.4 | 265.2 | 265.7 | 270.1 |
| 90 | 288.4 | 294.0 | 282.6 | 283.1 | 290.1 |
| 95 | 307.0 | 312.4 | 300.7 | 301.3 | 311.1 |
| 100 | 326.3 | 331.6 | 319.6 | 320.3 | 333.2 |
| 105 | 346.5 | 351.6 | 339.3 | 340.2 | 356.6 |
| 110 | 367.5 | 372.5 | 359.8 | 360.8 | 381.1 |
| 115 | 389.4 | 394.1 | 381.2 | 382.3 | 407.0 |
| 120 | 412.2 | 416.6 | 403.5 | 404.7 | 434.1 |
| 125 | 435.8 | 440.0 | 426.6 | 428.0 | 462.6 |

The results of Table 3 are presented graphically in FIG. 1. As can be seen, the correspondence of the liquid phase pressure to R-410A is very close over the entire range. The pressure is identical starting at about 70° F. up to about 100° F., indicating identical performance when used as a drop-in for an air conditioner.

Table 4 presents the vapor phase pressure versus temperature of R-410A compared to Examples 1 to 8 of the disclosure.

TABLE 4

Vapor Pressure Versus Temperature Relationship of Examples 1-8 of the Disclosure Compared to R-410A.

| Temperature (° F.) | Ex. 1 Vapor Phase Pressure (psia) | Ex. 2 Vapor Phase Pressure (psia) | Ex. 3 Vapor Phase Pressure (psia) | Ex. 4 Vapor Phase Pressure (psia) |
|---|---|---|---|---|
| −60 | 7.057 | 6.787 | 6.840 | 6.950 |
| −55 | 8.257 | 7.946 | 8.006 | 8.133 |
| −50 | 9.617 | 9.258 | 9.328 | 9.473 |
| −45 | 11.15 | 10.74 | 10.82 | 10.99 |
| −40 | 12.87 | 12.41 | 12.50 | 12.69 |
| −35 | 14.80 | 14.27 | 14.37 | 14.59 |
| −30 | 16.95 | 16.35 | 16.47 | 16.71 |
| −25 | 19.35 | 18.67 | 18.80 | 19.07 |
| −20 | 22.00 | 21.24 | 21.38 | 21.70 |
| −15 | 24.93 | 24.08 | 24.23 | 24.58 |
| −10 | 28.15 | 27.20 | 27.38 | 27.77 |
| −5 | 31.70 | 30.64 | 30.84 | 31.27 |
| 0 | 35.58 | 34.41 | 34.63 | 35.11 |
| 5 | 39.83 | 38.54 | 38.78 | 39.31 |
| 10 | 44.46 | 43.03 | 43.29 | 43.88 |
| 15 | 49.50 | 47.93 | 48.21 | 48.86 |
| 20 | 54.97 | 53.24 | 53.56 | 54.27 |
| 25 | 60.89 | 59.00 | 59.34 | 60.13 |
| 30 | 67.30 | 65.22 | 65.60 | 66.46 |
| 35 | 74.21 | 71.95 | 72.36 | 73.29 |
| 40 | 81.65 | 79.19 | 79.64 | 80.66 |
| 45 | 89.66 | 86.98 | 87.47 | 88.58 |
| 50 | 98.26 | 95.35 | 95.88 | 97.08 |
| 55 | 107.5 | 104.3 | 104.9 | 106.2 |
| 60 | 117.3 | 113.9 | 114.5 | 116.0 |
| 65 | 127.9 | 124.2 | 124.9 | 126.4 |
| 70 | 139.1 | 135.2 | 135.9 | 137.5 |
| 75 | 151.1 | 146.9 | 147.6 | 149.0 |
| 80 | 163.9 | 159.3 | 160.1 | 162.1 |
| 85 | 177.5 | 172.6 | 173.5 | 175.5 |
| 90 | 192.0 | 186.7 | 187.6 | 189.8 |
| 95 | 207.3 | 201.6 | 202.6 | 205.0 |
| 100 | 223.6 | 217.5 | 218.6 | 221.1 |
| 105 | 240.8 | 234.3 | 235.5 | 238.2 |
| 110 | 259.1 | 252.2 | 253.4 | 256.3 |
| 115 | 278.4 | 271.0 | 272.3 | 275.5 |
| 120 | 298.9 | 291.0 | 292.4 | 295.8 |
| 125 | 320.5 | 312.1 | 313.6 | 317.2 |

TABLE 4-continued

Vapor Pressure Versus Temperature Relationship of
Examples 1-8 of the Disclosure Compared to R-410A.

| Temperature (° F.) | Ex. 5 Vapor Phase Pressure (psia) | Ex. 6 Vapor Phase Pressure (psia) | Ex. 7 Vapor Phase Pressure (psia) | Ex. 8 Vapor Phase Pressure (psia) | R-410A Vapor Phase Pressure (psia) |
|---|---|---|---|---|---|
| -60 | 7.063 | 6.918 | 6.796 | 6.752 | 14.90 |
| -55 | 8.264 | 8.098 | 7.954 | 7.903 | 17.10 |
| -50 | 9.625 | 9.434 | 9.266 | 9.206 | 19.58 |
| -45 | 11.16 | 10.94 | 10.75 | 10.68 | 22.32 |
| -40 | 12.89 | 12.64 | 12.41 | 12.33 | 25.36 |
| -35 | 14.82 | 14.54 | 14.27 | 14.18 | 28.71 |
| -30 | 16.97 | 16.66 | 16.35 | 16.25 | 32.41 |
| -25 | 19.37 | 19.01 | 18.66 | 18.55 | 36.45 |
| -20 | 22.02 | 21.63 | 21.23 | 21.10 | 40.89 |
| -15 | 24.96 | 24.52 | 24.06 | 23.92 | 45.72 |
| -10 | 28.19 | 27.70 | 27.18 | 27.02 | 50.99 |
| -5 | 31.74 | 31.2 | 30.61 | 30.43 | 56.71 |
| 0 | 35.63 | 35.04 | 34.37 | 34.18 | 62.91 |
| 5 | 39.89 | 39.23 | 38.49 | 38.27 | 69.62 |
| 10 | 44.52 | 43.80 | 42.97 | 42.73 | 76.86 |
| 15 | 49.57 | 48.78 | 47.85 | 47.59 | 84.66 |
| 20 | 55.05 | 54.19 | 53.15 | 52.86 | 93.05 |
| 25 | 60.98 | 60.04 | 58.89 | 58.58 | 102.1 |
| 30 | 67.40 | 66.38 | 65.10 | 64.76 | 111.7 |
| 35 | 74.32 | 73.21 | 71.81 | 71.44 | 122.0 |
| 40 | 81.78 | 80.58 | 79.03 | 78.63 | 133.1 |
| 45 | 89.80 | 88.50 | 86.80 | 86.36 | 144.8 |
| 50 | 98.41 | 97.01 | 95.14 | 94.67 | 157.3 |
| 55 | 107.6 | 106.1 | 104.1 | 103.6 | 170.7 |
| 60 | 117.5 | 115.9 | 113.7 | 113.1 | 184.8 |
| 65 | 128.1 | 126.3 | 123.9 | 123.3 | 199.8 |
| 70 | 139.4 | 137.50 | 134.8 | 134.2 | 215.8 |
| 75 | 151.4 | 149.4 | 146.5 | 145.8 | 232.6 |
| 80 | 164.2 | 162.1 | 158.9 | 158.2 | 250.5 |
| 85 | 177.8 | 175.5 | 172.1 | 171.4 | 269.3 |
| 90 | 192.3 | 189.9 | 186.2 | 185.4 | 289.2 |
| 95 | 207.7 | 205.1 | 201.1 | 200.2 | 310.2 |
| 100 | 224.0 | 221.2 | 216.9 | 216.0 | 332.3 |
| 105 | 241.2 | 238.3 | 233.6 | 232.7 | 355.6 |
| 110 | 259.5 | 256.5 | 251.0 | 250.4 | 380.1 |
| 115 | 278.9 | 275.7 | 270.2 | 269.2 | 405.9 |
| 120 | 299.4 | 296.0 | 290.1 | 289.0 | 433.0 |
| 125 | 321.1 | 317.6 | 311.2 | 310.0 | 461.5 |

Figure 2:
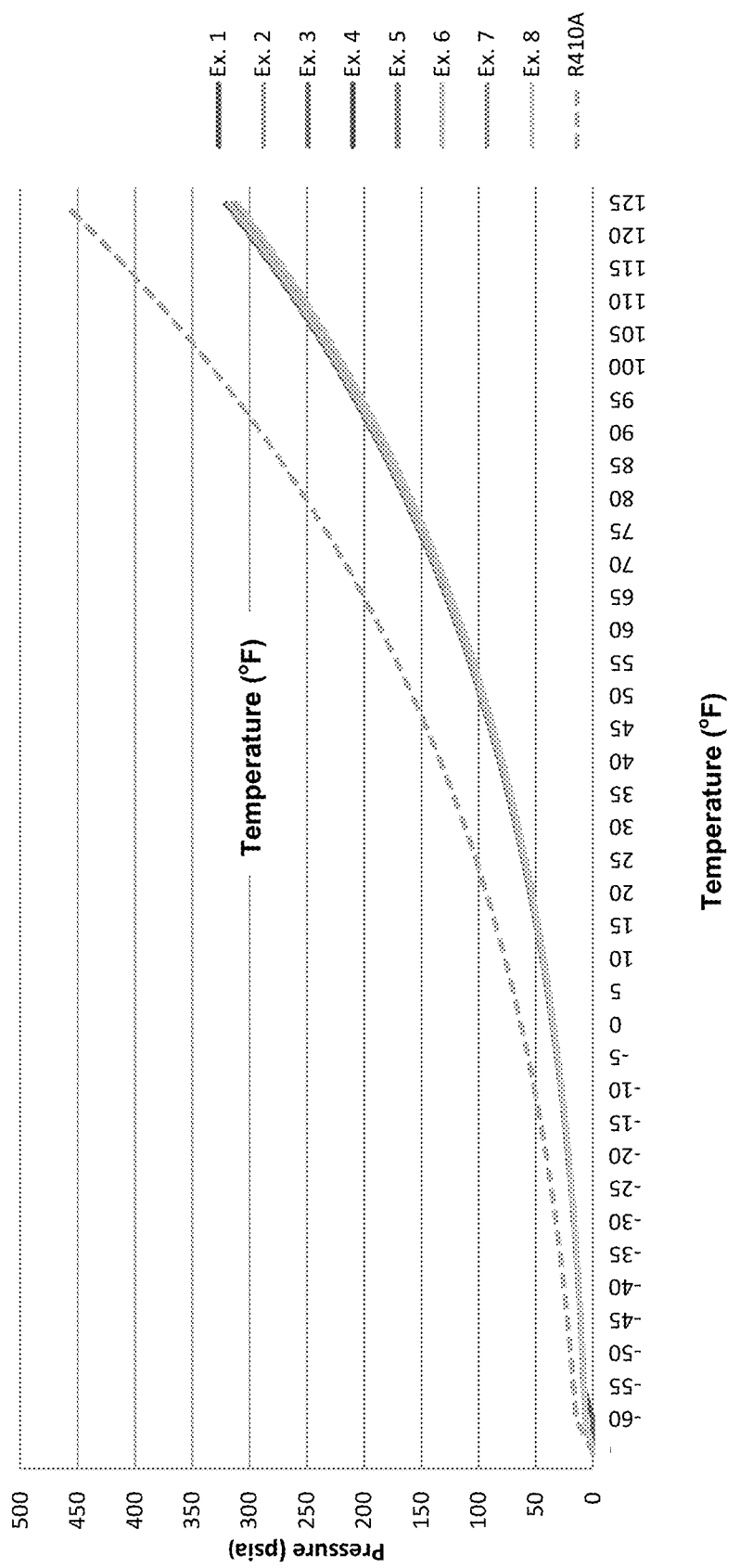
FIG. 2 depicts the vapor phase pressure-temperature curve of the refrigerant compositions of the disclosure compared to R-410A.

The results of Table 4 are presented graphically in FIG. 2. As can be seen, the correspondence of the vapor phase pressure to R-410A is very close at the lower temperature ranges.

Table 5 presents the liquid phase enthalpy versus temperature of R-410A compared to Examples 1 to 8 of the disclosure.

TABLE 5

Liquid Phase Enthalpy Versus Temperature Relationship of
Examples 1-8 of the Disclosure Compared to R-410A.

| Temperature (° F.) | Ex. 1 Liquid Phase Enthalpy (kJ/g) | Ex. 2 Liquid Phase Enthalpy (kJ/g)) | Ex. 3 Liquid Phase Enthalpy (kJ/g)) | Ex. 4 Liquid Phase Enthalpy (kJ/g) |
|---|---|---|---|---|
| -60 | 0.1277 | 0.1281 | 0.1281 | 0.1282 |
| -55 | 0.1325 | 0.1319 | 0.1318 | 0.1319 |
| -50 | 0.1353 | 0.1357 | 0.1356 | 0.1357 |
| -45 | 0.1391 | 0.1395 | 0.1394 | 0.1400 |
| -40 | 0.1429 | 0.1432 | 0.1432 | 0.1433 |
| -35 | 0.1468 | 0.1471 | 0.1471 | 0.1471 |
| -30 | 0.1506 | 0.1509 | 0.1509 | 0.1510 |
| -25 | 0.1545 | 0.1548 | 0.1547 | 0.1548 |
| -20 | 0.1584 | 0.1586 | 0.1590 | 0.1587 |
| -15 | 0.1623 | 0.1625 | 0.1625 | 0.1625 |
| -10 | 0.1662 | 0.1664 | 0.1664 | 0.1664 |
| -5 | 0.1702 | 0.1703 | 0.1703 | 0.1703 |
| 0 | 0.1741 | 0.1743 | 0.1743 | 0.1743 |
| 5 | 0.1781 | 0.1782 | 0.1782 | 0.1782 |
| 10 | 0.1821 | 0.1820 | 0.1822 | 0.1822 |
| 15 | 0.1861 | 0.1862 | 0.1862 | 0.1862 |
| 20 | 0.1902 | 0.1902 | 0.1902 | 0.1902 |
| 25 | 0.1943 | 0.1943 | 0.1943 | 0.1943 |
| 30 | 0.1984 | 0.1984 | 0.1984 | 0.1984 |
| 35 | 0.2025 | 0.2025 | 0.2025 | 0.2025 |
| 40 | 0.2066 | 0.2070 | 0.2066 | 0.2066 |
| 45 | 0.2108 | 0.2108 | 0.2108 | 0.2108 |
| 50 | 0.2151 | 0.2150 | 0.2150 | 0.2150 |
| 55 | 0.2193 | 0.2192 | 0.2192 | 0.2192 |
| 60 | 0.2236 | 0.2235 | 0.2235 | 0.2235 |
| 65 | 0.2279 | 0.2278 | 0.2278 | 0.2278 |
| 70 | 0.2323 | 0.2321 | 0.2321 | 0.2321 |
| 75 | 0.2367 | 0.2370 | 0.2365 | 0.2365 |
| 80 | 0.2412 | 0.2409 | 0.2410 | 0.2409 |
| 85 | 0.2457 | 0.2454 | 0.2454 | 0.2454 |
| 90 | 0.2503 | 0.2499 | 0.2500 | 0.2500 |
| 95 | 0.2549 | 0.2545 | 0.2546 | 0.2545 |
| 100 | 0.2596 | 0.2592 | 0.2592 | 0.2592 |
| 105 | 0.2643 | 0.2639 | 0.2639 | 0.2639 |
| 110 | 0.2692 | 0.2687 | 0.2687 | 0.2687 |
| 115 | 0.2741 | 0.2735 | 0.2736 | 0.2736 |
| 120 | 0.2790 | 0.2784 | 0.2785 | 0.2785 |
| 125 | 0.2841 | 0.2835 | 0.2835 | 0.2836 |

| Temperature (° F.) | Ex. 5 Liquid Phase Enthalpy (kJ/g) | Ex. 6 Liquid Phase Enthalpy (kJ/g) | Ex. 7 Liquid Phase Enthalpy (kJ/g) | Ex. 8 Liquid Phase Enthalpy (kJ/g) | R-410A Liquid Phase Enthalpy (kJ/g) |
|---|---|---|---|---|---|
| -60 | 0.1279 | 0.1266 | 0.1277 | 0.1251 | 0.1268 |
| -55 | 0.1316 | 0.1304 | 0.1315 | 0.1290 | 0.1306 |
| -50 | 0.1354 | 0.1343 | 0.1353 | 0.1328 | 0.1345 |
| -45 | 0.1392 | 0.1382 | 0.1391 | 0.1367 | 0.1383 |
| -40 | 0.1431 | 0.1420 | 0.1430 | 0.1406 | 0.1422 |
| -35 | 0.1469 | 0.1459 | 0.1468 | 0.1445 | 0.1460 |
| -30 | 0.1507 | 0.1498 | 0.1507 | 0.1484 | 0.1499 |
| -25 | 0.1546 | 0.1538 | 0.1545 | 0.1523 | 0.1538 |
| -20 | 0.1585 | 0.1577 | 0.1584 | 0.1562 | 0.1577 |
| -15 | 0.1624 | 0.1617 | 0.1623 | 0.1602 | 0.1617 |
| -10 | 0.1663 | 0.1657 | 0.1662 | 0.1641 | 0.1657 |
| -5 | 0.1702 | 0.1697 | 0.1708 | 0.1681 | 0.1697 |
| 0 | 0.1742 | 0.1737 | 0.1741 | 0.1721 | 0.1737 |
| 5 | 0.1781 | 0.1777 | 0.1781 | 0.1762 | 0.1777 |
| 10 | 0.1821 | 0.1818 | 0.1821 | 0.1802 | 0.1818 |
| 15 | 0.1862 | 0.1859 | 0.1861 | 0.1843 | 0.1858 |
| 20 | 0.1902 | 0.1900 | 0.1902 | 0.1884 | 0.1900 |
| 25 | 0.1943 | 0.1942 | 0.1943 | 0.1925 | 0.1941 |
| 30 | 0.1984 | 0.1983 | 0.1984 | 0.1966 | 0.1983 |
| 35 | 0.2025 | 0.2025 | 0.2025 | 0.2008 | 0.2025 |
| 40 | 0.2066 | 0.2068 | 0.2067 | 0.2050 | 0.2068 |
| 45 | 0.2108 | 0.2110 | 0.2109 | 0.2093 | 0.2111 |
| 50 | 0.2150 | 0.2153 | 0.2150 | 0.2135 | 0.2155 |
| 55 | 0.2193 | 0.2197 | 0.2193 | 0.2178 | 0.2199 |
| 60 | 0.2236 | 0.2240 | 0.2236 | 0.2222 | 0.2243 |
| 65 | 0.2279 | 0.2285 | 0.2279 | 0.2265 | 0.2288 |
| 70 | 0.2323 | 0.2329 | 0.2323 | 0.2310 | 0.2334 |
| 75 | 0.2367 | 0.2374 | 0.2367 | 0.2354 | 0.2380 |
| 80 | 0.2411 | 0.2420 | 0.2411 | 0.2399 | 0.2427 |
| 85 | 0.2456 | 0.2466 | 0.2456 | 0.2445 | 0.2475 |
| 90 | 0.2502 | 0.2513 | 0.2502 | 0.2491 | 0.2523 |
| 95 | 0.2548 | 0.2560 | 0.2548 | 0.2537 | 0.2572 |
| 100 | 0.2595 | 0.2608 | 0.2595 | 0.2584 | 0.2622 |
| 105 | 0.2642 | 0.2656 | 0.2642 | 0.2632 | 0.2674 |
| 110 | 0.2690 | 0.2705 | 0.2690 | 0.2681 | 0.2726 |
| 115 | 0.2739 | 0.2755 | 0.2739 | 0.2730 | 0.2780 |
| 120 | 0.2799 | 0.2806 | 0.2788 | 0.2780 | 0.2836 |
| 125 | 0.2840 | 0.2859 | 0.2839 | 0.2831 | 0.2893 |

Figure 3:
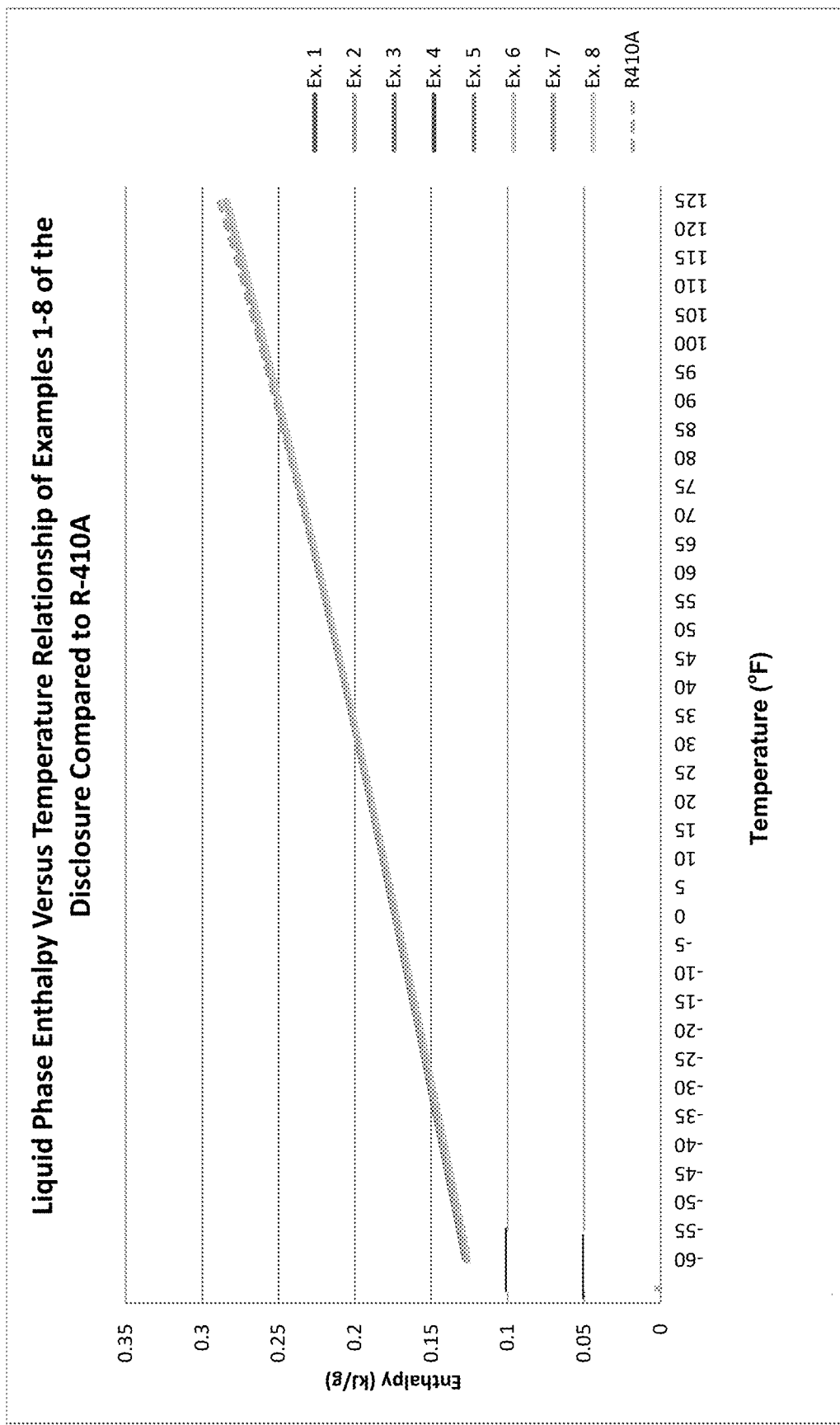
FIG. 3 depicts the liquid phase enthalpy curve of the refrigerant compositions of the disclosure compared to R-410A.

The results of Table 5 are presented graphically in FIG. 3. As can be seen, the correspondence of the liquid phase enthalpy pressure to R-410A is very close over the entire temperature range.

Table 6 presents the vapor phase enthalpy versus temperature of R-410A compared to Examples 1 to 8 of the disclosure.

TABLE 6

Vapor Phase Enthalpy Versus Temperature Relationship of Examples 1-8 of the Disclosure Compare to R-410A.

| Temperature (° F.) | Ex. 1 Vapor Phase Enthalpy (kJ/g) | Ex. 2 Vapor Phase Enthalpy (kJ/g) | Ex. 3 Vapor Phase Enthalpy (kJ/g) | Ex. 4 Vapor Phase Enthalpy (kJ/g) |
|---|---|---|---|---|
| −60 | 0.3883 | 0.3854 | 0.3859 | 0.3847 |
| −55 | 0.3901 | 0.3872 | 0.3876 | 0.3864 |
| −50 | 0.3918 | 0.3889 | 0.3894 | 0.3882 |
| −45 | 0.3936 | 0.3907 | 0.3912 | 0.3899 |
| −40 | 0.3953 | 0.3925 | 0.3933 | 0.3917 |
| −35 | 0.3970 | 0.3942 | 0.3946 | 0.3934 |
| −30 | 0.3986 | 0.3959 | 0.3964 | 0.3951 |
| −25 | 0.4004 | 0.3976 | 0.3981 | 0.3968 |
| −20 | 0.4021 | 0.3993 | 0.3998 | 0.3985 |
| −15 | 0.4038 | 0.4010 | 0.4014 | 0.4002 |
| −10 | 0.4054 | 0.4027 | 0.4031 | 0.4018 |
| −5 | 0.4071 | 0.4043 | 0.4047 | 0.4035 |
| 0 | 0.4087 | 0.4060 | 0.4064 | 0.4051 |
| 5 | 0.4103 | 0.4076 | 0.4080 | 0.4067 |
| 10 | 0.4118 | 0.4092 | 0.4095 | 0.4083 |
| 15 | 0.4134 | 0.4107 | 0.4111 | 0.4098 |
| 20 | 0.4149 | 0.4123 | 0.4126 | 0.4114 |
| 25 | 0.4164 | 0.4138 | 0.4142 | 0.4129 |
| 30 | 0.4179 | 0.4153 | 0.4156 | 0.4144 |
| 35 | 0.4193 | 0.4168 | 0.4171 | 0.4160 |
| 40 | 0.4207 | 0.4182 | 0.4185 | 0.4172 |
| 45 | 0.4221 | 0.4196 | 0.4199 | 0.4186 |
| 50 | 0.4234 | 0.4210 | 0.4213 | 0.4200 |
| 55 | 0.4247 | 0.4223 | 0.4226 | 0.4213 |
| 60 | 0.4259 | 0.4236 | 0.4239 | 0.4225 |
| 65 | 0.4271 | 0.4249 | 0.4251 | 0.4238 |
| 70 | 0.4283 | 0.4260 | 0.4263 | 0.4250 |
| 75 | 0.4294 | 0.4272 | 0.4274 | 0.4261 |
| 80 | 0.4305 | 0.4283 | 0.4285 | 0.4272 |
| 85 | 0.4315 | 0.4293 | 0.4296 | 0.4282 |
| 90 | 0.4324 | 0.4303 | 0.4306 | 0.4292 |
| 95 | 0.4333 | 0.4312 | 0.4315 | 0.4301 |
| 100 | 0.4341 | 0.4321 | 0.4323 | 0.4309 |
| 105 | 0.4348 | 0.4329 | 0.4331 | 0.4317 |
| 110 | 0.4354 | 0.4336 | 0.4338 | 0.4323 |
| 115 | 0.4360 | 0.4342 | 0.4343 | 0.4329 |
| 120 | 0.4364 | 0.4347 | 0.4348 | 0.4334 |
| 125 | 0.4367 | 0.4351 | 0.4352 | 0.4337 |

| Temperature (° F.) | Ex. 5 Vapor Phase Enthalpy (kJ/g) | Ex. 6 Vapor Phase Enthalpy (kJ/g) | Ex. 7 Vapor Phase Enthalpy (kJ/g) | Ex. 8 Vapor Phase Enthalpy (kJ/g) | R-410A Vapor Phase Enthalpy (kJ/g) |
|---|---|---|---|---|---|
| −60 | 0.3874 | 0.3845 | 0.3879 | 0.3910 | 0.3994 |
| −55 | 0.3892 | 0.3863 | 0.3897 | 0.3928 | 0.4009 |
| −50 | 0.3909 | 0.3881 | 0.3915 | 0.3946 | 0.4023 |
| −45 | 0.3927 | 0.3899 | 0.3932 | 0.3964 | 0.4037 |
| −40 | 0.3944 | 0.3917 | 0.3950 | 0.3982 | 0.4050 |
| −35 | 0.3961 | 0.3935 | 0.3967 | 0.3999 | 0.4064 |
| −30 | 0.3978 | 0.3953 | 0.3985 | 0.4017 | 0.4077 |
| −25 | 0.3995 | 0.3971 | 0.4002 | 0.4034 | 0.4090 |
| −20 | 0.4012 | 0.3988 | 0.4019 | 0.4051 | 0.4103 |
| −15 | 0.4029 | 0.4006 | 0.4036 | 0.4068 | 0.4115 |
| −10 | 0.4045 | 0.4023 | 0.4052 | 0.4085 | 0.4127 |
| −5 | 0.4061 | 0.4040 | 0.4069 | 0.4102 | 0.4139 |
| 0 | 0.4077 | 0.4057 | 0.4085 | 0.4119 | 0.4150 |
| 5 | 0.4093 | 0.4074 | 0.4101 | 0.4135 | 0.4161 |
| 10 | 0.4109 | 0.4090 | 0.4122 | 0.4151 | 0.4172 |
| 15 | 0.4124 | 0.4106 | 0.4133 | 0.4167 | 0.4182 |
| 20 | 0.4139 | 0.4122 | 0.4148 | 0.4183 | 0.4192 |
| 25 | 0.4154 | 0.4138 | 0.4163 | 0.4198 | 0.4201 |
| 30 | 0.4169 | 0.4153 | 0.4178 | 0.4213 | 0.4210 |
| 35 | 0.4183 | 0.4168 | 0.4193 | 0.4228 | 0.4218 |
| 40 | 0.4197 | 0.4184 | 0.4207 | 0.4243 | 0.4226 |
| 45 | 0.4211 | 0.4198 | 0.4221 | 0.4257 | 0.4233 |
| 50 | 0.4224 | 0.4212 | 0.4235 | 0.4271 | 0.4240 |
| 55 | 0.4237 | 0.4225 | 0.4250 | 0.4284 | 0.4246 |
| 60 | 0.4251 | 0.4239 | 0.4261 | 0.4297 | 0.4251 |
| 65 | 0.4262 | 0.4252 | 0.4273 | 0.4310 | 0.4255 |
| 70 | 0.4273 | 0.4264 | 0.4285 | 0.4322 | 0.4259 |
| 75 | 0.4285 | 0.4276 | 0.4297 | 0.4334 | 0.4261 |
| 80 | 0.4295 | 0.4287 | 0.4308 | 0.4345 | 0.4263 |
| 85 | 0.4305 | 0.4500 | 0.4318 | 0.4356 | 0.4263 |
| 90 | 0.4315 | 0.4308 | 0.4328 | 0.4366 | 0.4262 |
| 95 | 0.4323 | 0.4318 | 0.4337 | 0.4375 | 0.4260 |
| 100 | 0.4331 | 0.4326 | 0.4346 | 0.4384 | 0.4257 |
| 105 | 0.4338 | 0.4334 | 0.4354 | 0.4392 | 0.4251 |
| 110 | 0.4345 | 0.4341 | 0.4360 | 0.4399 | 0.4244 |
| 115 | 0.4350 | 0.4347 | 0.4367 | 0.4406 | 0.4235 |
| 120 | 0.4355 | 0.4352 | 0.4372 | 0.4411 | 0.4223 |
| 125 | 0.4358 | 0.4356 | 0.4375 | 0.4415 | 0.4208 |

Figure 4:
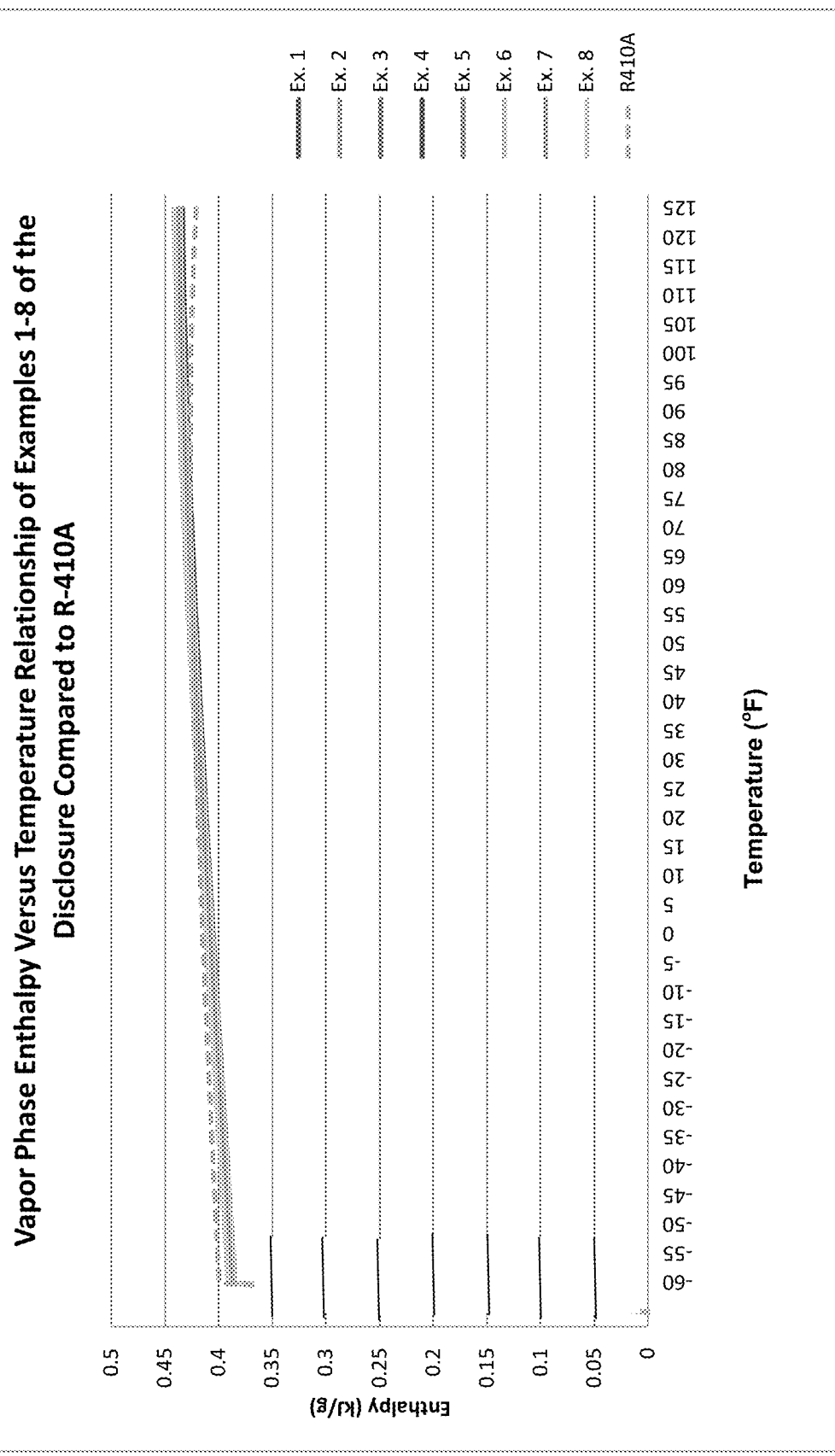
FIG. 4 depicts the vapor phase enthalpy curve of the refrigerant compositions of the disclosure compared to R-410A.

The results of Table 6 are presented graphically in FIG. 4. As can be seen, the correspondence of the liquid phase enthalpy pressure to R-410A is very close over the entire temperature range.

Table 7 presents the liquid phase entropy versus temperature of R-410A compared to Examples 1 to 8 of the disclosure.

TABLE 7

Liquid Phase Entropy Versus Temperature Relationship of Examples 1-8 of the Disclosure Compared to R-410A.

| Temperature (° F.) | Ex. 1 Liquid Phase Entropy (kJ/gR) | Ex. 2 Liquid Phase Entropy (kJ/gR) | Ex. 3 Liquid Phase Entropy (kJ/gR) | Ex. 4 Liquid Phase Entropy (kJ/gR) |
|---|---|---|---|---|
| −60 | $3.943 \times 10^{-4}$ | $3.952 \times 10^{-4}$ | $3.951 \times 10^{-4}$ | $3.953 \times 10^{-4}$ |
| −55 | $4.037 \times 10^{-4}$ | $4.045 \times 10^{-4}$ | $4.044 \times 10^{-4}$ | $4.047 \times 10^{-4}$ |
| −50 | $4.130 \times 10^{-4}$ | $4.138 \times 10^{-4}$ | $4.137 \times 10^{-4}$ | $4.139 \times 10^{-4}$ |
| −45 | $4.222 \times 10^{-4}$ | $4.229 \times 10^{-4}$ | $4.229 \times 10^{-4}$ | $4.231 \times 10^{-4}$ |
| −40 | $4.313 \times 10^{-4}$ | $4.320 \times 10^{-4}$ | $4.319 \times 10^{-4}$ | $.4321 \times 10^{-4}$ |
| −35 | $4.404 \times 10^{-4}$ | $4.410 \times 10^{-4}$ | $4.411 \times 10^{-4}$ | $4.411 \times 10^{-4}$ |
| −30 | $4.493 \times 10^{-4}$ | $4.499 \times 10^{-4}$ | $4.499 \times 10^{-4}$ | $4.500 \times 10^{-4}$ |
| −25 | $4.582 \times 10^{-4}$ | $4.588 \times 10^{-4}$ | $4.587 \times 10^{-4}$ | $4.589 \times 10^{-4}$ |
| −20 | $4.671 \times 10^{-4}$ | $4.677 \times 10^{-4}$ | $4.675 \times 10^{-4}$ | $4.676 \times 10^{-4}$ |

TABLE 7-continued

Liquid Phase Entropy Versus Temperature Relationship of
Examples 1-8 of the Disclosure Compared to R-410A.

| | | | | |
|---|---|---|---|---|
| −15 | $4.758 \times 10^{-4}$ | $4.763 \times 10^{-4}$ | $4.762 \times 10^{-4}$ | $4.763 \times 10^{-4}$ |
| −10 | $4.845 \times 10^{-4}$ | $4.849 \times 10^{-4}$ | $4.849 \times 10^{-4}$ | $4.850 \times 10^{-4}$ |
| −5 | $4.932 \times 10^{-4}$ | $4.935 \times 10^{-4}$ | $4.935 \times 10^{-4}$ | $4.936 \times 10^{-4}$ |
| 0 | $5.018 \times 10^{-4}$ | $5.021 \times 10^{-4}$ | $5.020 \times 10^{-4}$ | $5.021 \times 10^{-4}$ |
| 5 | $5.103 \times 10^{-4}$ | $5.106 \times 10^{-4}$ | $5.105 \times 10^{-4}$ | $5.105 \times 10^{-4}$ |
| 10 | $5.188 \times 10^{-4}$ | $5.190 \times 10^{-4}$ | $5.190 \times 10^{-4}$ | $5.190 \times 10^{-4}$ |
| 15 | $5.272 \times 10^{-4}$ | $5.274 \times 10^{-4}$ | $5.274 \times 10^{-4}$ | $5.274 \times 10^{-4}$ |
| 20 | $5.356 \times 10^{-4}$ | $5.357 \times 10^{-4}$ | $5.357 \times 10^{-4}$ | $5.357 \times 10^{-4}$ |
| 25 | $5.439 \times 10^{-4}$ | $5.440 \times 10^{-4}$ | $5.440 \times 10^{-4}$ | $5.440 \times 10^{-4}$ |
| 30 | $5.522 \times 10^{-4}$ | $5.523 \times 10^{-4}$ | $5.523 \times 10^{-4}$ | $5.523 \times 10^{-4}$ |
| 35 | $5.605 \times 10^{-4}$ | $5.605 \times 10^{-4}$ | $5.605 \times 10^{-4}$ | $5.605 \times 10^{-4}$ |
| 40 | $5.688 \times 10^{-4}$ | $5.687 \times 10^{-4}$ | $5.687 \times 10^{-4}$ | $5.687 \times 10^{-4}$ |
| 45 | $5.770 \times 10^{-4}$ | $5.768 \times 10^{-4}$ | $5.769 \times 10^{-4}$ | $5.768 \times 10^{-4}$ |
| 50 | $5.852 \times 10^{-4}$ | $5.850 \times 10^{-4}$ | $5.850 \times 10^{-4}$ | $5.850 \times 10^{-4}$ |
| 55 | $5.933 \times 10^{-4}$ | $5.931 \times 10^{-4}$ | $5.931 \times 10^{-4}$ | $5.931 \times 10^{-4}$ |
| 60 | $6.015 \times 10^{-4}$ | $6.012 \times 10^{-4}$ | $6.012 \times 10^{-4}$ | $6.012 \times 10^{-4}$ |
| 65 | $6.096 \times 10^{-4}$ | $6.093 \times 10^{-4}$ | $6.093 \times 10^{-4}$ | $6.093 \times 10^{-4}$ |
| 70 | $6.177 \times 10^{-4}$ | $6.173 \times 10^{-4}$ | $6.174 \times 10^{-4}$ | $6.173 \times 10^{-4}$ |
| 75 | $6.259 \times 10^{-4}$ | $6.254 \times 10^{-4}$ | $6.255 \times 10^{-4}$ | $6.254 \times 10^{-4}$ |
| 80 | $6.340 \times 10^{-4}$ | $6.335 \times 10^{-4}$ | $6.335 \times 10^{-4}$ | $6.335 \times 10^{-4}$ |
| 85 | $6.421 \times 10^{-4}$ | $6.415 \times 10^{-4}$ | $6.416 \times 10^{-4}$ | $6.415 \times 10^{-4}$ |
| 90 | $6.502 \times 10^{-4}$ | $6.497 \times 10^{-4}$ | $6.497 \times 10^{-4}$ | $6.496 \times 10^{-4}$ |
| 95 | $6.584 \times 10^{-4}$ | $6.577 \times 10^{-4}$ | $6.578 \times 10^{-4}$ | $6.577 \times 10^{-4}$ |
| 100 | $6.666 \times 10^{-4}$ | $6.658 \times 10^{-4}$ | $6.659 \times 10^{-4}$ | $6.658 \times 10^{-4}$ |
| 105 | $6.748 \times 10^{-4}$ | $6.740 \times 10^{-4}$ | $6.740 \times 10^{-4}$ | $6.740 \times 10^{-4}$ |
| 110 | $6.830 \times 10^{-4}$ | $6.821 \times 10^{-4}$ | $6.822 \times 10^{-4}$ | $6.822 \times 10^{-4}$ |
| 115 | $6.913 \times 10^{-4}$ | $6.903 \times 10^{-4}$ | $6.905 \times 10^{-4}$ | $6.904 \times 10^{-4}$ |
| 120 | $6.997 \times 10^{-4}$ | $6.986 \times 10^{-4}$ | $6.987 \times 10^{-4}$ | $6.987 \times 10^{-4}$ |
| 125 | $7.081 \times 10^{-4}$ | $7.070 \times 10^{-4}$ | $7.070 \times 10^{-4}$ | $7.071 \times 10^{-4}$ |

| Temperature (° F.) | Ex. 5 Liquid Phase Entropy (kJ/gR) | Ex. 6 Liquid Phase Entropy (kJ/gR) | Ex. 7 Liquid Phase Entropy (kJ/gR) | Ex. 8 Liquid Phase Entropy (kJ/gR) | R-410A Liquid Phase Entropy (kJ/gR) |
|---|---|---|---|---|---|
| −60 | $3.946 \times 10^{-4}$ | $3.919 \times 10^{-4}$ | $3.943 \times 10^{-4}$ | $4.795 \times 10^{-4}$ | $3.922 \times 10^{-4}$ |
| −55 | $4.040 \times 10^{-4}$ | $4.014 \times 10^{-4}$ | $4.037 \times 10^{-4}$ | $4.890 \times 10^{-4}$ | $4.017 \times 10^{-4}$ |
| −50 | $4.133 \times 10^{-4}$ | $4.109 \times 10^{-4}$ | $4.130 \times 10^{-4}$ | $4.985 \times 10^{-4}$ | $4.111 \times 10^{-4}$ |
| −45 | $4.225 \times 10^{-4}$ | $4.202 \times 10^{-4}$ | $4.222 \times 10^{-4}$ | $5.078 \times 10^{-4}$ | $4.204 \times 10^{-4}$ |
| −40 | $4.316 \times 10^{-4}$ | $4.294 \times 10^{-4}$ | $4.313 \times 10^{-4}$ | $5.170 \times 10^{-4}$ | $4.296 \times 10^{-4}$ |
| −35 | $4.406 \times 10^{-4}$ | $4.386 \times 10^{-4}$ | $4.404 \times 10^{-4}$ | $5.262 \times 10^{-4}$ | $4.387 \times 10^{-4}$ |
| −30 | $4.496 \times 10^{-4}$ | $4.477 \times 10^{-4}$ | $4.494 \times 10^{-4}$ | $5.353 \times 10^{-4}$ | $4.478 \times 10^{-4}$ |
| −25 | $4.584 \times 10^{-4}$ | $4.567 \times 10^{-4}$ | $4.583 \times 10^{-4}$ | $5.443 \times 10^{-4}$ | $4.568 \times 10^{-4}$ |
| −20 | $4.673 \times 10^{-4}$ | $4.657 \times 10^{-4}$ | $4.671 \times 10^{-4}$ | $5.532 \times 10^{-4}$ | $4.657 \times 10^{-4}$ |
| −15 | $4.760 \times 10^{-4}$ | $4.746 \times 10^{-4}$ | $4.759 \times 10^{-4}$ | $5.621 \times 10^{-4}$ | $4.745 \times 10^{-4}$ |
| −10 | $4.847 \times 10^{-4}$ | $4.834 \times 10^{-4}$ | $4.846 \times 10^{-4}$ | $5.709 \times 10^{-4}$ | $4.833 \times 10^{-4}$ |
| −5 | $4.933 \times 10^{-4}$ | $4.922 \times 10^{-4}$ | $4.932 \times 10^{-4}$ | $5.797 \times 10^{-4}$ | $4.921 \times 10^{-4}$ |
| 0 | $5.019 \times 10^{-4}$ | $5.009 \times 10^{-4}$ | $5.018 \times 10^{-4}$ | $5.883 \times 10^{-4}$ | $5.008 \times 10^{-4}$ |
| 5 | $5.104 \times 10^{-4}$ | $5.096 \times 10^{-4}$ | $5.103 \times 10^{-4}$ | $5.970 \times 10^{-4}$ | $5.095 \times 10^{-4}$ |
| 10 | $5.188 \times 10^{-4}$ | $5.182 \times 10^{-4}$ | $5.188 \times 10^{-4}$ | $6.056 \times 10^{-4}$ | $5.181 \times 10^{-4}$ |
| 15 | $5.273 \times 10^{-4}$ | $5.267 \times 10^{-4}$ | $5.272 \times 10^{-4}$ | $6.141 \times 10^{-4}$ | $5.266 \times 10^{-4}$ |
| 20 | $5.356 \times 10^{-4}$ | $5.353 \times 10^{-4}$ | $5.356 \times 10^{-4}$ | $6.226 \times 10^{-4}$ | $5.352 \times 10^{-4}$ |
| 25 | $5.440 \times 10^{-4}$ | $5.437 \times 10^{-4}$ | $5.439 \times 10^{-4}$ | $6.310 \times 10^{-4}$ | $5.437 \times 10^{-4}$ |
| 30 | $5.523 \times 10^{-4}$ | $5.522 \times 10^{-4}$ | $5.522 \times 10^{-4}$ | $6.394 \times 10^{-4}$ | $5.522 \times 10^{-4}$ |
| 35 | $5.605 \times 10^{-4}$ | $5.606 \times 10^{-4}$ | $5.605 \times 10^{-4}$ | $6.478 \times 10^{-4}$ | $5.606 \times 10^{-4}$ |
| 40 | $5.687 \times 10^{-4}$ | $5.690 \times 10^{-4}$ | $5.688 \times 10^{-4}$ | $6.561 \times 10^{-4}$ | $5.691 \times 10^{-4}$ |
| 45 | $5.769 \times 10^{-4}$ | $5.773 \times 10^{-4}$ | $5.770 \times 10^{-4}$ | $6.644 \times 10^{-4}$ | $5.775 \times 10^{-4}$ |
| 50 | $5.851 \times 10^{-4}$ | $5.857 \times 10^{-4}$ | $5.851 \times 10^{-4}$ | $6.727 \times 10^{-4}$ | $5.859 \times 10^{-4}$ |
| 55 | $5.933 \times 10^{-4}$ | $5.940 \times 10^{-4}$ | $5.933 \times 10^{-4}$ | $6.809 \times 10^{-4}$ | $5.944 \times 10^{-4}$ |
| 60 | $6.014 \times 10^{-4}$ | $6.023 \times 10^{-4}$ | $6.014 \times 10^{-4}$ | $6.892 \times 10^{-4}$ | $6.028 \times 10^{-4}$ |
| 65 | $6.095 \times 10^{-4}$ | $6.106 \times 10^{-4}$ | $6.096 \times 10^{-4}$ | $6.974 \times 10^{-4}$ | $6.112 \times 10^{-4}$ |
| 70 | $6.176 \times 10^{-4}$ | $6.189 \times 10^{-4}$ | $6.177 \times 10^{-4}$ | $7.056 \times 10^{-4}$ | $6.197 \times 10^{-4}$ |
| 75 | $6.257 \times 10^{-4}$ | $6.271 \times 10^{-4}$ | $6.258 \times 10^{-4}$ | $7.138 \times 10^{-4}$ | $6.281 \times 10^{-4}$ |
| 80 | $6.338 \times 10^{-4}$ | $6.354 \times 10^{-4}$ | $6.339 \times 10^{-4}$ | $7220 \times 10^{-4}$ | $6.367 \times 10^{-4}$ |
| 85 | $6.419 \times 10^{-4}$ | $6.437 \times 10^{-4}$ | $6.420 \times 10^{-4}$ | $7.302 \times 10^{-4}$ | $6.453 \times 10^{-4}$ |
| 90 | $6.501 \times 10^{-4}$ | $6.520 \times 10^{-4}$ | $6.501 \times 10^{-4}$ | $7.384 \times 10^{-4}$ | $6.539 \times 10^{-4}$ |
| 95 | $6.582 \times 10^{-4}$ | $6.603 \times 10^{-4}$ | $6.582 \times 10^{-4}$ | $7.466 \times 10^{-4}$ | $6.625 \times 10^{-4}$ |
| 100 | $6.664 \times 10^{-4}$ | $6.687 \times 10^{-4}$ | $6.664 \times 10^{-4}$ | $7.548 \times 10^{-4}$ | $6.713 \times 10^{-4}$ |
| 105 | $6.745 \times 10^{-4}$ | $6.770 \times 10^{-4}$ | $6.746 \times 10^{-4}$ | $7.631 \times 10^{-4}$ | $6.801 \times 10^{-4}$ |
| 110 | $6.828 \times 10^{-4}$ | $6.855 \times 10^{-4}$ | $6.828 \times 10^{-4}$ | $7.714 \times 10^{-4}$ | $6.890 \times 10^{-4}$ |
| 115 | $6.912 \times 10^{-4}$ | $6.939 \times 10^{-4}$ | $6.910 \times 10^{-4}$ | $7.797 \times 10^{-4}$ | $6.981 \times 10^{-4}$ |
| 120 | $6.994 \times 10^{-4}$ | $7.025 \times 10^{-4}$ | $6.994 \times 10^{-4}$ | $7.881 \times 10^{-4}$ | $7.074 \times 10^{-4}$ |
| 125 | $7.078 \times 10^{-4}$ | $7.111 \times 10^{-4}$ | $7.078 \times 10^{-4}$ | $7.966 \times 10^{-4}$ | $7.169 \times 10^{-4}$ |

Figure 5:
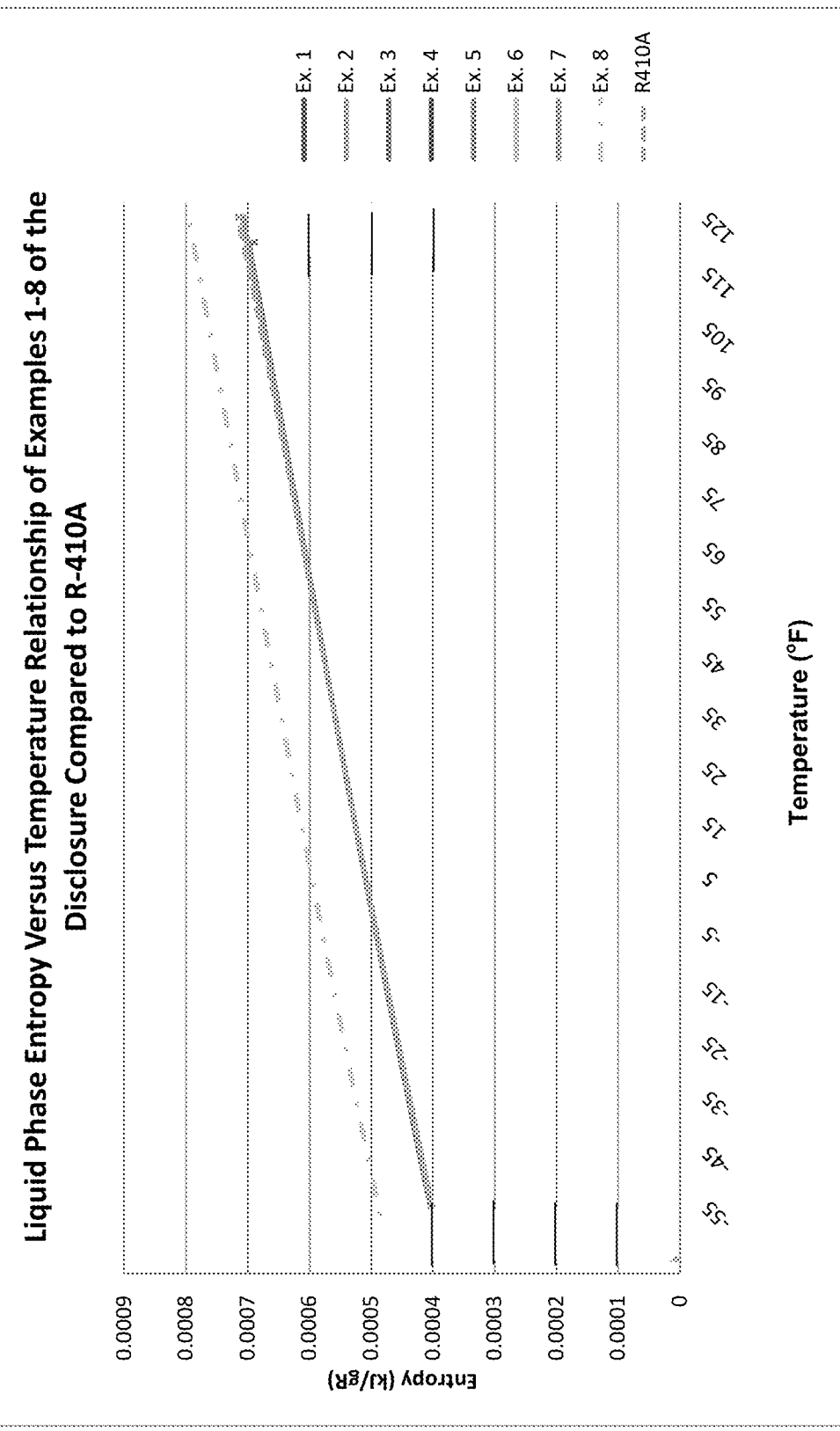
FIG. 5 depicts the liquid phase entropy curve of the refrigerant compositions of the disclosure compared to R-410A.

The results of Table 7 are presented graphically in FIG. 5. As can be seen, the correspondence of the liquid phase enthalpy pressure to R-410A is very close over the entire temperature range.

Table 8 presents the vapor phase entropy versus temperature of R-410A compared to Examples 1 to 8 of the disclosure.

TABLE 8

Vapor Phase Entropy Versus Temperature Relationship of Examples 1-8 of the Disclosure Compared to R-410A.

| Temperature (° F.) | Ex. 1 Vapor Phase Entropy (kJ/gR) | Ex. 2 Vapor Phase Entropy (kJ/gR) | Ex. 3 Vapor Phase Entropy (kJ/gR) | Ex. 4 Vapor Phase Entropy (kJ/gR) |
|---|---|---|---|---|
| −60 | $1.073 \times 10^{-3}$ | $1.066 \times 10^{-3}$ | $1.067 \times 10^{-3}$ | $1.064 \times 10^{-3}$ |
| −55 | $1.069 \times 10^{-3}$ | $1.062 \times 10^{-3}$ | $1.062 \times 10^{-3}$ | $1.059 \times 10^{-3}$ |
| −50 | $1.064 \times 10^{-3}$ | $1.057 \times 10^{-3}$ | $1.058 \times 10^{-3}$ | $1.055 \times 10^{-3}$ |
| −45 | $1.060 \times 10^{-3}$ | $1.053 \times 10^{-3}$ | $1.054 \times 10^{-3}$ | $1.051 \times 10^{-3}$ |
| −40 | $1.056 \times 10^{-3}$ | $1.049 \times 10^{-3}$ | $1.050 \times 10^{-3}$ | $1.047 \times 10^{-3}$ |
| −35 | $1.052 \times 10^{-3}$ | $1.046 \times 10^{-3}$ | $1.047 \times 10^{-3}$ | $1.044 \times 10^{-3}$ |
| −30 | $1.049 \times 10^{-3}$ | $1.042 \times 10^{-3}$ | $1.043 \times 10^{-3}$ | $1.040 \times 10^{-3}$ |
| −25 | $1.045 \times 10^{-3}$ | $1.039 \times 10^{-3}$ | $1.040 \times 10^{-3}$ | $1.037 \times 10^{-3}$ |
| −20 | $1.042 \times 10^{-3}$ | $1.036 \times 10^{-3}$ | $1.037 \times 10^{-3}$ | $1.038 \times 10^{-3}$ |
| −15 | $1.039 \times 10^{-3}$ | $1.033 \times 10^{-3}$ | $1.033 \times 10^{-3}$ | $1.031 \times 10^{-3}$ |
| −10 | $1.036 \times 10^{-3}$ | $1.030 \times 10^{-3}$ | $1.031 \times 10^{-3}$ | $1.028 \times 10^{-3}$ |
| −5 | $1.033 \times 10^{-3}$ | $1.027 \times 10^{-3}$ | $1.028 \times 10^{-3}$ | $1.025 \times 10^{-3}$ |
| 0 | $1.030 \times 10^{-3}$ | $1.024 \times 10^{-3}$ | $1.025 \times 10^{-3}$ | $1.022 \times 10^{-3}$ |
| 5 | $1.027 \times 10^{-3}$ | $1.022 \times 10^{-3}$ | $1.022 \times 10^{-3}$ | $1.020 \times 10^{-3}$ |
| 10 | $1.025 \times 10^{-3}$ | $1.019 \times 10^{-3}$ | $1.020 \times 10^{-3}$ | $1.017 \times 10^{-3}$ |
| 15 | $1.022 \times 10^{-3}$ | $1.017 \times 10^{-3}$ | $1.018 \times 10^{-3}$ | $1.015 \times 10^{-3}$ |
| 20 | $1.020 \times 10^{-3}$ | $1.015 \times 10^{-3}$ | $1.015 \times 10^{-3}$ | $1.013 \times 10^{-3}$ |
| 25 | $1.018 \times 10^{-3}$ | $1,012 \times 10^{-3}$ | $1.013 \times 10^{-3}$ | $1.010 \times 10^{-3}$ |
| 30 | $1.015 \times 10^{-3}$ | $1.010 \times 10^{-3}$ | $1.011 \times 10^{-3}$ | $1.008 \times 10^{-3}$ |
| 35 | $1.013 \times 10^{-3}$ | $1.008 \times 10^{-3}$ | $1.009 \times 10^{-3}$ | $1.006 \times 10^{-3}$ |
| 40 | $1.011 \times 10^{-3}$ | $1.006 \times 10^{-3}$ | $1.007 \times 10^{-3}$ | $1.004 \times 10^{-3}$ |
| 45 | $1.009 \times 10^{-3}$ | $1.004 \times 10^{-3}$ | $1.005 \times 10^{-3}$ | $1.002 \times 10^{-3}$ |
| 50 | $1.007 \times 10^{-3}$ | $1.002 \times 10^{-3}$ | $1.003 \times 10^{-3}$ | $1.000 \times 10^{-3}$ |
| 55 | $1.005 \times 10^{-3}$ | $1.000 \times 10^{-3}$ | $1.001 \times 10^{-3}$ | $9.981 \times 10^{-4}$ |
| 60 | $1.003 \times 10^{-3}$ | $9.983 \times 10^{-4}$ | $9.988 \times 10^{-4}$ | $9.962 \times 10^{-4}$ |
| 65 | $1.001 \times 10^{-3}$ | $9.965 \times 10^{-4}$ | $9.969 \times 10^{-4}$ | $9.943 \times 10^{-4}$ |
| 70 | $9.988 \times 10^{-4}$ | $9.947 \times 10^{-4}$ | $9.951 \times 10^{-4}$ | $9.925 \times 10^{-4}$ |
| 75 | $9.969 \times 10^{-4}$ | $9.929 \times 10^{-4}$ | $9.932 \times 10^{-4}$ | $9.907 \times 10^{-4}$ |
| 80 | $9.949 \times 10^{-4}$ | $9.910 \times 10^{-4}$ | $9.914 \times 10^{-4}$ | $9.888 \times 10^{-4}$ |
| 85 | $9.930 \times 10^{-4}$ | $9.892 \times 10^{-4}$ | $9.895 \times 10^{-4}$ | $9.870 \times 10^{-4}$ |
| 90 | $9.910 \times 10^{-4}$ | $9.874 \times 10^{-4}$ | $9.877 \times 10^{-4}$ | $9.851 \times 10^{-4}$ |
| 95 | $9.891 \times 10^{-4}$ | $9.855 \times 10^{-4}$ | $9.858 \times 10^{-4}$ | $9.832 \times 10^{-4}$ |
| 100 | $9.870 \times 10^{-4}$ | $9.836 \times 10^{-4}$ | $9.839 \times 10^{-4}$ | $9.813 \times 10^{-4}$ |
| 105 | $9.850 \times 10^{-4}$ | $9.817 \times 10^{-4}$ | $9.819 \times 10^{-4}$ | $9.794 \times 10^{-4}$ |
| 110 | $9.829 \times 10^{-4}$ | $9.797 \times 10^{-4}$ | $9.799 \times 10^{-4}$ | $9.773 \times 10^{-4}$ |
| 115 | $9.806 \times 10^{-4}$ | $9.777 \times 10^{-4}$ | $9.778 \times 10^{-4}$ | $9.752 \times 10^{-4}$ |
| 120 | $9.784 \times 10^{-4}$ | $9.755 \times 10^{-4}$ | $9.757 \times 10^{-4}$ | $9.731 \times 10^{-4}$ |
| 125 | $9.760 \times 10^{-4}$ | $9.733 \times 10^{-4}$ | $9.734 \times 10^{-4}$ | $9.708 \times 10^{-4}$ |

| Temperature (° F.) | Ex. 5 Vapor Phase Entropy (kJ/gR) | Ex.6 Vapor Phase Entropy (kJ/gR) | Ex. 7 Vapor Phase Entropy (kJ/gR) | Ex. 8 Vapor Phase Entropy (kJ/gR) | R-410A Vapor Phase Entropy (kJ/gR) |
|---|---|---|---|---|---|
| −60 | $1.071 \times 10^{-3}$ | $1.068 \times 10^{-3}$ | $1.072 \times 10^{-3}$ | $1.173 \times 10^{-3}$ | $1.075 \times 10^{-3}$ |
| −55 | $1.066 \times 10^{-3}$ | $1.063 \times 10^{-3}$ | $1.068 \times 10^{-3}$ | $1.168 \times 10^{-3}$ | $1.070 \times 10^{-3}$ |
| −50 | $1.062 \times 10^{-3}$ | $1.059 \times 10^{-3}$ | $1.064 \times 10^{-3}$ | $1.164 \times 10^{-3}$ | $1.065 \times 10^{-3}$ |
| −45 | $1.058 \times 10^{-3}$ | $1.055 \times 10^{-3}$ | $1.059 \times 10^{-3}$ | $1.160 \times 10^{-3}$ | $1.060 \times 10^{-3}$ |
| −40 | $1.054 \times 10^{-3}$ | $1.051 \times 10^{-3}$ | $1.055 \times 10^{-3}$ | $1.155 \times 10^{-3}$ | $1.056 \times 10^{-3}$ |
| −35 | $1.050 \times 10^{-3}$ | $1.047 \times 10^{-3}$ | $1.052 \times 10^{-3}$ | $1.152 \times 10^{-3}$ | $1.052 \times 10^{-3}$ |
| −30 | $1.047 \times 10^{-3}$ | $1.044 \times 10^{-3}$ | $1.048 \times 10^{-3}$ | $1.148 \times 10^{-3}$ | $1.048 \times 10^{-3}$ |
| −25 | $1.043 \times 10^{-3}$ | $1.040 \times 10^{-3}$ | $1.045 \times 10^{-3}$ | $1.144 \times 10^{-3}$ | $1.044 \times 10^{-3}$ |
| −20 | $1.040 \times 10^{-3}$ | $1.037 \times 10^{-3}$ | $1.041 \times 10^{-3}$ | $1.141 \times 10^{-3}$ | $1.040 \times 10^{-3}$ |
| −15 | $1.037 \times 10^{-3}$ | $1.034 \times 10^{-3}$ | $1.038 \times 10^{-3}$ | $1.138 \times 10^{-3}$ | $1.036 \times 10^{-3}$ |
| −10 | $1.034 \times 10^{-3}$ | $1.031 \times 10^{-3}$ | $1.035 \times 10^{-3}$ | $1.135 \times 10^{-3}$ | $1.033 \times 10^{-3}$ |
| −5 | $1.031 \times 10^{-3}$ | $1.029 \times 10^{-3}$ | $1.032 \times 10^{-3}$ | $1.132 \times 10^{-3}$ | $1.029 \times 10^{-3}$ |
| 0 | $1.028 \times 10^{-3}$ | $1.026 \times 10^{-3}$ | $1.030 \times 10^{-3}$ | $1.129 \times 10^{-3}$ | $1.026 \times 10^{-3}$ |
| 5 | $1.025 \times 10^{-3}$ | $1.023 \times 10^{-3}$ | $1.027 \times 10^{-3}$ | $1.126 \times 10^{-3}$ | $1.023 \times 10^{-3}$ |
| 10 | $1.023 \times 10^{-3}$ | $1.021 \times 10^{-3}$ | $1.025 \times 10^{-3}$ | $1.124 \times 10^{-3}$ | $1.019 \times 10^{-3}$ |
| 15 | $1.020 \times 10^{-3}$ | $1.018 \times 10^{-3}$ | $1.022 \times 10^{-3}$ | $1.121 \times 10^{-3}$ | $1.016 \times 10^{-3}$ |
| 20 | $1.018 \times 10^{-3}$ | $1.016 \times 10^{-3}$ | $1.020 \times 10^{-3}$ | $1.119 \times 10^{-3}$ | $1.013 \times 10^{-3}$ |
| 25 | $1.016 \times 10^{-3}$ | $1.014 \times 10^{-3}$ | $1.018 \times 10^{-3}$ | $1.116 \times 10^{-3}$ | $1.010 \times 10^{-3}$ |
| 30 | $1.013 \times 10^{-3}$ | $1.012 \times 10^{-3}$ | $1.015 \times 10^{-3}$ | $1.114 \times 10^{-3}$ | $1.007 \times 10^{-3}$ |
| 35 | $1.011 \times 10^{-3}$ | $1.010 \times 10^{-3}$ | $1.013 \times 10^{-3}$ | $1.112 \times 10^{-3}$ | $1.004 \times 10^{-3}$ |
| 40 | $1.009 \times 10^{-3}$ | $1.008 \times 10^{-3}$ | $1.011 \times 10^{-3}$ | $1.109 \times 10^{-3}$ | $1.001 \times 10^{-3}$ |
| 45 | $1.007 \times 10^{-3}$ | $1.006 \times 10^{-3}$ | $1.009 \times 10^{-3}$ | $1.107 \times 10^{-3}$ | $9.981 \times 10^{-4}$ |

TABLE 8-continued

Vapor Phase Entropy Versus Temperature Relationship of Examples 1-8 of the Disclosure Compared to R-410A.

| | | | | | |
|---|---|---|---|---|---|
| 50 | $1.005 \times 10^{-3}$ | $1.004 \times 10^{-3}$ | $1.007 \times 10^{-3}$ | $1.105 \times 10^{-3}$ | $9.951 \times 10^{-4}$ |
| 55 | $1.003 \times 10^{-3}$ | $1.002 \times 10^{-3}$ | $1.005 \times 10^{-3}$ | $1.103 \times 10^{-3}$ | $9.922 \times 10^{-4}$ |
| 60 | $1.001 \times 10^{-3}$ | $1.000 \times 10^{-3}$ | $1.003 \times 10^{-3}$ | $1.101 \times 10^{-3}$ | $9.892 \times 10^{-4}$ |
| 65 | $9.989 \times 10^{-4}$ | $9.981 \times 10^{-4}$ | $1.001 \times 10^{-3}$ | $1.099 \times 10^{-3}$ | $9.862 \times 10^{-4}$ |
| 70 | $9.970 \times 10^{-4}$ | $9.963 \times 10^{-4}$ | $9.994 \times 10^{-4}$ | $1.097 \times 10^{-3}$ | $9.832 \times 10^{-4}$ |
| 75 | $9.951 \times 10^{-4}$ | $9.945 \times 10^{-4}$ | $9.975 \times 10^{-4}$ | $1.095 \times 10^{-3}$ | $9.801 \times 10^{-4}$ |
| 80 | $9.932 \times 10^{-4}$ | $9.927 \times 10^{-4}$ | $9.957 \times 10^{-4}$ | $1.094 \times 10^{-3}$ | $9.770 \times 10^{-4}$ |
| 85 | $9.912 \times 10^{-4}$ | $9.991 \times 10^{-4}$ | $9.938 \times 10^{-4}$ | $1.092 \times 10^{-3}$ | $9.737 \times 10^{-4}$ |
| 90 | $9.893 \times 10^{-4}$ | $9.890 \times 10^{-4}$ | $9.919 \times 10^{-4}$ | $1.090 \times 10^{-3}$ | $9.704 \times 10^{-4}$ |
| 95 | $9.873 \times 10^{-4}$ | $9.871 \times 10^{-4}$ | $9.900 \times 10^{-4}$ | $1.088 \times 10^{-3}$ | $9.669 \times 10^{-4}$ |
| 100 | $9.853 \times 10^{-4}$ | $9.852 \times 10^{-4}$ | $9.881 \times 10^{-4}$ | $1.086 \times 10^{-3}$ | $9.633 \times 10^{-4}$ |
| 105 | $9.832 \times 10^{-4}$ | $9.833 \times 10^{-4}$ | $9.861 \times 10^{-4}$ | $1.084 \times 10^{-3}$ | $9.596 \times 10^{-4}$ |
| 110 | $9.811 \times 10^{-4}$ | $9.812 \times 10^{-4}$ | $9.841 \times 10^{-4}$ | $1.082 \times 10^{-3}$ | $9.556 \times 10^{-4}$ |
| 115 | $9.789 \times 10^{-4}$ | $9.791 \times 10^{-4}$ | $9.820 \times 10^{-4}$ | $1.080 \times 10^{-3}$ | $9.513 \times 10^{-4}$ |
| 120 | $9.767 \times 10^{-4}$ | $9.769 \times 10^{-4}$ | $9.800 \times 10^{-4}$ | $1.077 \times 10^{-3}$ | $9.468 \times 10^{-4}$ |
| 125 | $9.743 \times 10^{-4}$ | $9.746 \times 10^{-4}$ | $9.775 \times 10^{-4}$ | $1.075 \times 10^{-3}$ | $9.418 \times 10^{-4}$ |

Figure 6:
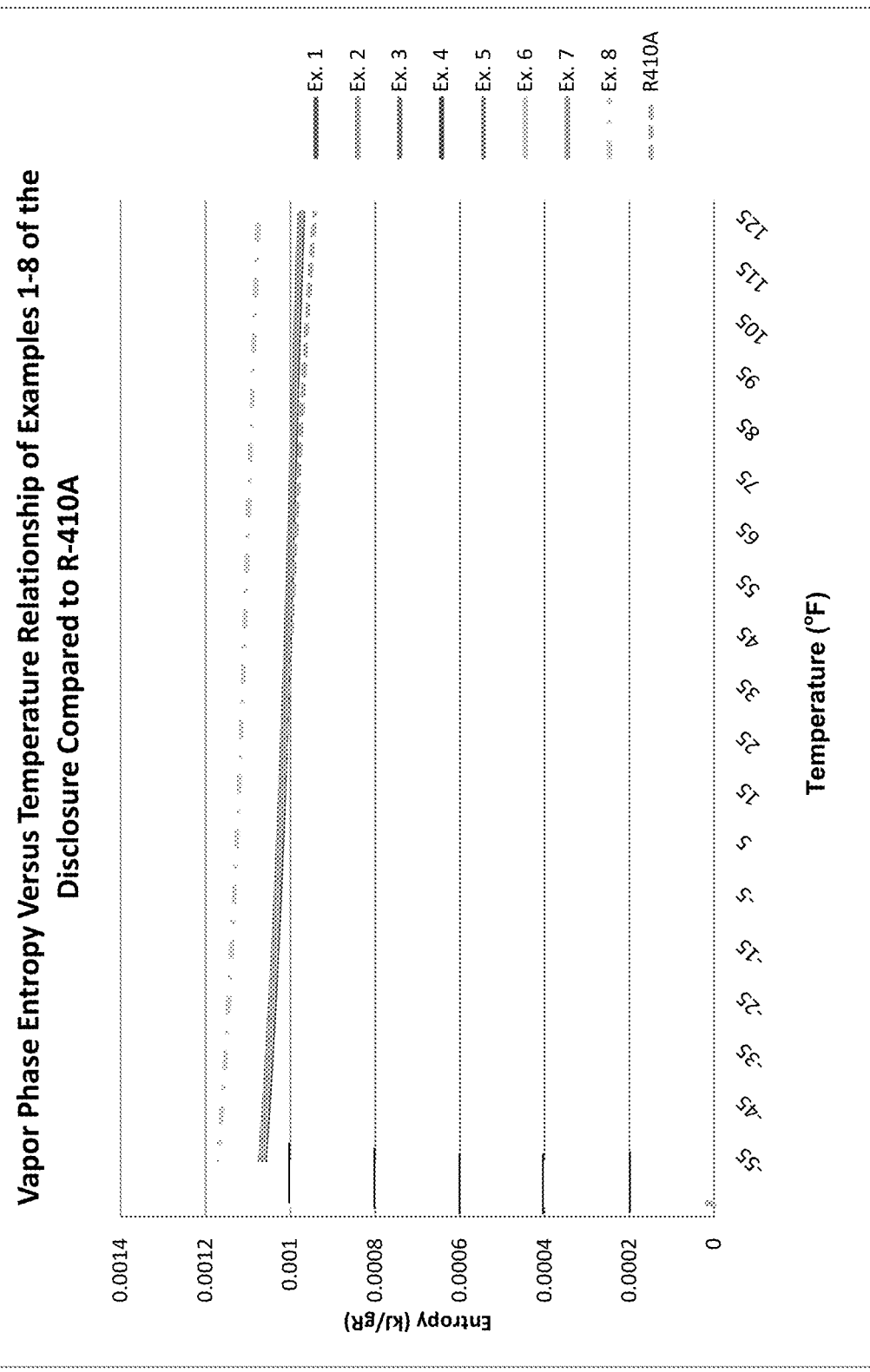
FIG. 6 depicts the vapor phase entropy curve of the refrigerant compositions of the disclosure compared to R-410A.

The results of Table 8 are presented graphically in FIG. 6. As can be seen, the correspondence of the vapor phase enthalpy pressure to R-410A is very close over the entire temperature range.

The NIST REFPROP program was used to generate the thermodynamic values for the examples of the disclosure. The results for temperature, pressure, density, enthalpy and entropy for Examples 1-8 are set forth in Tables 9-16.

TABLE 9

Temperature, Pressure, Density, Enthalpy and Entropy Values for Example 1.

| Temp. (° F.) | Liquid Phase Pressure (psia) | Vapor Phase Pressure (psia) | Liquid Phase Density (g/cm3) | Vapor Phase Density (g/cm3) |
|---|---|---|---|---|
| −60 | 20.57 | 7.057 | 1.347 | $2.132 \times 10^{-3}$ |
| −55 | 23.25 | 8.257 | 1.339 | $2.470 \times 10^{-3}$ |
| −50 | 26.19 | 9.617 | 1.331 | $2.850 \times 10^{-3}$ |
| −45 | 29.40 | 11.15 | 1.322 | $3.274 \times 10^{-3}$ |
| −40 | 32.92 | 12.87 | 1.314 | $3.746 \times 10^{-3}$ |
| −35 | 36.74 | 14.80 | 1.305 | $4.271 \times 10^{-3}$ |
| −30 | 40.89 | 16.95 | 1.297 | $4.850 \times 10^{-3}$ |
| −25 | 45.39 | 19.35 | 1.288 | $5.494 \times 10^{-3}$ |
| −20 | 50.26 | 22.00 | 1.279 | $6.201 \times 10^{-3}$ |
| −15 | 55.50 | 24.93 | 1.270 | $6.978 \times 10^{-3}$ |
| −10 | 61.16 | 28.15 | 1.262 | $7.830 \times 10^{-3}$ |
| −5 | 67.23 | 31.70 | 1.252 | $8.762 \times 10^{-3}$ |
| 0 | 73.74 | 35.58 | 1.243 | $9.779 \times 10^{-3}$ |
| 5 | 80.70 | 39.83 | 1.234 | 0.01089 |
| 10 | 88.15 | 44.46 | 1.225 | 0.01209 |
| 15 | 96.09 | 49.50 | 1.215 | 0.01340 |
| 20 | 104.5 | 55.00 | 1.206 | 0.01482 |
| 25 | 113.5 | 60.89 | 1.196 | 0.01636 |
| 30 | 123.1 | 67.30 | 1.186 | 0.01802 |
| 35 | 133.2 | 74.21 | 1.176 | 0.01980 |
| 40 | 143.9 | 81.65 | 1.167 | 0.02176 |
| 45 | 155.2 | 89.66 | 1.155 | 0.02385 |
| 50 | 167.2 | 98.26 | 1.145 | 0.02611 |
| 55 | 179.8 | 107.5 | 1.134 | 0.02853 |
| 60 | 193.1 | 117.3 | 1.123 | 0.03115 |
| 65 | 207.0 | 127.9 | 1.112 | 0.03400 |
| 70 | 221.7 | 139.1 | 1.100 | 0.03699 |
| 75 | 237.1 | 151.1 | 1.088 | 0.04024 |
| 80 | 253.2 | 163.9 | 1.076 | 0.04375 |
| 85 | 270.1 | 177.5 | 1.064 | 0.04752 |
| 90 | 287.8 | 192.0 | 1.051 | 0.05157 |
| 95 | 306.3 | 207.3 | 1.038 | 0.05595 |

TABLE 9-continued

Temperature, Pressure, Density, Enthalpy and Entropy Values for Example 1.

| | | | | |
|---|---|---|---|---|
| 100 | 325.6 | 223.6 | 1.025 | 0.06066 |
| 105 | 345.8 | 240.8 | 1.011 | 0.06574 |
| 110 | 366.8 | 259.1 | 0.9967 | 0.07124 |
| 115 | 388.2 | 278.4 | 0.9818 | 0.07719 |
| 120 | 411.4 | 298.9 | 0.9664 | 0.08363 |

| Temp. (° F.) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|
| −60 | 0.1277 | 0.3883 | $3.940 \times 10^{-4}$ | $1.073 \times 10^{-3}$ |
| −55 | 0.1315 | 0.3901 | $4.037 \times 10^{-4}$ | $1.069 \times 10^{-3}$ |
| −50 | 0.1353 | 0.3918 | $4.130 \times 10^{-4}$ | $1.064 \times 10^{-3}$ |
| −45 | 0.1391 | 0.3936 | $4.222 \times 10^{-4}$ | $1.060 \times 10^{-3}$ |
| −40 | 0.1429 | 0.3953 | $4.313 \times 10^{-4}$ | $1.056 \times 10^{-3}$ |
| −35 | 0.1468 | 0.3970 | $4.404 \times 10^{-4}$ | $1.052 \times 10^{-3}$ |
| −30 | 0.1506 | 0.3988 | $4.493 \times 10^{-4}$ | $1.049 \times 10^{-3}$ |
| −25 | 0.1545 | 0.4004 | $4.582 \times 10^{-4}$ | $1.045 \times 10^{-3}$ |
| −20 | 0.1584 | 0.4021 | $4.671 \times 10^{-4}$ | $1.042 \times 10^{-3}$ |
| −15 | 0.1623 | 0.4038 | $4.758 \times 10^{-4}$ | $1.039 \times 10^{-3}$ |
| −10 | 0.1662 | 0.4054 | $4.845 \times 10^{-4}$ | $1.036 \times 10^{-3}$ |
| −5 | 0.1702 | 0.4071 | $4.932 \times 10^{-4}$ | $1.033 \times 10^{-3}$ |
| 0 | 0.1741 | 0.4087 | $5.018 \times 10^{-4}$ | $1.030 \times 10^{-3}$ |
| 5 | 0.1781 | 0.4103 | $5.103 \times 10^{-4}$ | $1.027 \times 10^{-3}$ |
| 10 | 0.1821 | 0.4118 | $5.188 \times 10^{-4}$ | $1.025 \times 10^{-3}$ |
| 15 | 0.1861 | 0.4134 | $5.272 \times 10^{-4}$ | $1.022 \times 10^{-3}$ |
| 20 | 0.1902 | 0.4149 | $5.356 \times 10^{-4}$ | $1.020 \times 10^{-3}$ |
| 25 | 0.1943 | 0.4164 | $5.439 \times 10^{-4}$ | $1.019 \times 10^{-3}$ |
| 30 | 0.1984 | 0.4179 | $5.522 \times 10^{-4}$ | $1.015 \times 10^{-3}$ |
| 35 | 0.2025 | 0.4193 | $5.605 \times 10^{-4}$ | $1.013 \times 10^{-3}$ |
| 40 | 0.2066 | 0.4207 | $5.688 \times 10^{-4}$ | $1.011 \times 10^{-3}$ |
| 45 | 0.2108 | 0.4221 | $5.770 \times 10^{-4}$ | $1.009 \times 10^{-3}$ |
| 50 | 0.2151 | 0.4234 | $5.852 \times 10^{-4}$ | $1.007 \times 10^{-3}$ |
| 55 | 0.2193 | 0.4247 | $5.933 \times 10^{-4}$ | $1.005 \times 10^{-3}$ |
| 60 | 0.2236 | 0.4259 | $6.015 \times 10^{-4}$ | $1.003 \times 10^{-3}$ |
| 65 | 0.2279 | 0.4271 | $6.100 \times 10^{-4}$ | $1.001 \times 10^{-3}$ |
| 70 | 0.2323 | 0.4283 | $6.177 \times 10^{-4}$ | $9.988 \times 10^{-4}$ |
| 75 | 0.2367 | 0.4294 | $6.259 \times 10^{-4}$ | $9.969 \times 10^{-4}$ |
| 80 | 0.2412 | 0.4305 | $6.340 \times 10^{-4}$ | $9.949 \times 10^{-4}$ |
| 85 | 0.2457 | 0.4315 | $6.421 \times 10^{-4}$ | $9.930 \times 10^{-4}$ |
| 90 | 0.2503 | 0.4324 | $6.502 \times 10^{-4}$ | $9.910 \times 10^{-4}$ |
| 95 | 0.2549 | 0.4333 | $6.583 \times 10^{-4}$ | $9.890 \times 10^{-4}$ |
| 100 | 0.2596 | 0.4341 | $6.666 \times 10^{-4}$ | $9.870 \times 10^{-4}$ |
| 105 | 0.2643 | 0.4348 | $6.748 \times 10^{-4}$ | $9.850 \times 10^{-4}$ |
| 110 | 0.2692 | 0.4354 | $6.830 \times 10^{-4}$ | $9.828 \times 10^{-4}$ |
| 115 | 0.2741 | 0.4360 | $6.913 \times 10^{-4}$ | $9.806 \times 10^{-4}$ |
| 120 | 0.2790 | 0.4364 | $6.997 \times 10^{-4}$ | $9.784 \times 10^{-4}$ |

TABLE 10

Temperature, Pressure, Density, Enthalpy and Entropy Values for Example 2.

| Temp. (° F.) | Liquid Phase Pressure (psia) | Vapor Phase Pressure (psia) | Liquid Phase Density (g/cm3) | Vapor Phase Density (g/cm3) |
|---|---|---|---|---|
| −60 | 20.44 | 6.787 | 1.351 | $2.084 \times 10^{-3}$ |
| −55 | 23.09 | 7.946 | 1.343 | $2.415 \times 10^{-3}$ |
| −50 | 26.00 | 9.258 | 1.335 | $2.787 \times 10^{-3}$ |
| −45 | 29.19 | 10.74 | 1.326 | $3.203 \times 10^{-3}$ |
| −40 | 32.67 | 12.41 | 1.318 | $3.667 \times 10^{-3}$ |
| −35 | 36.45 | 14.27 | 1.340 | $4.183 \times 10^{-3}$ |
| −30 | 40.56 | 16.35 | 1.301 | $4.754 \times 10^{-3}$ |
| −25 | 45.01 | 18.67 | 1.292 | $5.385 \times 10^{-3}$ |
| −20 | 49.83 | 21.24 | 1.284 | $6.080 \times 10^{-3}$ |
| −15 | 55.02 | 24.08 | 1.275 | $6.844 \times 10^{-3}$ |
| −10 | 60.60 | 27.20 | 1.266 | $7.682 \times 10^{-3}$ |
| −5 | 66.60 | 30.64 | 1.257 | $8.599 \times 10^{-3}$ |
| 0 | 73.03 | 34.41 | 1.248 | $9.600 \times 10^{-3}$ |
| 5 | 79.91 | 38.54 | 1.238 | 0.01069 |
| 10 | 87.27 | 43.03 | 1.229 | 0.01188 |
| 15 | 95.11 | 47.93 | 1.220 | 0.01317 |
| 20 | 103.5 | 53.24 | 1.210 | 0.01457 |
| 25 | 112.3 | 59.00 | 1.200 | 0.01608 |
| 30 | 121.7 | 65.22 | 1.190 | 0.01772 |
| 35 | 131.7 | 71.95 | 1.180 | 0.01949 |
| 40 | 142.3 | 79.19 | 1.170 | 0.02140 |
| 45 | 153.5 | 86.98 | 1.160 | 0.02346 |
| 50 | 165.2 | 95.35 | 1.149 | 0.02568 |
| 55 | 177.7 | 104.3 | 1.139 | 0.02808 |
| 60 | 190.7 | 113.9 | 1.129 | 0.03065 |
| 65 | 204.5 | 124.2 | 1.116 | 0.03342 |
| 70 | 218.9 | 135.2 | 1.105 | 0.03640 |
| 75 | 234.1 | 146.9 | 1.093 | 0.03960 |
| 80 | 250.0 | 159.3 | 1.081 | 0.04306 |
| 85 | 266.6 | 172.6 | 1.069 | 0.04680 |
| 90 | 284.0 | 186.7 | 1.056 | 0.05076 |
| 95 | 302.2 | 201.6 | 1.044 | 0.05507 |
| 100 | 321.2 | 217.5 | 1.030 | 0.05970 |
| 105 | 341.0 | 234.3 | 1.016 | 0.06470 |
| 110 | 361.7 | 252.2 | 1.002 | 0.07010 |
| 115 | 383.1 | 271.0 | 0.9874 | 0.07594 |
| 120 | 405.5 | 291.0 | 0.9720 | 0.08226 |
| 125 | 428.7 | 312.1 | 0.9561 | 0.08913 |

| Temp. (° F.) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|
| −60 | 0.1281 | 0.3854 | $3.952 \times 10^{-4}$ | $1.066 \times 10^{-3}$ |
| −55 | 0.1319 | 0.3872 | $4.045 \times 10^{-4}$ | $1.062 \times 10^{-3}$ |
| −50 | 0.1357 | 0.3889 | $4.138 \times 10^{-4}$ | $1.057 \times 10^{-3}$ |
| −45 | 0.1395 | 0.3907 | $4.229 \times 10^{-4}$ | $1.053 \times 10^{-3}$ |
| −40 | 0.1433 | 0.3925 | $4.320 \times 10^{-4}$ | $1.049 \times 10^{-3}$ |
| −35 | 0.1471 | 0.3942 | $4.410 \times 10^{-4}$ | $1.046 \times 10^{-3}$ |
| −30 | 0.1509 | 0.3959 | $4.499 \times 10^{-4}$ | $1.042 \times 10^{-3}$ |
| −25 | 0.1548 | 0.3976 | $4.588 \times 10^{-4}$ | $1.039 \times 10^{-3}$ |
| −20 | 0.1586 | 0.3993 | $4.676 \times 10^{-4}$ | $1.039 \times 10^{-3}$ |
| −15 | 0.1625 | 0.4010 | $4.730 \times 10^{-4}$ | $1.033 \times 10^{-3}$ |
| −10 | 0.1664 | 0.4027 | $4.849 \times 10^{-4}$ | $1.030 \times 10^{-3}$ |
| −5 | 0.1703 | 0.4043 | $4.935 \times 10^{-4}$ | $1.027 \times 10^{-3}$ |
| 0 | 0.1743 | 0.4060 | $5.021 \times 10^{-4}$ | $1.024 \times 10^{-3}$ |
| 5 | 0.1782 | 0.4076 | $5.106 \times 10^{-4}$ | $1.022 \times 10^{-3}$ |
| 10 | 0.1822 | 0.4092 | $5.190 \times 10^{-4}$ | $1.019 \times 10^{-3}$ |
| 15 | 0.1862 | 0.4107 | $5.274 \times 10^{-4}$ | $1.017 \times 10^{-3}$ |
| 20 | 0.1902 | 0.4123 | $5.357 \times 10^{-4}$ | $1.015 \times 10^{-3}$ |
| 25 | 0.1943 | 0.4138 | $5.440 \times 10^{-4}$ | $1.012 \times 10^{-3}$ |
| 30 | 0.1984 | 0.4153 | $5.523 \times 10^{-4}$ | $1.010 \times 10^{-3}$ |
| 35 | 0.2024 | 0.4168 | $5.605 \times 10^{-4}$ | $1.008 \times 10^{-3}$ |
| 40 | 0.2070 | 0.4181 | $5.687 \times 10^{-4}$ | $1.050 \times 10^{-3}$ |
| 45 | 0.2108 | 0.4196 | $5.769 \times 10^{-4}$ | $1.004 \times 10^{-3}$ |
| 50 | 0.2150 | 0.4210 | $5.850 \times 10^{-4}$ | $1.002 \times 10^{-3}$ |
| 55 | 0.2192 | 0.4223 | $5.931 \times 10^{-4}$ | $1.000 \times 10^{-3}$ |
| 60 | 0.2235 | 0.4236 | $6.012 \times 10^{-4}$ | $9.983 \times 10^{-4}$ |
| 65 | 0.2278 | 0.4248 | $6.093 \times 10^{-4}$ | $9.965 \times 10^{-4}$ |
| 70 | 0.2321 | 0.4260 | $6.173 \times 10^{-4}$ | $9.947 \times 10^{-4}$ |
| 75 | 0.2377 | 0.4272 | $6.254 \times 10^{-4}$ | $9.929 \times 10^{-4}$ |
| 80 | 0.2409 | 0.4283 | $6.335 \times 10^{-4}$ | $9.910 \times 10^{-4}$ |
| 85 | 0.2454 | 0.4293 | $6.415 \times 10^{-4}$ | $9.892 \times 10^{-4}$ |
| 90 | 0.2499 | 0.4303 | $6.496 \times 10^{-4}$ | $9.874 \times 10^{-4}$ |
| 95 | 0.2545 | 0.4312 | $6.577 \times 10^{-4}$ | $9.855 \times 10^{-4}$ |
| 100 | 0.2592 | 0.4321 | $6.658 \times 10^{-4}$ | $9.836 \times 10^{-4}$ |
| 105 | 0.2639 | 0.4329 | $6.740 \times 10^{-4}$ | $9.820 \times 10^{-4}$ |
| 110 | 0.2687 | 0.4336 | $.6821 \times 10^{-4}$ | $9.800 \times 10^{-4}$ |
| 115 | 0.2735 | 0.4342 | $6.903 \times 10^{-4}$ | $9.777 \times 10^{-4}$ |
| 120 | 0.2784 | 0.4347 | $6.986 \times 10^{-4}$ | $9.755 \times 10^{-4}$ |
| 125 | 0.2835 | 0.4351 | $7.070 \times 10^{-4}$ | $9.732 \times 10^{-4}$ |

TABLE 11

Temperature, Pressure, Density, Enthalpy and Entropy Values for Example 3.

| Temp. (° F.) | Liquid Phase Pressure (psia) | Vapor Phase Pressure (psia) | Liquid Phase Density (g/cm³) | Vapor Phase Density (g/cm³) |
|---|---|---|---|---|
| −60 | 20.47 | 6.840 | 1.352 | $2.097 \times 10^{-3}$ |
| −55 | 23.12 | 8.006 | 1.344 | $2.430 \times 10^{-3}$ |
| −50 | 26.04 | 9.328 | 1.336 | $2.804 \times 10^{-3}$ |
| −45 | 29.23 | 10.82 | 1.327 | $3.222 \times 10^{-3}$ |
| −40 | 32.71 | 12.50 | 1.319 | $3.689 \times 10^{-3}$ |
| −35 | 36.49 | 14.37 | 1.310 | $4.207 \times 10^{-3}$ |
| −30 | 40.61 | 16.47 | 1.302 | $4.780 \times 10^{-3}$ |
| −25 | 45.06 | 18.80 | 1.293 | $5.414 \times 10^{-3}$ |
| −20 | 49.88 | 21.38 | 1.284 | $6.113 \times 10^{-3}$ |
| −15 | 55.07 | 24.23 | 1.275 | $6.881 \times 10^{-3}$ |
| −10 | 60.66 | 27.38 | 1.266 | $7.722 \times 10^{-3}$ |
| −5 | 66.66 | 30.84 | 1.257 | $8.643 \times 10^{-3}$ |
| 0 | 73.10 | 34.63 | 1.248 | $9.649 \times 10^{-3}$ |
| 5 | 79.98 | 38.77 | 1.239 | 0.01075 |
| 10 | 87.34 | 43.29 | 1.230 | 0.01194 |
| 15 | 95.19 | 48.21 | 1.220 | 0.01323 |
| 20 | 103.5 | 53.56 | 1.211 | 0.01464 |
| 25 | 112.4 | 59.34 | 1.201 | 0.01616 |
| 30 | 121.8 | 65.60 | 1.191 | 0.01780 |
| 35 | 131.8 | 72.36 | 1.181 | 0.01958 |
| 40 | 142. | 79.64 | 1.171 | 0.02150 |
| 45 | 153.6 | 87.47 | 1.160 | 0.02357 |
| 50 | 165.4 | 95.87 | 1.150 | 0.02580 |
| 55 | 177.8 | 104.9 | 1.139 | 0.02821 |
| 60 | 190.9 | 114.5 | 1.128 | 0.03079 |
| 65 | 204.7 | 124.9 | 1.117 | 0.03358 |
| 70 | 219.1 | 135.9 | 1.105 | 0.03657 |
| 75 | 234.3 | 147.6 | 1.094 | 0.03979 |
| 80 | 250.2 | 160.1 | 1.082 | 0.04326 |
| 85 | 266.9 | 173.5 | 1.069 | 0.04699 |
| 90 | 284.3 | 187.6 | 1.057 | 0.05100 |
| 95 | 302.5 | 202.6 | 1.044 | 0.05532 |
| 100 | 321.6 | 218.6 | 1.030 | 0.05998 |
| 105 | 341.4 | 235.6 | 1.017 | 0.06501 |
| 110 | 362.1 | 253.4 | 1.002 | 0.07044 |
| 115 | 383.6 | 272.3 | 0.9876 | 0.07631 |
| 120 | 406.0 | 292.4 | 0.9722 | 0.08267 |
| 125 | 429.2 | 313.6 | 0.9562 | 0.08959 |

| Temp. (° F.) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|
| −60 | 0.1281 | 0.3859 | 0.0003951 | $1.067 \times 10^{-3}$ |
| −55 | 0.1318 | 0.3876 | 0.0004044 | $1.062 \times 10^{-3}$ |
| −50 | 0.1356 | 0.3890 | 0.0004137 | $1.058 \times 10^{-3}$ |
| −45 | 0.1394 | 0.3912 | $4.229 \times 10^{-4}$ | $1.054 \times 10^{-3}$ |
| −40 | 0.1432 | 0.3929 | $4.319 \times 10^{-4}$ | $1.050 \times 10^{-3}$ |
| −35 | 0.1471 | 0.3946 | $4.410 \times 10^{-4}$ | $1.047 \times 10^{-3}$ |
| −30 | 0.1509 | 0.3964 | $4.508 \times 10^{-4}$ | $1.043 \times 10^{-3}$ |
| −25 | 0.1547 | 0.3981 | $4.587 \times 10^{-4}$ | $1.040 \times 10^{-3}$ |
| −20 | 0.1586 | 0.3998 | 0.0004675 | $1.037 \times 10^{-3}$ |

TABLE 11-continued

Temperature, Pressure, Density, Enthalpy and Entropy Values for Example 3.

| | | | | |
|---|---|---|---|---|
| −15 | 0.1625 | 0.4014 | $4762 \times 10^{-4}$ | $1.033 \times 10^{-3}$ |
| −10 | 0.1664 | 0.4031 | $4.849 \times 10^{-4}$ | $1.031 \times 10^{-3}$ |
| −5 | 0.1703 | 0.4047 | $4.935 \times 10^{-4}$ | $1.028 \times 10^{-3}$ |
| 0 | 0.1743 | 0.4064 | $5.020 \times 10^{-4}$ | $1.025 \times 10^{-3}$ |
| 5 | 0.1782 | 0.4080 | $5.105 \times 10^{-4}$ | $1.022 \times 10^{-3}$ |
| 10 | 0.1822 | 0.4095 | $5.189 \times 10^{-4}$ | $1.020 \times 10^{-3}$ |
| 15 | 0.1862 | 0.4111 | $5.273 \times 10^{-4}$ | $1.018 \times 10^{-3}$ |
| 20 | 0.1902 | 0.4126 | $5.357 \times 10^{-4}$ | $1.015 \times 10^{-3}$ |
| 25 | 0.1943 | 0.4142 | $5.440 \times 10^{-4}$ | $1.013 \times 10^{-3}$ |
| 30 | 0.1984 | 0.4156 | $5.523 \times 10^{-4}$ | $1.011 \times 10^{-3}$ |
| 35 | 0.2025 | 0.4171 | $5.605 \times 10^{-4}$ | $1.009 \times 10^{-3}$ |
| 40 | 0.2066 | 0.4185 | $5.687 \times 10^{-4}$ | $1.007 \times 10^{-3}$ |
| 45 | 0.2108 | 0.4199 | $5.769 \times 10^{-4}$ | $1.005 \times 10^{-3}$ |
| 50 | 0.2150 | 0.4213 | $5.850 \times 10^{-4}$ | $1.003 \times 10^{-3}$ |
| 55 | 0.2192 | 0.4226 | $5.931 \times 10^{-4}$ | $1.001 \times 10^{-3}$ |
| 60 | 0.2235 | 0.4239 | $6.012 \times 10^{-4}$ | $9.988 \times 10^{-4}$ |
| 65 | 0.2278 | 0.4251 | $6.093 \times 10^{-4}$ | $9.969 \times 10^{-4}$ |
| 70 | 0.2321 | 0.4263 | $6.174 \times 10^{-4}$ | $9.951 \times 10^{-4}$ |
| 75 | 0.2365 | 0.4274 | $6.255 \times 10^{-4}$ | $9.932 \times 10^{-4}$ |
| 80 | 0.2410 | 0.4285 | $6.335 \times 10^{-4}$ | $9.914 \times 10^{-4}$ |
| 85 | 0.2454 | 0.4296 | $6.416 \times 10^{-4}$ | $9.895 \times 10^{-4}$ |
| 90 | 0.2500 | 0.4306 | $6.497 \times 10^{-4}$ | $9.877 \times 10^{-4}$ |
| 95 | 0.2546 | 0.4315 | $6.578 \times 10^{-4}$ | $9.858 \times 10^{-4}$ |
| 100 | 0.2592 | 0.4323 | $6.659 \times 10^{-4}$ | $9.839 \times 10^{-4}$ |
| 105 | 0.2639 | 0.4331 | $6.740 \times 10^{-4}$ | $9.819 \times 10^{-4}$ |
| 110 | 0.2687 | 0.4338 | $6.822 \times 10^{-4}$ | $9.799 \times 10^{-4}$ |
| 115 | 0.2736 | 0.4343 | $6.905 \times 10^{-4}$ | $9.778 \times 10^{-4}$ |
| 120 | 0.2785 | 0.4348 | $6.987 \times 10^{-4}$ | $9.757 \times 10^{-4}$ |
| 125 | 0.2835 | 0.4352 | $7.070 \times 10^{-4}$ | $9.734 \times 10^{-4}$ |

TABLE 12

Temperature, Pressure, Density, Enthalpy and Entropy Values for Example 4.

| Temp. (° F.) | Liquid Phase Pressure (psia) | Vapor Phase Pressure (psia) | Liquid Phase Density (g/cm³) | Vapor Phase Density (g/cm³) |
|---|---|---|---|---|
| −60 | 20.70 | 6.950 | 1.354 | $2.136 \times 10^{-3}$ |
| −55 | 23.38 | 8.133 | 1.345 | $2.475 \times 10^{-3}$ |
| −50 | 26.32 | 9.473 | 1.337 | $2.855 \times 10^{-3}$ |
| −45 | 29.54 | 10.99 | 1.329 | $3.281 \times 10^{-3}$ |
| −40 | 33.06 | 12.69 | 1.320 | $3.755 \times 10^{-3}$ |
| −35 | 36.89 | 14.59 | 1.311 | $4.282 \times 10^{-3}$ |
| −30 | 41.04 | 16.71 | 1.303 | $4.865 \times 10^{-3}$ |
| −25 | 45.54 | 19.07 | 1.294 | $5.509 \times 10^{-3}$ |
| −20 | 50.40 | 21.69 | 1.285 | $6.219 \times 10^{-3}$ |
| −15 | 55.65 | 24.58 | 1.276 | $6.999 \times 10^{-3}$ |
| −10 | 61.29 | 27.77 | 1.267 | $7.855 \times 10^{-3}$ |
| −5 | 67.35 | 31.27 | 1.258 | $8.790 \times 10^{-3}$ |
| 0 | 73.85 | 35.11 | 1.249 | $9.812 \times 10^{-3}$ |
| 5 | 80.80 | 39.31 | 1.240 | 0.01093 |
| 10 | 88.23 | 43.88 | 1.231 | 0.01214 |
| 15 | 96.15 | 48.86 | 1.221 | 0.01345 |
| 20 | 104.6 | 54.27 | 1.211 | 0.01488 |
| 25 | 113.5 | 60.13 | 1.202 | 0.01642 |
| 30 | 123.1 | 66.46 | 1.192 | 0.01810 |
| 35 | 133.1 | 73.29 | 1.181 | 0.01990 |
| 40 | 143.8 | 80.66 | 1.171 | 0.02185 |
| 45 | 155.1 | 88.58 | 1.161 | 0.02395 |
| 50 | 167.0 | 97.08 | 1.150 | 0.02622 |
| 55 | 179.5 | 106.2 | 1.139 | 0.02866 |
| 60 | 192.7 | 116.0 | 1.128 | 0.03129 |
| 65 | 206.6 | 126.4 | 1.117 | 0.03412 |
| 70 | 221.2 | 137.5 | 1.105 | 0.03716 |
| 75 | 236.5 | 149.4 | 1.094 | 0.04043 |
| 80 | 252.6 | 162.1 | 1.082 | 0.04395 |
| 85 | 269.4 | 175.5 | 1.069 | 0.04774 |
| 90 | 286.9 | 189.8 | 1.057 | 0.05182 |
| 95 | 305.3 | 205.0 | 1.043 | 0.05622 |
| 100 | 324.5 | 221.1 | 1.030 | 0.06096 |
| 105 | 344.5 | 238.2 | 1.016 | 0.06607 |

TABLE 12-continued

Temperature, Pressure, Density, Enthalpy and Entropy Values for Example 4.

| | | | | |
|---|---|---|---|---|
| 110 | 365.3 | 256.3 | 1.001 | 0.07160 |
| 115 | 387.0 | 275.5 | 0.9866 | 0.07758 |
| 120 | 409.6 | 295.8 | 0.9711 | 0.08406 |
| 125 | 433.0 | 317.2 | 0.9548 | 0.09111 |

| Temp. (° F.) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|
| −60 | 0.1282 | 0.3847 | $3.953 \times 10^{-4}$ | $1.064 \times 10^{-3}$ |
| −55 | 0.1319 | 0.3864 | $4.047 \times 10^{-4}$ | $1.059 \times 10^{-3}$ |
| −50 | 0.1357 | 0.3882 | $4.139 \times 10^{-4}$ | $1.055 \times 10^{-3}$ |
| −45 | 0.1395 | 0.3899 | $4.231 \times 10^{-4}$ | $1.051 \times 10^{-3}$ |
| −40 | 0.1433 | 0.3917 | $4.321 \times 10^{-4}$ | $1.047 \times 10^{-3}$ |
| −35 | 0.1471 | 0.3934 | $4.411 \times 10^{-4}$ | $1.048 \times 10^{-3}$ |
| −30 | 0.1510 | 0.3951 | $4.500 \times 10^{-4}$ | $1.040 \times 10^{-3}$ |
| −25 | 0.1549 | 0.3968 | $4.589 \times 10^{-4}$ | $1.037 \times 10^{-3}$ |
| −20 | 0.1587 | 0.3985 | $4.676 \times 10^{-4}$ | $1.034 \times 10^{-3}$ |
| −15 | 0.1625 | 0.4002 | $4.763 \times 10^{-4}$ | $1.031 \times 10^{-3}$ |
| −10 | 0.1664 | 0.4018 | $4.850 \times 10^{-4}$ | $1.028 \times 10^{-3}$ |
| −5 | 0.1703 | 0.4035 | $4.936 \times 10^{-4}$ | $1.025 \times 10^{-3}$ |
| 0 | 0.1743 | 0.4051 | $5.021 \times 10^{-4}$ | $1.022 \times 10^{-3}$ |
| 5 | 0.1782 | 0.4067 | $5.106 \times 10^{-4}$ | $1.020 \times 10^{-3}$ |
| 10 | 0.1822 | 0.4083 | $5.190 \times 10^{-4}$ | $1.017 \times 10^{-3}$ |
| 15 | 0.1862 | 0.4098 | $5.274 \times 10^{-4}$ | $1.015 \times 10^{-3}$ |
| 20 | 0.1902 | 0.4114 | $5.357 \times 10^{-4}$ | $1.013 \times 10^{-3}$ |
| 25 | 0.1943 | 0.4129 | $5.440 \times 10^{-4}$ | $1.010 \times 10^{-3}$ |
| 30 | 0.1984 | 0.4144 | $5.523 \times 10^{-4}$ | $1.008 \times 10^{-3}$ |
| 35 | 0.2025 | 0.4158 | $5.605 \times 10^{-4}$ | $1.010 \times 10^{-3}$ |
| 40 | 0.2066 | 0.4172 | $5.687 \times 10^{-4}$ | $1.004 \times 10^{-3}$ |
| 45 | 0.2108 | 0.4186 | $5.768 \times 10^{-4}$ | $1.002 \times 10^{-3}$ |
| 50 | 0.2150 | 0.4200 | $5.850 \times 10^{-4}$ | $1.000 \times 10^{-3}$ |
| 55 | 0.2192 | 0.4213 | $5.931 \times 10^{-4}$ | $9.981 \times 10^{-4}$ |
| 60 | 0.2235 | 0.4225 | $6.012 \times 10^{-4}$ | $9.962 \times 10^{-4}$ |
| 65 | 0.2278 | 0.4238 | $6.093 \times 10^{-4}$ | $9.943 \times 10^{-4}$ |
| 70 | 0.2321 | 0.4250 | $6.173 \times 10^{-4}$ | $9.925 \times 10^{-4}$ |
| 75 | 0.2370 | 0.4261 | $6,254 \times 10^{-4}$ | $9.907 \times 10^{-4}$ |
| 80 | 0.2409 | 0.4272 | $6.335 \times 10^{-4}$ | $9.888 \times 10^{-4}$ |
| 85 | 0.2454 | 0.4282 | $6.415 \times 10^{-4}$ | $9.870 \times 10^{-4}$ |
| 90 | 0.2500 | 0.4292 | $6.496 \times 10^{-4}$ | $9.851 \times 10^{-4}$ |
| 95 | 0.2545 | 0.4301 | $6.578 \times 10^{-4}$ | $9.832 \times 10^{-4}$ |
| 100 | 0.2592 | 0.4309 | $6.658 \times 10^{-4}$ | $9.813 \times 10^{-4}$ |
| 105 | 0.2639 | 0.4317 | $6.740 \times 10^{-4}$ | $9.794 \times 10^{-4}$ |
| 110 | 0.2690 | 0.4323 | $6.822 \times 10^{-4}$ | $9.773 \times 10^{-4}$ |
| 115 | 0.2736 | 0.4329 | $6.904 \times 10^{-4}$ | $9.752 \times 10^{-4}$ |
| 120 | 0.2785 | 0.4334 | $6.987 \times 10^{-4}$ | $9.731 \times 10^{-4}$ |
| 125 | 0.2834 | 0.4337 | $7.071 \times 10^{-4}$ | $9.708 \times 10^{-4}$ |

TABLE 13

Temperature, Pressure, Density, Enthalpy and Entrop Values for Example 5.

| Temp. (° F.) | Liquid Phase Pressure (psia) | Vapor Phase Pressure (psia) | Liquid Phase Density (g/cm³) | Vapor Density Phase (g/cm³) |
|---|---|---|---|---|
| −60 | 20.63 | 7.063 | 1.350 | $2.142 \times 10^{-3}$ |
| −55 | 23.31 | 8.264 | 1.342 | $2.481 \times 10^{-3}$ |
| −50 | 26.26 | 9.625 | 1.334 | $2.863 \times 10^{-3}$ |
| −45 | 29.48 | 11.16 | 1.325 | $3.289 \times 10^{-3}$ |
| −40 | 33.00 | 12.89 | 1.317 | $3.764 \times 10^{-3}$ |
| −35 | 36.83 | 14.82 | 1.308 | $4.291 \times 10^{-3}$ |
| −30 | 41.00 | 16.97 | 1.300 | $4.875 \times 10^{-3}$ |
| −25 | 45.51 | 19.37 | 1.291 | $5.521 \times 10^{-3}$ |
| −20 | 50.38 | 22.02 | 1.282 | $6.231 \times 10^{-3}$ |
| −15 | 55.64 | 24.96 | 1.273 | $7.012 \times 10^{-3}$ |
| −10 | 61.31 | 28.19 | 1.264 | $7.869 \times 10^{-3}$ |
| −5 | 67.39 | 31.74 | 1.255 | $8.805 \times 10^{-3}$ |
| 0 | 73.92 | 35.63 | 1.246 | $9.828 \times 10^{-3}$ |
| 5 | 80.80 | 39.89 | 1.237 | 0.0109 |
| 10 | 88.36 | 44.52 | 1.227 | 0.0122 |

TABLE 13-continued

Temperature, Pressure, Density, Enthalpy and Entrop Values for Example 5.

| | | | | |
|---|---|---|---|---|
| 15 | 96.32 | 49.57 | 1.218 | 0.0138 |
| 20 | 104.8 | 55.05 | 1.208 | 0.0149 |
| 25 | 113.8 | 60.98 | 1.198 | 0.0165 |
| 30 | 123.4 | 67.40 | 1.188 | 0.0181 |
| 35 | 133.5 | 74.32 | 1.178 | 0.0199 |
| 40 | 144.2 | 81.78 | 1.168 | 0.0219 |
| 45 | 155.6 | 89.80 | 1.158 | 0.0240 |
| 50 | 167.6 | 98.41 | 1.147 | 0.0263 |
| 55 | 180.2 | 107.6 | 1.136 | 0.0287 |
| 60 | 193.5 | 117.5 | 1.125 | 0.0313 |
| 65 | 207.5 | 128.1 | 1.114 | 0.0342 |
| 70 | 222.2 | 139.4 | 1.102 | 0.0372 |
| 75 | 237.6 | 151.4 | 1.091 | 0.0405 |
| 80 | 253.8 | 164.2 | 1.079 | 0.0440 |
| 85 | 270.7 | 177.8 | 1.066 | 0.0478 |
| 90 | 288.4 | 192.3 | 1.053 | 0.05187 |
| 95 | 307.0 | 207.7 | 1.040 | 0.05626 |
| 100 | 326.3 | 224.0 | 1.027 | 0.06101 |
| 105 | 346.5 | 241.2 | 1.013 | 0.06612 |
| 110 | 367.5 | 259.5 | 0.9985 | 0.07165 |
| 115 | 389.4 | 278.9 | 0.9835 | 0.07764 |
| 120 | 412.2 | 299.4 | 0.9680 | 0.08413 |
| 125 | 435.8 | 321.1 | 0.9517 | 0.09119 |

| Temp. (° F.) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|
| −60 | 0.1279 | 0.3874 | $3.946 \times 10^{-4}$ | $3.919 \times 10^{-4}$ |
| −55 | 0.1316 | 0.3892 | $4.040 \times 10^{-4}$ | $4.014 \times 10^{-4}$ |
| −50 | 0.1354 | 0.3909 | $4.133 \times 10^{-4}$ | $4.109 \times 10^{-4}$ |
| −45 | 0.1392 | 0.3927 | $4.225 \times 10^{-4}$ | $4.202 \times 10^{-4}$ |
| −40 | 0.1431 | 0.3944 | $4.316 \times 10^{-4}$ | $4.294 \times 10^{-4}$ |
| −35 | 0.1469 | 0.3961 | $4.406 \times 10^{-4}$ | $4.386 \times 10^{-4}$ |
| −30 | 0.1507 | 0.3978 | $4.496 \times 10^{-4}$ | $4.477 \times 10^{-4}$ |
| −25 | 0.1556 | 0.3995 | $4.584 \times 10^{-4}$ | $4.567 \times 10^{-4}$ |
| −20 | 0.1585 | 0.4012 | $4.673 \times 10^{-4}$ | $4.657 \times 10^{-4}$ |
| −15 | 0.1624 | 0.4029 | $4.760 \times 10^{-4}$ | $4.746 \times 10^{-4}$ |
| −10 | 0.1663 | 0.4045 | $4.847 \times 10^{-4}$ | $4.834 \times 10^{-4}$ |
| −5 | 0.1702 | 0.4061 | $4.933 \times 10^{-4}$ | $4.922 \times 10^{-4}$ |
| 0 | 0.1742 | 0.4077 | $5.019 \times 10^{-4}$ | $5.009 \times 10^{-4}$ |
| 5 | 0.1781 | 0.4093 | $5.104 \times 10^{-4}$ | $5.096 \times 10^{-4}$ |
| 10 | 0.1821 | 0.4109 | $5.189 \times 10^{-4}$ | $5.182 \times 10^{-4}$ |
| 15 | 0.1862 | 0.4124 | $5.273 \times 10^{-4}$ | $5.268 \times 10^{-4}$ |
| 20 | 0.1902 | 0.4139 | $5.356 \times 10^{-4}$ | $5.353 \times 10^{-4}$ |
| 25 | 0.1943 | 0.4154 | $5.440 \times 10^{-4}$ | $5.434 \times 10^{-4}$ |
| 30 | 0.1984 | 0.4169 | $5.523 \times 10^{-4}$ | $5.522 \times 10^{-4}$ |
| 35 | 0.2025 | 0.4183 | $5.605 \times 10^{-4}$ | $5.606 \times 10^{-4}$ |
| 40 | 0.2066 | 0.4197 | $5.687 \times 10^{-4}$ | $5.690 \times 10^{-4}$ |
| 45 | 0.2108 | 0.4211 | $5.769 \times 10^{-4}$ | $5.773 \times 10^{-4}$ |
| 50 | 0.2150 | 0.4224 | $5.851 \times 10^{-4}$ | $5.857 \times 10^{-4}$ |
| 55 | 0.2193 | 0.4237 | $5.933 \times 10^{-4}$ | $5.940 \times 10^{-4}$ |
| 60 | 0.2236 | 0.4250 | $6.014 \times 10^{-4}$ | $6.023 \times 10^{-4}$ |
| 65 | 0.2279 | 0.4262 | $6.095 \times 10^{-4}$ | $6.106 \times 10^{-4}$ |
| 70 | 0.2323 | 0.4273 | $6.176 \times 10^{-4}$ | $6.189 \times 10^{-4}$ |
| 75 | 0.2367 | 0.4285 | $6.257 \times 10^{-4}$ | $6.271 \times 10^{-4}$ |
| 80 | 0.2411 | 0.4295 | $6.338 \times 10^{-4}$ | $6.354 \times 10^{-4}$ |
| 85 | 0.2456 | 0.4305 | $6.419 \times 10^{-4}$ | $6.437 \times 10^{-4}$ |
| 90 | 0.2502 | 0.4315 | $6.501 \times 10^{-4}$ | $6.520 \times 10^{-4}$ |
| 95 | 0.2548 | 0.4323 | $6.582 \times 10^{-4}$ | $6.603 \times 10^{-4}$ |
| 100 | 0.2595 | 0.4331 | $6.664 \times 10^{-4}$ | $6.687 \times 10^{-4}$ |
| 105 | 0.2642 | 0.4338 | $6.745 \times 10^{-4}$ | $6.770 \times 10^{-4}$ |
| 110 | 0.2690 | 0.4345 | $6.828 \times 10^{-4}$ | $6.855 \times 10^{-4}$ |
| 115 | 0.2739 | 0.4350 | $6.911 \times 10^{-4}$ | $6.939 \times 10^{-4}$ |
| 120 | 0.2790 | 0.4355 | $6.994 \times 10^{-4}$ | $7.025 \times 10^{-4}$ |
| 125 | 0.2840 | 0.4358 | $7.078 \times 10^{-4}$ | $7.111 \times 10^{-4}$ |

TABLE 14

Temperature, Pressure, Density, Enthalpy and Entropy Values for Example 6.

| Temp. (° F.) | Liquid Phase Pressure (psia) | Vapor Phase Pressure (psia) | Liquid Phase Density (g/cm³) | Vapor Phase Density (g/cm³) |
|---|---|---|---|---|
| −60 | 22.71 | 6.918 | 1.290 | $2.085 \times 10^{-3}$ |
| −55 | 25.56 | 8.098 | 1.282 | $2.417 \times 10^{-3}$ |
| −50 | 28.67 | 9.434 | 1.274 | $2.789 \times 10^{-3}$ |
| −45 | 32.06 | 10.94 | 1.266 | $3.205 \times 10^{-3}$ |
| −40 | 35.76 | 12.64 | 1.258 | $3.668 \times 10^{-3}$ |
| −35 | 39.77 | 14.54 | 1.250 | $4.184 \times 10^{-3}$ |
| −30 | 44.12 | 16.66 | 1.242 | $4.755 \times 10^{-3}$ |
| −25 | 48.80 | 19.01 | 1.233 | $5.385 \times 10^{-3}$ |
| −20 | 53.86 | 21.63 | 1.225 | $6.081 \times 10^{-3}$ |
| −15 | 59.30 | 24.52 | 1.216 | $6.844 \times 10^{-3}$ |
| −10 | 65.14 | 27.70 | 1.208 | $7.682 \times 10^{-3}$ |
| −5 | 71.40 | 31.20 | 1.199 | $8.599 \times 10^{-3}$ |
| 0 | 78.10 | 35.04 | 1.190 | $9.600 \times 10^{-3}$ |
| 5 | 85.26 | 39.23 | 1.181 | 0.01069 |
| 10 | 92.88 | 43.80 | 1.172 | 0.01188 |
| 15 | 101.0 | 48.78 | 1.163 | 0.01317 |
| 20 | 109.6 | 54.19 | 1.154 | 0.01457 |
| 25 | 118.8 | 60.04 | 1.144 | 0.01608 |
| 30 | 128.5 | 66.38 | 1.135 | 0.01772 |
| 35 | 138.8 | 73.21 | 1.125 | 0.01950 |
| 40 | 149.6 | 80.58 | 1.115 | 0.02141 |
| 45 | 161.0 | 88.50 | 1.105 | 0.02347 |
| 50 | 173.1 | 97.01 | 1.095 | 0.02570 |
| 55 | 185.8 | 106.1 | 1.084 | 0.02810 |
| 60 | 199.2 | 116.0 | 1.075 | 0.03068 |
| 65 | 213.1 | 126.3 | 1.063 | 0.03346 |
| 70 | 227.9 | 137.5 | 1.052 | 0.03645 |
| 75 | 243.3 | 149.4 | 1.040 | 0.03967 |
| 80 | 259.5 | 162.1 | 1.029 | 0.04314 |
| 85 | 276.4 | 175.5 | 1.017 | 0.04687 |
| 90 | 294.0 | 189.9 | 1.004 | 0.05089 |
| 95 | 312.4 | 205.1 | 0.9912 | 0.05522 |
| 100 | 331.6 | 221.2 | 0.9786 | 0.05990 |
| 105 | 351.6 | 238.3 | 0.9651 | 0.06495 |
| 110 | 372.5 | 256.5 | 0.9511 | 0.07041 |
| 115 | 394.1 | 275.7 | 0.9366 | 0.07632 |
| 120 | 416.6 | 296.0 | 0.9214 | 0.08275 |
| 125 | 440.0 | 317.6 | 0.9056 | 0.08974 |

| Temp. (° F.) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|
| −60 | 0.1266 | 0.3845 | $3.919 \times 10^{-4}$ | $1.071 \times 10^{-3}$ |
| −55 | 0.1304 | 0.3863 | $4.014 \times 10^{-4}$ | $1.066 \times 10^{-3}$ |
| −50 | 0.1343 | 0.3881 | $4.109 \times 10^{-4}$ | $1.062 \times 10^{-3}$ |
| −45 | 0.1382 | 0.3899 | $4.202 \times 10^{-4}$ | $1.058 \times 10^{-3}$ |
| −40 | 0.1420 | 0.3917 | $4.294 \times 10^{-4}$ | $1.054 \times 10^{-3}$ |
| −35 | 0.1459 | 0.3935 | $4.399 \times 10^{-4}$ | $1.050 \times 10^{-3}$ |
| −30 | 0.1498 | 0.3953 | $4.480 \times 10^{-4}$ | $1.047 \times 10^{-3}$ |
| −25 | 0.1539 | 0.3971 | $4.567 \times 10^{-4}$ | $1.043 \times 10^{-3}$ |
| −20 | 0.1577 | 0.3988 | $4.657 \times 10^{-4}$ | $1.040 \times 10^{-3}$ |
| −15 | 0.1617 | 0.4006 | $4.746 \times 10^{-4}$ | $1.037 \times 10^{-3}$ |
| −10 | 0.1657 | 0.4023 | $4.834 \times 10^{-4}$ | $1.034 \times 10^{-3}$ |
| −5 | 0.1697 | 0.4040 | $4.922 \times 10^{-4}$ | $1.031 \times 10^{-3}$ |
| 0 | 0.1737 | 0.4057 | $5.009 \times 10^{-4}$ | $1.028 \times 10^{-3}$ |
| 5 | 0.1777 | 0.4074 | $5.096 \times 10^{-4}$ | $1.025 \times 10^{-3}$ |
| 10 | 0.1818 | 0.4090 | $5.182 \times 10^{-4}$ | $1.023 \times 10^{-3}$ |
| 15 | 0.1859 | 0.4106 | $5.267 \times 10^{-4}$ | $1.020 \times 10^{-3}$ |
| 20 | 0.1900 | 0.4122 | $5.353 \times 10^{-4}$ | $1.018 \times 10^{-3}$ |
| 25 | 0.1940 | 0.4138 | $5.437 \times 10^{-4}$ | $1.016 \times 10^{-3}$ |
| 30 | 0.1983 | 0.4153 | $5.522 \times 10^{-4}$ | $1.013 \times 10^{-3}$ |
| 35 | 0.2025 | 0.4168 | $5.606 \times 10^{-4}$ | $1.011 \times 10^{-3}$ |
| 40 | 0.2068 | 0.4183 | $5.690 \times 10^{-4}$ | $1.009 \times 10^{-3}$ |
| 45 | 0.2110 | 0.4197 | $5.773 \times 10^{-4}$ | $1.007 \times 10^{-3}$ |
| 50 | 0.2153 | 0.4212 | $5.857 \times 10^{-4}$ | $1.005 \times 10^{-3}$ |
| 55 | 0.2197 | 0.4225 | $5.940 \times 10^{-4}$ | $1.003 \times 10^{-3}$ |
| 60 | 0.2240 | 0.4239 | $6.023 \times 10^{-4}$ | $1.001 \times 10^{-3}$ |
| 65 | 0.2285 | 0.4252 | $6.106 \times 10^{-4}$ | $9.989 \times 10^{-4}$ |
| 70 | 0.2329 | 0.4264 | $6.189 \times 10^{-4}$ | $9.970 \times 10^{-4}$ |
| 75 | 0.2374 | 0.4276 | $6.271 \times 10^{-4}$ | $9.951 \times 10^{-4}$ |

TABLE 14-continued

Temperature, Pressure, Density, Enthalpy and Entropy Values for Example 6.

| | | | | |
|---|---|---|---|---|
| 80  | 0.2420 | 0.4287 | $6.354 \times 10^{-4}$ | $9.932 \times 10^{-4}$ |
| 85  | 0.2466 | 0.4298 | $6.437 \times 10^{-4}$ | $9.912 \times 10^{-4}$ |
| 90  | 0.2513 | 0.4308 | $6.520 \times 10^{-4}$ | $9.893 \times 10^{-4}$ |
| 95  | 0.2560 | 0.4318 | $6.603 \times 10^{-4}$ | $9.873 \times 10^{-4}$ |
| 100 | 0.2608 | 0.4326 | $6.687 \times 10^{-4}$ | $9.853 \times 10^{-4}$ |
| 105 | 0.2656 | 0.4334 | $6.770 \times 10^{-4}$ | $9.832 \times 10^{-4}$ |
| 110 | 0.2705 | 0.4341 | $6.855 \times 10^{-4}$ | $9.811 \times 10^{-4}$ |
| 115 | 0.2755 | 0.4347 | $6.939 \times 10^{-4}$ | $9.789 \times 10^{-4}$ |
| 120 | 0.2806 | 0.4352 | $7.025 \times 10^{-4}$ | $9.767 \times 10^{-4}$ |
| 125 | 0.2859 | 0.4356 | $7.111 \times 10^{-4}$ | $9.743 \times 10^{-4}$ |

TABLE 15

Temperature, Pressure, Density, Enthalpy and Entropy Values for Example 7.

| Temp. (° F.) | Liquid Phase Pressure (psia) | Vapor Phase Pressure (psia) | Liquid Phase Density (g/cm$^3$) | Vapor Phase Density (g/cm$^3$) |
|---|---|---|---|---|
| −60 | 20.33 | 6.796 | 1.343 | $2.066 \times 10^{-3}$ |
| −55 | 22.97 | 7.954 | 1.335 | $2.394 \times 10^{-3}$ |
| −50 | 25.87 | 9.266 | 1.327 | $2.762 \times 10^{-3}$ |
| −45 | 29.03 | 10.75 | 1.318 | $3.173 \times 10^{-3}$ |
| −40 | 32.49 | 12.41 | 1.310 | $3.632 \times 10^{-3}$ |
| −35 | 36.26 | 14.27 | 1.301 | $4.141 \times 10^{-3}$ |
| −30 | 40.34 | 16.35 | 1.293 | $4.710 \times 10^{-3}$ |
| −25 | 44.77 | 18.66 | 1.284 | $5.330 \times 10^{-3}$ |
| −20 | 49.55 | 21.23 | 1.276 | $6.017 \times 10^{-3}$ |
| −15 | 54.71 | 24.06 | 1.267 | $6.772 \times 10^{-3}$ |
| −10 | 60.27 | 27.18 | 1.258 | $7.510 \times 10^{-3}$ |
| −5  | 66.23 | 30.61 | 1.249 | $8.505 \times 10^{-3}$ |
| 0   | 72.63 | 34.37 | 1.240 | $9.494 \times 10^{-3}$ |
| 5   | 79.48 | 38.49 | 1.231 | 0.01057 |
| 10  | 86.79 | 42.97 | 1.222 | 0.01174 |
| 15  | 94.58 | 47.85 | 1.212 | 0.01302 |
| 20  | 102.9 | 53.15 | 1.203 | 0.01440 |
| 25  | 111.7 | 58.89 | 1.193 | 0.01589 |
| 30  | 121.1 | 65.10 | 1.183 | 0.01751 |
| 35  | 131.0 | 71.81 | 1.173 | 0.01923 |
| 40  | 141.5 | 79.03 | 1.163 | 0.02115 |
| 45  | 152.6 | 86.80 | 1.153 | 0.02318 |
| 50  | 164.3 | 95.14 | 1.143 | 0.02537 |
| 55  | 176.7 | 104.1 | 1.132 | 0.02774 |
| 60  | 189.7 | 113.7 | 1.121 | 0.03028 |
| 65  | 203.4 | 123.9 | 1.110 | 0.03301 |
| 70  | 217.8 | 134.8 | 1.099 | 0.03595 |
| 75  | 232.9 | 146.5 | 1.087 | 0.03912 |
| 80  | 248.7 | 158.9 | 1.075 | 0.04252 |
| 85  | 265.2 | 172.1 | 1.063 | 0.04618 |
| 90  | 282.6 | 186.2 | 1.051 | 0.05012 |
| 95  | 300.7 | 201.1 | 1.038 | 0.05437 |
| 100 | 319.6 | 216.9 | 1.025 | 0.05894 |
| 105 | 339.3 | 233.6 | 1.011 | 0.06387 |
| 110 | 359.8 | 251.  | 0.9969 | 0.06919 |
| 115 | 381.2 | 270.2 | 0.9823 | 0.07495 |
| 120 | 403.5 | 290.1 | 0.9671 | 0.08119 |
| 125 | 426.6 | 311.2 | 0.9513 | 0.08796 |

| Temp. (° F.) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|
| −60 | 0.1277 | 0.3879 | $3.943 \times 10^{-4}$ | $1.072 \times 10^{-3}$ |
| −55 | 0.1315 | 0.3897 | $4.037 \times 10^{-4}$ | $1.068 \times 10^{-3}$ |
| −50 | 0.1353 | 0.3915 | $4.130 \times 10^{-4}$ | $1.063 \times 10^{-3}$ |
| −45 | 0.1391 | 0.3932 | $4.222 \times 10^{-4}$ | $1.059 \times 10^{-3}$ |
| −40 | 0.1430 | 0.3950 | $4.313 \times 10^{-4}$ | $1.055 \times 10^{-3}$ |
| −35 | 0.1468 | 0.3967 | $4.404 \times 10^{-4}$ | $1.052 \times 10^{-3}$ |
| −30 | 0.1507 | 0.3985 | $4.494 \times 10^{-4}$ | $1.005 \times 10^{-3}$ |
| −25 | 0.1545 | 0.4002 | $4.583 \times 10^{-4}$ | $1.045 \times 10^{-3}$ |
| −20 | 0.1584 | 0.4019 | $4.671 \times 10^{-4}$ | $1.041 \times 10^{-3}$ |
| −15 | 0.1623 | 0.4036 | $4.759 \times 10^{-4}$ | $1.038 \times 10^{-3}$ |
| −10 | 0.1662 | 0.4052 | $4.846 \times 10^{-4}$ | $1.035 \times 10^{-3}$ |
| −5  | 0.1702 | 0.4069 | $4.932 \times 10^{-4}$ | $1.032 \times 10^{-3}$ |
| 0   | 0.1741 | 0.4085 | $5.018 \times 10^{-4}$ | $1.030 \times 10^{-3}$ |
| 5   | 0.1781 | 0.4101 | $5.103 \times 10^{-4}$ | $1.027 \times 10^{-3}$ |
| 10  | 0.1821 | 0.4117 | $5.188 \times 10^{-4}$ | $1.025 \times 10^{-3}$ |
| 15  | 0.1861 | 0.4133 | $5.272 \times 10^{-4}$ | $1.022 \times 10^{-3}$ |
| 20  | 0.1902 | 0.4148 | $5.356 \times 10^{-4}$ | $1.020 \times 10^{-3}$ |
| 25  | 0.1943 | 0.4163 | $5.439 \times 10^{-4}$ | $1.018 \times 10^{-3}$ |
| 30  | 0.1984 | 0.4178 | $5.522 \times 10^{-4}$ | $1.015 \times 10^{-3}$ |
| 35  | 0.2025 | 0.4193 | $5.605 \times 10^{-4}$ | $1.013 \times 10^{-3}$ |
| 40  | 0.2066 | 0.4207 | $5.688 \times 10^{-4}$ | $1.011 \times 10^{-3}$ |
| 45  | 0.2108 | 0.4221 | $5.770 \times 10^{-4}$ | $1.009 \times 10^{-3}$ |
| 50  | 0.2150 | 0.4235 | $5.851 \times 10^{-4}$ | $1.007 \times 10^{-3}$ |
| 55  | 0.2193 | 0.4248 | $5.933 \times 10^{-4}$ | $1.005 \times 10^{-3}$ |
| 60  | 0.2236 | 0.4261 | $6.014 \times 10^{-4}$ | $1.003 \times 10^{-3}$ |
| 65  | 0.2279 | 0.4273 | $6.096 \times 10^{-4}$ | $1.001 \times 10^{-3}$ |
| 70  | 0.2323 | 0.4285 | $6.177 \times 10^{-4}$ | $9.994 \times 10^{-4}$ |
| 75  | 0.2367 | 0.4297 | $6.258 \times 10^{-4}$ | $9.975 \times 10^{-4}$ |
| 80  | 0.2411 | 0.4308 | $6.339 \times 10^{-4}$ | $9.957 \times 10^{-4}$ |
| 85  | 0.2456 | 0.4318 | $6.420 \times 10^{-4}$ | $9.938 \times 10^{-4}$ |
| 90  | 0.2502 | 0.4328 | $6.501 \times 10^{-4}$ | $9.919 \times 10^{-4}$ |
| 95  | 0.2548 | 0.4337 | $6.582 \times 10^{-4}$ | $9.900 \times 10^{-4}$ |
| 100 | 0.2595 | 0.4346 | $6.664 \times 10^{-4}$ | $9.881 \times 10^{-4}$ |
| 105 | 0.2642 | 0.4354 | $6.746 \times 10^{-4}$ | $9.861 \times 10^{-4}$ |
| 110 | 0.2690 | 0.4360 | $6.828 \times 10^{-4}$ | $9.841 \times 10^{-4}$ |
| 115 | 0.2739 | 0.4367 | $6.910 \times 10^{-4}$ | $9.820 \times 10^{-4}$ |
| 120 | 0.2788 | 0.4372 | $6.994 \times 10^{-4}$ | $9.800 \times 10^{-4}$ |
| 125 | 0.2839 | 0.4375 | $7.078 \times 10^{-4}$ | $9.775 \times 10^{-4}$ |

TABLE 16

Temperature, Pressure, Density, Enthalpy and Entropy Values for Example 8.

| Temp. (° F.) | Liquid Phase Pressure (psia) | Vapor Phase Pressure (psia) | Liquid Phase Density (g/cm$^3$) | Vapor Phase Density (g/cm$^3$) |
|---|---|---|---|---|
| −60 | 20.25 | 6.752 | 1.333 | $2.017 \times 10^{-3}$ |
| −55 | 22.89 | 7.903 | 1.325 | $2.336 \times 10^{-3}$ |
| −50 | 25.78 | 9.206 | 1.316 | $2.695 \times 10^{-3}$ |
| −45 | 28.94 | 10.68 | 1.308 | $3.096 \times 10^{-3}$ |
| −40 | 32.40 | 12.33 | 1.300 | $3.543 \times 10^{-3}$ |
| −35 | 36.16 | 14.18 | 1.292 | $4.039 \times 10^{-3}$ |
| −30 | 40.24 | 16.25 | 1.283 | $4.589 \times 10^{-3}$ |
| −25 | 44.66 | 18.55 | 1.275 | $5.206 \times 10^{-3}$ |
| −20 | 49.45 | 21.10 | 1.266 | $5.875 \times 10^{-3}$ |
| −15 | 54.61 | 23.92 | 1.258 | $6.600 \times 10^{-3}$ |
| −10 | 60.17 | 27.02 | 1.249 | $7.406 \times 10^{-3}$ |
| −5  | 66.14 | 30.43 | 1.240 | $8.288 \times 10^{-3}$ |
| 0   | 72.54 | 34.18 | 1.231 | $9.250 \times 10^{-3}$ |
| 5   | 79.39 | 38.27 | 1.222 | 0.01030 |
| 10  | 86.71 | 42.73 | 1.213 | 0.01144 |
| 15  | 94.52 | 47.59 | 1.204 | 0.01268 |
| 20  | 102.8 | 52.86 | 1.194 | 0.01402 |
| 25  | 111.7 | 58.58 | 1.185 | 0.01548 |
| 30  | 121.1 | 64.76 | 1.175 | 0.01705 |
| 35  | 131.0 | 71.44 | 1.166 | 0.01875 |
| 40  | 141.5 | 78.63 | 1.156 | 0.02058 |
| 45  | 152.7 | 86.36 | 1.145 | 0.02256 |
| 50  | 164.4 | 94.67 | 1.135 | 0.02469 |
| 55  | 176.8 | 103.6 | 1.125 | 0.02698 |
| 60  | 189.9 | 113.1 | 1.114 | 0.02945 |
| 65  | 203.6 | 123.3 | 1.103 | 0.03211 |
| 70  | 218.1 | 134.2 | 1.092 | 0.03496 |
| 75  | 233.2 | 145.8 | 1.081 | 0.03804 |
| 80  | 249.1 | 158.2 | 1.069 | 0.04134 |
| 85  | 265.7 | 171.4 | 1.057 | 0.04489 |
| 90  | 283.1 | 185.4 | 1.045 | 0.04869 |
| 95  | 301.3 | 200.2 | 1.032 | 0.05280 |
| 100 | 320.3 | 216.0 | 1.011 | 0.05722 |
| 105 | 340.2 | 232.7 | 1.006 | 0.06110 |

TABLE 16-continued

Temperature, Pressure, Density, Enthalpy and Entropy Values for Example 8.

| | | | | |
|---|---|---|---|---|
| 110 | 360.8 | 250.4 | 0.9924 | 0.06713 |
| 115 | 382.3 | 269.2 | 0.9781 | 0.07269 |
| 120 | 404.7 | 289.0 | 0.9633 | 0.07871 |
| 125 | 428.0 | 310.0 | 0.9477 | 0.08524 |

| Temp. (° F.) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|
| −60 | 0.1251 | 0.3910 | $4.795 \times 10^{-4}$ | $1.173 \times 10^{-3}$ |
| −55 | 0.1290 | 0.3928 | $4.890 \times 10^{-4}$ | $1.168 \times 10^{-3}$ |
| −50 | 0.1328 | 0.3946 | $4.985 \times 10^{-4}$ | $1.164 \times 10^{-3}$ |
| −45 | 0.1367 | 0.3964 | $5.078 \times 10^{-4}$ | $1.159 \times 10^{-3}$ |
| −40 | 0.1406 | 0.3982 | $5.170 \times 10^{-4}$ | $1.155 \times 10^{-3}$ |
| −35 | 0.1445 | 0.3999 | $5.262 \times 10^{-4}$ | $1.152 \times 10^{-3}$ |
| −30 | 0.1484 | 0.4017 | $5.353 \times 10^{-4}$ | $1.148 \times 10^{-3}$ |
| −25 | 0.1523 | 0.4034 | $5.443 \times 10^{-4}$ | $1.144 \times 10^{-3}$ |
| −20 | 0.1562 | 0.4051 | $5.532 \times 10^{-4}$ | $1.141 \times 10^{-3}$ |
| −15 | 0.1602 | 0.4068 | $5.621 \times 10^{-4}$ | $1.138 \times 10^{-3}$ |
| −10 | 0.1642 | 0.4085 | $5.710 \times 10^{-4}$ | $1.135 \times 10^{-3}$ |
| −5 | 0.1681 | 0.4102 | $5.797 \times 10^{-4}$ | $1.132 \times 10^{-3}$ |
| 0 | 0.1721 | 0.4119 | $5.883 \times 10^{-4}$ | $1.129 \times 10^{-3}$ |
| 5 | 0.1762 | 0.4135 | $5.970 \times 10^{-4}$ | $1.126 \times 10^{-3}$ |
| 10 | 0.1802 | 0.4151 | $6.056 \times 10^{-4}$ | $1.124 \times 10^{-3}$ |
| 15 | 0.1843 | 0.4167 | $6.141 \times 10^{-4}$ | $1.121 \times 10^{-3}$ |
| 20 | 0.1884 | 0.4183 | $6.226 \times 10^{-4}$ | $1.119 \times 10^{-3}$ |
| 25 | 0.1925 | 0.4198 | $6.310 \times 10^{-4}$ | $1.116 \times 10^{-3}$ |
| 30 | 0.1966 | 0.4213 | $6.394 \times 10^{-4}$ | $1.114 \times 10^{-3}$ |
| 35 | 0.2008 | 0.4228 | $6.478 \times 10^{-4}$ | $1.112 \times 10^{-3}$ |
| 40 | 0.2050 | 0.4243 | $6.561 \times 10^{-4}$ | $1.109 \times 10^{-3}$ |
| 45 | 0.2093 | 0.4257 | $6.644 \times 10^{-4}$ | $1.107 \times 10^{-3}$ |
| 50 | 0.2135 | 0.4271 | $6.727 \times 10^{-4}$ | $1.105 \times 10^{-3}$ |
| 55 | 0.2178 | 0.4284 | $6.810 \times 10^{-4}$ | $1.103 \times 10^{-3}$ |
| 60 | 0.2222 | 0.4297 | $6.892 \times 10^{-4}$ | $1.101 \times 10^{-3}$ |
| 65 | 0.2265 | 0.4310 | $6.974 \times 10^{-4}$ | $1.099 \times 10^{-3}$ |
| 70 | 0.2310 | 0.4322 | $7.056 \times 10^{-4}$ | $1.097 \times 10^{-3}$ |
| 75 | 0.2354 | 0.4334 | $7.138 \times 10^{-4}$ | $1.095 \times 10^{-3}$ |
| 80 | 0.2399 | 0.4345 | $7.220 \times 10^{-4}$ | $1.094 \times 10^{-3}$ |
| 85 | 0.2445 | 0.4356 | $7.302 \times 10^{-4}$ | $1.092 \times 10^{-3}$ |
| 90 | 0.2491 | 0.4366 | $7.384 \times 10^{-4}$ | $1.090 \times 10^{-3}$ |
| 95 | 0.2537 | 0.4376 | $7.466 \times 10^{-4}$ | $1.088 \times 10^{-3}$ |
| 100 | 0.2584 | 0.4385 | $7.548 \times 10^{-4}$ | $1.086 \times 10^{-3}$ |
| 105 | 0.2632 | 0.4392 | $7.631 \times 10^{-4}$ | $1.084 \times 10^{-3}$ |
| 110 | 0.2681 | 0.4399 | $7.714 \times 10^{-4}$ | $1.082 \times 10^{-3}$ |
| 115 | 0.2730 | 0.4406 | $7.797 \times 10^{-4}$ | $1.080 \times 10^{-3}$ |
| 120 | 0.2780 | 0.4411 | $7.881 \times 10^{-4}$ | $1.077 \times 10^{-3}$ |
| 125 | 0.2831 | 0.4415 | $7.966 \times 10^{-4}$ | $1.075 \times 10^{-3}$ |

The temperature, pressure, density, enthalpy and entropy values in Tables 9-16 compare favorably to those of R-410A, which are set forth in Table 17.

TABLE 17

Temperature, Pressure, Density, Enthalpy and Entropy Values for R-410A.

| Temp. (° F.) | Liquid Phase Pressure (psia) | Vapor Phase Pressure (psia) | Liquid Phase Density (g/cm³) | Vapor Phase Density (g/cm³) |
|---|---|---|---|---|
| −60 | 14.95 | 14.89 | 1.349 | $4.225 \times 10^{-3}$ |
| −55 | 17.17 | 17.10 | 1.340 | $4.816 \times 10^{-3}$ |
| −50 | 19.65 | 19.58 | 1.330 | $5.470 \times 10^{-3}$ |
| −45 | 22.41 | 22.32 | 1.322 | $6.193 \times 10^{-3}$ |
| −40 | 25.45 | 25.36 | 1.313 | $6.989 \times 10^{-3}$ |
| −35 | 28.82 | 28.71 | 1.304 | $7.863 \times 10^{-3}$ |
| −30 | 32.52 | 32.41 | 1.295 | $8.822 \times 10^{-3}$ |
| −25 | 36.58 | 36.45 | 1.285 | $9.872 \times 10^{-3}$ |
| −20 | 41.03 | 40.89 | 1.276 | 0.01102 |
| −15 | 45.88 | 45.72 | 1.267 | 0.01227 |
| −10 | 51.17 | 50.99 | 1.257 | 0.01363 |
| −5 | 56.91 | 56.71 | 1.247 | 0.01511 |
| 0 | 63.13 | 62.91 | 1.237 | 0.01671 |
| 5 | 69.86 | 69.62 | 1.227 | 0.01845 |
| 10 | 77.12 | 76.86 | 1.217 | 0.02033 |
| 15 | 84.95 | 84.66 | 1.207 | 0.02236 |
| 20 | 93.36 | 93.05 | 1.196 | 0.02460 |
| 25 | 102.4 | 102.1 | 1.185 | 0.02693 |
| 30 | 112.1 | 111.7 | 1.174 | 0.02950 |
| 35 | 122.4 | 122.0 | 1.163 | 0.03226 |
| 40 | 133.5 | 133.1 | 1.152 | 0.03524 |
| 45 | 145.3 | 144.8 | 1.140 | 0.03845 |
| 50 | 157.9 | 157.3 | 1.128 | 0.04192 |
| 55 | 171.2 | 170.7 | 1.116 | 0.04565 |
| 60 | 185.4 | 184.8 | 1.104 | 0.04969 |
| 65 | 200.5 | 199.8 | 1.091 | 0.05404 |
| 70 | 216.5 | 215.8 | 1.078 | 0.05874 |
| 75 | 233.4 | 232.6 | 1.064 | 0.06382 |
| 80 | 251.2 | 250.5 | 1.050 | 0.06933 |
| 85 | 270.1 | 269.3 | 1.036 | 0.07530 |
| 90 | 290.1 | 289.2 | 1.021 | 0.08179 |
| 95 | 311.1 | 310.2 | 1.005 | 0.08885 |
| 100 | 333.2 | 332.3 | 0.9889 | 0.09660 |
| 105 | 356.6 | 355.6 | 0.9719 | 0.1050 |
| 110 | 381.1 | 380.1 | 0.9540 | 0.1144 |
| 115 | 407.0 | 405.9 | 0.9352 | 0.1247 |
| 120 | 434.1 | 433.0 | 0.9152 | 0.1362 |
| 125 | 462.6 | 461.5 | 0.8937 | 0.1491 |

| Temp. (° F.) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|
| −60 | 0.1268 | 0.3994 | $3.922 \times 10^{-4}$ | $1.075 \times 10^{-3}$ |
| −55 | 0.1306 | 0.4009 | $4.017 \times 10^{-4}$ | $1.070 \times 10^{-3}$ |
| −50 | 0.1345 | 0.4023 | $4.111 \times 10^{-4}$ | $1.065 \times 10^{-3}$ |
| −45 | 0.1383 | 0.4037 | $4.204 \times 10^{-4}$ | $1.061 \times 10^{-3}$ |
| −40 | 0.1422 | 0.4050 | $4.296 \times 10^{-4}$ | $1.056 \times 10^{-3}$ |
| −35 | 0.1460 | 0.4064 | $4.387 \times 10^{-4}$ | $1.052 \times 10^{-3}$ |
| −30 | 0.1499 | 0.4077 | $4.478 \times 10^{-4}$ | $1.048 \times 10^{-3}$ |
| −25 | 0.1538 | 0.4090 | $4.568 \times 10^{-4}$ | $1.044 \times 10^{-3}$ |
| −20 | 0.1577 | 0.4103 | $4.657 \times 10^{-4}$ | $1.040 \times 10^{-3}$ |
| −15 | 0.1617 | 0.4115 | $4.745 \times 10^{-4}$ | $1.036 \times 10^{-3}$ |
| −10 | 0.1657 | 0.4127 | $4.833 \times 10^{-4}$ | $1.033 \times 10^{-3}$ |
| −5 | 0.1696 | 0.4139 | $4.921 \times 10^{-4}$ | $1.029 \times 10^{-3}$ |
| 0 | 0.1737 | 0.4150 | $5.008 \times 10^{-4}$ | $1.026 \times 10^{-3}$ |
| 5 | 0.1777 | 0.4161 | $5.095 \times 10^{-4}$ | $1.023 \times 10^{-3}$ |
| 10 | 0.1818 | 0.4172 | $5.181 \times 10^{-4}$ | $1.019 \times 10^{-3}$ |
| 15 | 0.1858 | 0.4182 | $5.266 \times 10^{-4}$ | $1.016 \times 10^{-3}$ |
| 20 | 0.1900 | 0.4192 | $5.352 \times 10^{-4}$ | $1.013 \times 10^{-3}$ |
| 25 | 0.1941 | 0.4201 | $5.437 \times 10^{-4}$ | $1.010 \times 10^{-3}$ |
| 30 | 0.1983 | 0.4210 | $5.522 \times 10^{-4}$ | $1.007 \times 10^{-3}$ |
| 35 | 0.2025 | 0.4218 | $5.606 \times 10^{-4}$ | $1.004 \times 10^{-3}$ |
| 40 | 0.2068 | 0.4226 | $5.691 \times 10^{-4}$ | $1.001 \times 10^{-3}$ |
| 45 | 0.2111 | 0.4233 | $5.775 \times 10^{-4}$ | $9.981 \times 10^{-4}$ |
| 50 | 0.2156 | 0.4240 | $5.859 \times 10^{-4}$ | $9.951 \times 10^{-4}$ |
| 55 | 0.2200 | 0.4246 | $5.944 \times 10^{-4}$ | $9.922 \times 10^{-4}$ |
| 60 | 0.2243 | 0.4251 | $6.028 \times 10^{-4}$ | $9.892 \times 10^{-4}$ |
| 65 | 0.2288 | 0.4255 | $6.112 \times 10^{-4}$ | $9.862 \times 10^{-4}$ |
| 70 | 0.2334 | 0.4259 | $6.197 \times 10^{-4}$ | $9.832 \times 10^{-4}$ |
| 75 | 0.2380 | 0.4261 | $6.282 \times 10^{-4}$ | $9.801 \times 10^{-4}$ |
| 80 | 0.2427 | 0.4263 | $6.367 \times 10^{-4}$ | $9.770 \times 10^{-4}$ |
| 85 | 0.2475 | 0.4263 | $6.453 \times 10^{-4}$ | $9.737 \times 10^{-4}$ |
| 90 | 0.2523 | 0.4262 | $6.539 \times 10^{-4}$ | $9.704 \times 10^{-4}$ |
| 95 | 0.2573 | 0.4260 | $6.625 \times 10^{-4}$ | $9.669 \times 10^{-4}$ |
| 100 | 0.2622 | 0.4257 | $6.713 \times 10^{-4}$ | $9.633 \times 10^{-4}$ |
| 105 | 0.2674 | 0.4251 | $6.801 \times 10^{-4}$ | $9.596 \times 10^{-4}$ |
| 110 | 0.2726 | 0.4244 | $6.890 \times 10^{-4}$ | $9.556 \times 10^{-4}$ |
| 115 | 0.2780 | 0.4235 | $6.981 \times 10^{-4}$ | $9.513 \times 10^{-4}$ |
| 120 | 0.2836 | 0.4223 | $7.074 \times 10^{-4}$ | $9.468 \times 10^{-4}$ |
| 125 | 0.2893 | 0.4208 | $7.169 \times 10^{-4}$ | $9.418 \times 10^{-4}$ |

An aspect of the disclosure is that at least one component of the refrigerant formulation contains reclaimed material. The EPA defines refrigerant reclamation as a means to reprocess refrigerant to at least the purity specified in Appendix A of 40 C.F.R. § 82, subpart F (based on AHRI Standard 700-1993, Specifications for Fluorocarbon and Other Refrigerants) and to verify this purity using the analytical methodology prescribed in appendix A. The EPA requires that refrigerant be reclaimed when a certified technician recovers refrigerant and puts it in a special DOT container and has no intention of putting it back in the same system from which it was recovered.

In the disclosure, the refrigerant must be reclaimed to the AHRI Standard 700 of purity by a certified reclaimer. This requirement protects the purity of used refrigerant to prevent damage to air-conditioning and refrigeration equipment from the use of contaminated refrigerant. Equipment damage from contaminated refrigerant would result in costs to equipment owners, in releases of refrigerant from damaged equipment through increased leakage, servicing and replacement, and in reduction in consumer confidence in the quality of used refrigerant. Once the reclaimed refrigerant is brought up to standard, it can be used at least partially or wholly in the formulations of the disclosure.

Formulation with reclaimed material results in a dramatic reduction in GWP, because the reclaimed material is not being released into the atmosphere to harm the ozone layer. Compounding with up to 30% of reclaimed material results in a real GWP of 750 or less. Table 18 shows the effect on GWP for Examples 1 and 8 when formulated using reclaimed material. Boiling point values were generated using the REFPROP program.

TABLE 18

The Effect of Using Reclaimed Material on GWP.

| Product | Ex. 1 | Ex. 8 | Ex. 9* | Ex. 10** |
|---|---|---|---|---|
| R-134A | 15.0% | 15.0% | 15.0% | 15.0% |
| R-125 | 15.0% | 15.0% | 15.0% | 15.0% |
| R-32 | 26.0% | 26.0% | 26.0% | 26.0% |
| R-227ea | 4.0% | 4.0% | 4.0% | 4.0% |
| R-152a | 3.0% | 0.0% | 3.0% | 3.0% |
| DME | 0.0% | 3.0% | 0.0% | 0.0% |
| $CO_2$ | 7.0% | 7.0% | 7.0% | 7.0% |
| R-1234ze | 30.0% | 30.0% | 30.0% | 30.0% |
| Total | 100.0% | 100.0% | 100.0% | 100.0% |
| Pressure at 70° F. | 180.8 | 180.7 | 180.8 | 180.8 |
| GWP | 1048 | 1044 | 630 | 487 |
| Theo. BP (° F.) | −73.07 | −72.44 | −73.07 | −73.07 |

*Ex. 1 using 10% reclaim content of R-410A
**Ex. 1 using 10% reclaim content of R-407C (R-407C is a blend of 23 wt % R-32, 25 wt % R-125 and 52 wt % R-134a).

When using 10% reclaim content of R-410A per the proposed California language, the calculated GWP falls from 1047 to 630. When using 10% reclaim content of R-407C, the calculated GWP falls to 487.39. Accordingly, using even moderate amounts of reclaimed material has the unexpected result of reducing the GWP to a 750-400 range.

Another issue for refrigerants is flammability. The most well established classification for this is the ASHRAE classification. Refrigerants such as R-410A, R-407A and R-404A are class 1 in their flammability, so do not show flame propagation when tested at 100° C. and 101.3 kPa in air. Class 2 refrigerants are those with flammability lower than 0.10 kg/m³ at 100° C. and 101.3 kPa and a heat of combustion of less than 19 kJ/kg. Class 3 refrigerants have flammability over this boundary and this includes many hydrocarbons.

Of the compounds used in the refrigerant formulations of the disclosure, R-227ea is a well-known fire suppressant and is governed by NFPA 2001-Standard for Clean Agent Fire Extinguishing Systems. Effective fire suppression requires introducing a concentration of the R-227ea agent between 6.25% and 9% depending on the hazard being suppressed. R-227ea has a molar mass of 170.03 g/mol, a density of 1.46 g/cm³ at 3.2° F. (−16° C.) and a boiling point of −2.5° F. (−16.4° C.).

Carbon dioxide ($CO_2$) is another component of the formulations of the disclosure. $CO_2$ is a well-known fire suppressant and is used in commercial fire extinguishers on Class B liquid fires and Class C electrical fires. The combination of R-227ea and $CO_2$ in the formulations of the disclosure act synergistically to enhance low flammability properties of the formulations.

$CO_2$ (R-744) itself acts as a refrigerant. It has a GWP of 1, a critical point of 1.067 psia at 88.0° F. and triple point of 75.1 psia at −69.9° F. $CO_2$ can act as a critical fluid. The phase diagram for $CO_2$ can be found in FIG. 12. The major challenges in $CO_2$ refrigeration involve the relatively high working pressures. The supercritical portion of the transcritical cycle takes place above 1,067 psia, chiefly in cascade systems for industrial and process applications. Recently, strong interest has been shown in $CO_2$ as a refrigerant by vending machine manufacturers. There are also possibilities for other light commercial refrigeration applications, as well as for residential air conditioning. The disclosure has unexpectedly found that $CO_2$ can be blended with other refrigerants to yield refrigeration power with low GWP without the need to modify refrigeration or air conditioning equipment. The refrigerants of the disclosure can thus be used as a drop-in on any equipment that uses R-410A. The refrigerants of the disclosure can also be used as the basis, with modifications, as a drop-in on equipment that used R-22, R-407C, etc.

Good performance is seen for the formulation of Example 1, which has enhanced non-flammability due to the combination of R-227ea and $CO_2$. For a more detailed analysis, the formulation for Example 1 compared to R-410A is in Table 19. The boiling point values were generated using REFPROP.

TABLE 19

Composition of Example 1 compared to R-410A.

| Chemical Name | Product | 410A | Ex. 1 |
|---|---|---|---|
| 1,1,1,2-tetrafluoroethane | R-134a | 0.00% | 15.00% |
| pentafluoroethane | R-125 | 50.00% | 15.00% |
| difluoromethane | R-32 | 50.00% | 26.00% |
| 1,1,1,2,3,3,3-heptafluoropropane | R-227ea | 0.00% | 4.00% |
| 1,1-difluoroethane | R-152a | 0.00% | 3.00% |
| $CO_2$ | $CO_2$ | 0.00% | 7.00% |
| 1,3,3,3-tetrafluoropropene | R-1234ze | 0.00% | 30.00% |
| Total | | 100.00% | 100.00% |
| Pressure at 70° F. (psia) | | 200.3 | 180.8 |

TABLE 19-continued

Composition of Example 1 compared to R-410A.

| Chemical Name | Product | 410A | Ex. 1 |
|---|---|---|---|
| | GWP | 2088 | 1048 |
| | Theo BP (° F.) | −60.60 | −73.07 |

The properties of Example 1 compared to R-410A are in Table 20.

TABLE 20

Properties of Example 1 compared to R-410A at 70° F.

| Material | Liquid Phase Pressure (psia) | Vapor Phase Pressure (psia) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|---|---|
| Ex. 1 | 221.7 | 139.1 | 0.2323 | 0.4283 | $6.177 \times 10^{-4}$ | $9.988 \times 10^{-4}$ |
| R-410A | 216.5 | 215.8 | 0.2334 | 0.4259 | $6.197 \times 10^{-4}$ | $9.832 \times 10^{-4}$ |

Figure 7:
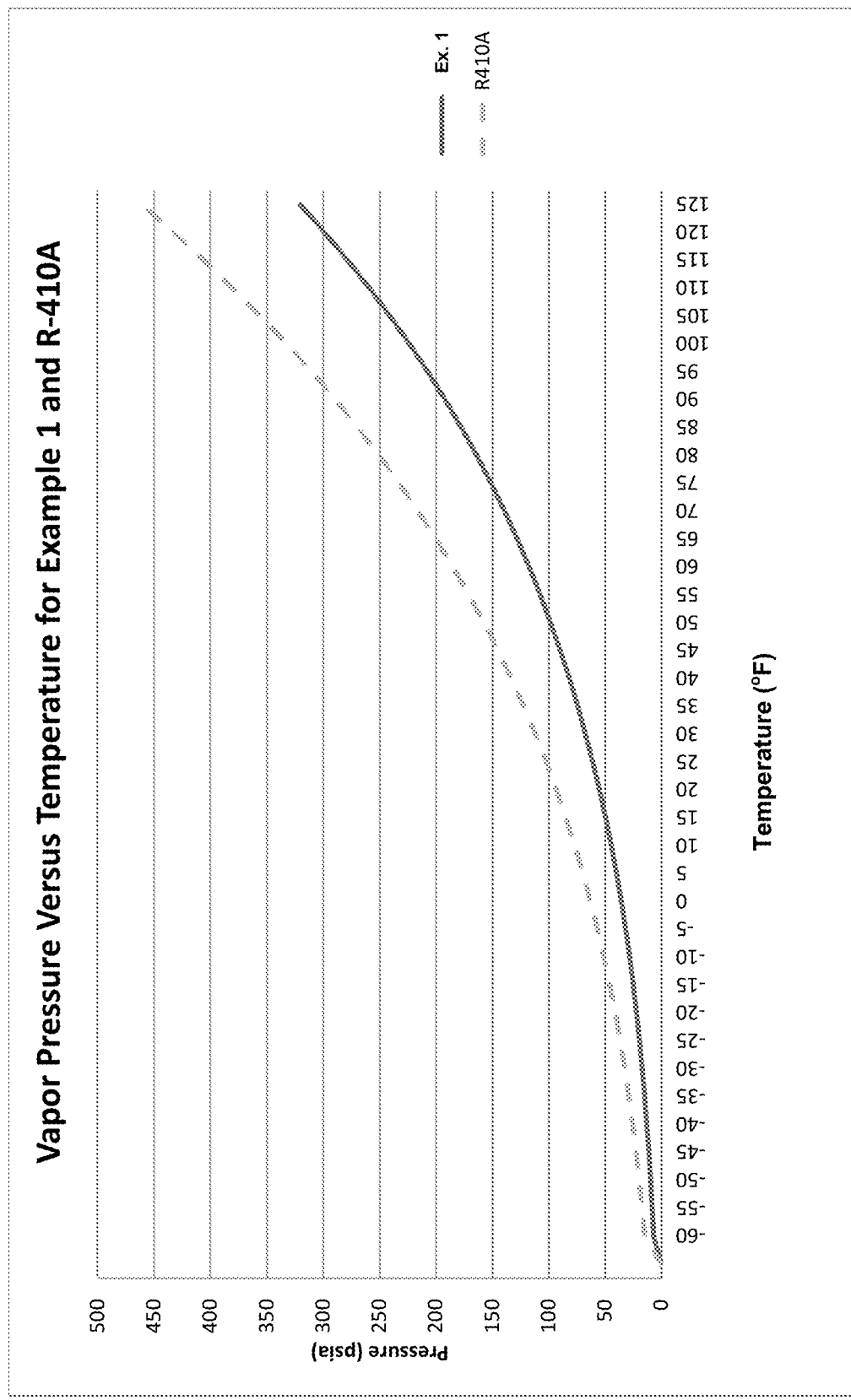
FIG. 7 depicts vapor pressure versus temperature for Example 1 compared to R-410A.

The vapor pressure versus temperature graph for Example 1 and R-410A is shown in FIG. 7. As can be seen, the vapor pressure of Example 1 approaches that of R-410A at the lower temperatures where R-410A is usually utilized.

Figure 8:
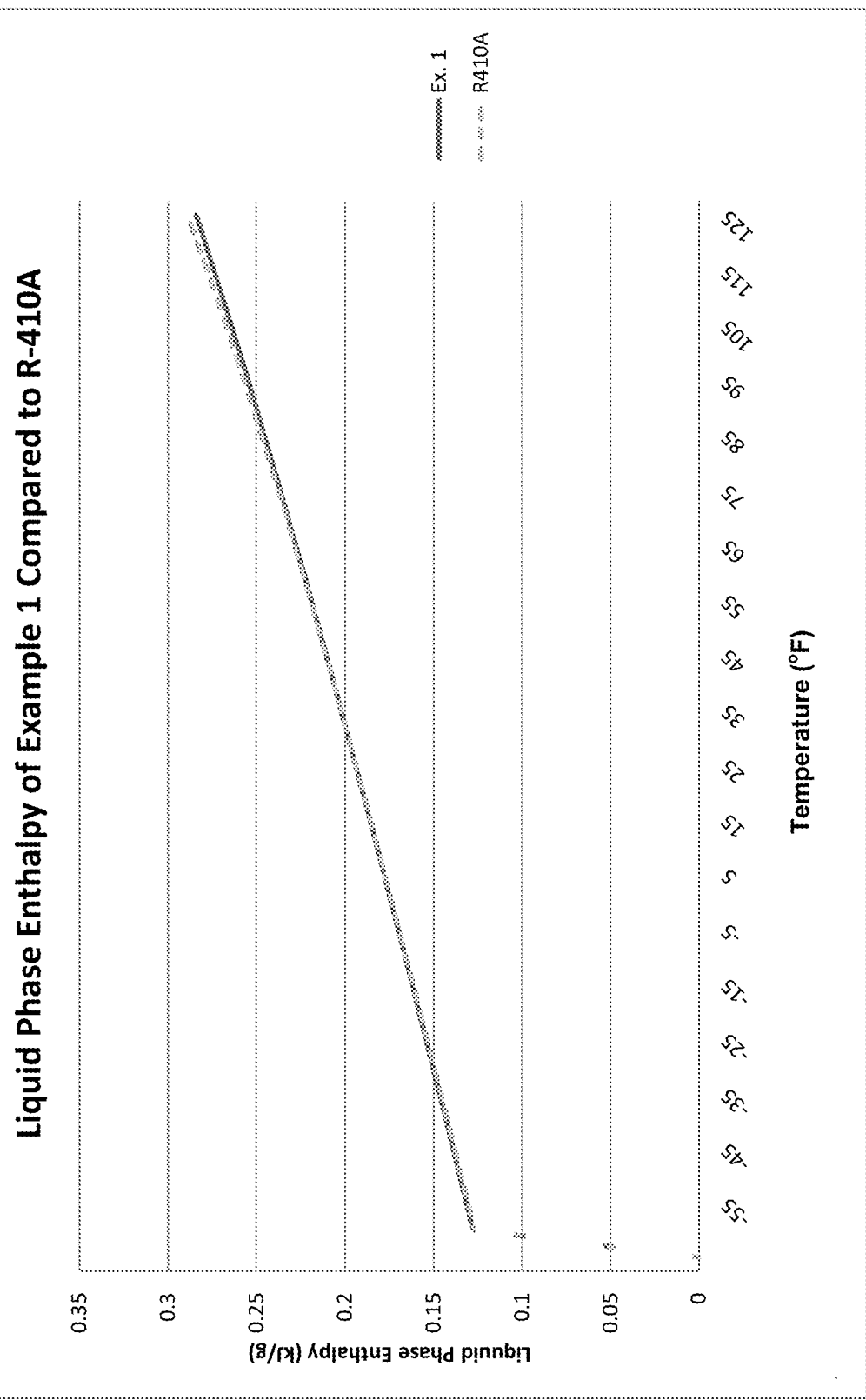
FIG. 8 depicts the liquid enthalpy curve of Example 1 compared to R-410A

The liquid enthalpy of Example 1 compared to R-410A is shown in FIG. 8. As can be seen, there is a close correspondence between the formulation of Example 1 and R-410A.

The vapor enthalpy of Example 1 compared to R-410A is shown in FIG. 9. As can be seen, there is a close correspondence between the formulation of Example 1 and R-410A.

The entropy values of Example 1 compared to R-410A also have close correspondence.

Lubricants

Optionally, lubricants can be added to the formulations of the disclosure. The lubricants can be mineral oil, alkylbenzene oil or polyol ester (POE).

In another embodiment, the POE can be a synthetic POE compatible for use in refrigeration and air-conditioning compressors using HFC refrigerants, as well as for OEM retrofitting operations. The POE forms a single clear phase, i.e., is miscible with the formulations of the disclosure. Miscibility lowers the viscosity of the lubricant carried through the system, so that the lubricant can more efficiently return to the compressor. In contrast, existing mineral oil lubricants are not miscible with HFCs. The composition of the present disclosure is compatible with all types of compressors, including reciprocating and rotary in residential air conditioning, and centrifugal, reciprocating and scroll in industrial and commercial refrigeration and air conditioning.

The POE of the present disclosure can be obtained by introducing neopentyl polyol material, aliphatic monocarboxylic acid material and a catalytic quantity of acid catalyst material into a reaction zone, whereby a reaction mixture is formed, the neopentyl polyol material being at least one neopentyl polyol represented by the structural formula:

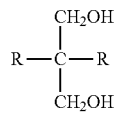

in which each R is independently selected from CH$_3$, C$_2$H$_5$ and CH$_2$OH. The aliphatic monocarboxylic acid material is at least one aliphatic hydrocarbon monocarboxylic acid, and the acid catalyst material is at least one acid esterification catalyst, wherein the initial concentration of the aliphatic monocarboxylic acid material in the reaction mixture is such as to provide an initial mole ratio of carboxyl groups to hydroxyl groups in the reaction mixture of from about 0.25:1 to about 0.5:1, and, while the reaction mixture is established and maintained at 170-200° C., aliphatic monocarboxylic acid vapor and water vapor are withdrawn from the reaction zone.

Another approach would be to produce a poly(neopentyl polyol) ester composition by (I) reacting a neopentyl polyol having the formula:

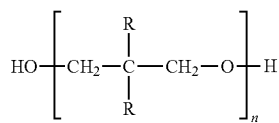

wherein each R is independently selected from the group consisting of CH$_3$, C$_2$H$_5$ and CH$_2$OH and n is a number from 1 to 4, with at least one monocarboxylic acid having 2 to 15 carbon atoms in the presence of an acid catalyst and at an initial mole ratio of carboxyl groups to hydroxyl groups of greater than 0.5:1 to 0.95:1 to form a partially esterified poly(neopentyl polyol) composition; and (ii) reacting the partially esterified poly(neopentyl polyol) composition produced in (i) with additional monocarboxylic acid having 2 to 15 Carbon atoms to form a final poly(neopentyl polyol) ester composition.

The properties of the POE of the present disclosure can be in the viscosity range of about 20 to 45 cSt at 40° C. (104° F.) and 3 to 7 cSt at 100° C. (212° F.). The viscosity index should be in the range of about 100 to 130. The pour point should be in the range of about −40 to −50° C. (−40 to −58° F.). The density at 20° C. (68° F.) should be in the range of about 0.97 to 0.98 g/ml. The flash point should be in the range of about 240 to 270° C. (464 to 518° F.). The acid value should be less than about 0.05 mg KOH/g.

The disclosure is not restricted to POE lubricant. Other lubricants can include mineral or hydrocarbon oil, alkylbenzene oil, white or paraffinic oil and mixtures thereof. The amount of lubricating oil is an amount effective to provide acceptable lubrication to the compressor parts for its longevity. An effective amount of these conventional lubricating oils is the amount recommended by the equipment manufacturer. Typically, the conventional lubricating oil is present in an amount from about 1 to about 60 wt %. The present disclosure has unexpectedly found the amount of POE to be less than about 1 wt %, as little as about 0.67 wt %, with even 0.4 wt % giving excellent lubrication. The range in which POE can be present can be from about 0.1 to about 5 wt %

Additives

The compositions of the disclosure may also contain one or more additives such as oxidation resistance and thermal stability enhancers, corrosion inhibitors, metal deactivators, lubricity additives, viscosity index enhancers, pour and/or floc point depressants, detergents, dispersants, antifoaming agents, anti-wear agents, and extreme pressure resistant additives. Many additives are multifunctional. For example, certain additives may impart both anti-wear and extreme pressure resistance properties, or function both as a metal deactivator and a corrosion inhibitor. Cumulatively, all additives preferably do not exceed about 8 wt %, or more preferably do not exceed about 5 wt %, of the total composition.

An effective amount of the foregoing additive types is generally in the range from about 0.01 to 5 wt % for the antioxidant component, about 0.01 to 5 wt % for the corrosion inhibitor component, from about 0.001 to 0.5 wt % for the metal deactivator component, from about 0.5 to 5 wt % for the lubricity additives, from about 0.01 to 2 wt % for each of the viscosity index enhancers and pour and/or floc point depressants, from about 0.1 to 5 wt % for each of the detergents and dispersants, from about 0.001 to 0.1 wt % for antifoam agents, and from about 0.1-2 wt % for each of the anti-wear and extreme pressure resistance components. All these percentages are by weight and are based on the total composition. It is to be understood that more or less than the stated amounts of additives may be more suitable to particular circumstances, and that a single molecular type or a mixture of types may be used for each type of additive component. Also, the examples listed below are intended to be merely illustrative and not limiting.

Examples of oxidation resistance and thermal stability enhancers suitable for use in the present disclosure include, for example: diphenyl-, dinaphthyl-, and phenylnaphthyl-amines, in which the phenyl and naphthyl groups can be substituted, e.g., N,N'-diphenyl phenylenediamine, p-octyl-diphenylamine, p,p-dioctyldiphenylamine, N-phenyl-1-naphthyl amine, N-phenyl-2-naphthyl amine, N-(p-dodecyl) phenyl-2-naphthyl amine, di-1-naphthylamine, and di-2-naphthylamine; phenothiazines such as N-alkyl-phenothiazines; imino(bisbenzyl); hindered phenols such as 6-(t-butyl) phenol, 2,6-di-(t-butyl) phenol, 4-methyl-2,6-di-(t-butyl) phenol, 4,4'-methylenebis(2,6-di-{t-butyl} phenol); combinations of two or more thereof, and the like.

Examples of cuprous metal deactivators suitable for use in the present disclosure include, for example: imidazole, benzamidazole, 2-mercaptobenzthiazole, 2,5-dimercaptothiadi-azole, salicylidine-propylenediamine, pyrazole, benzotriazole, tolutriazole, 2-methylbenzamidazole, 3,5-dimethyl pyrazole, and methylene bis-benzotriazole. Benzotriazole derivatives are preferred. Other examples of more general metal deactivators and/or corrosion inhibitors include organic acids and their esters, metal salts, and anhydrides, e.g., N-oleyl-sarcosine, sorbitan mono-oleate, lead naphthenate, dodecenyl-succinic acid and its partial esters and amides, and 4-nonylphenoxy acetic acid; primary, secondary, and tertiary aliphatic and cycloaliphatic amines and amine salts of organic and inorganic acids, e.g., oil-soluble alkylammonium carboxylates; heterocyclic nitrogen containing compounds, e.g., thiadiazoles, substituted imidazo-lines, and oxazolines; quinolines, quinones, and anthraquinones; propyl gallate; barium dinonyl naphthalene sulfonate; ester and amide derivatives of alkenyl succinic anhydrides or acids, dithiocarbamates, dithiophosphates; amine salts of alkyl acid phosphates and their derivatives.

Examples of suitable lubricity additives include long chain derivatives of fatty acids and natural oils, such as esters, amines, amides, imidazolines, and borates.

Examples of suitable viscosity index enhancers include polymethacrylates, copolymers of vinyl pyrrolidone, as well as, methacrylates, polybutenes, and styrene-acrylate copolymers.

Examples of suitable pour point and/or floc point depressants include polymethacrylates such as methacrylate-ethylene-vinyl acetate terpolymers; alkylated naphthalene derivatives; and products of Friedel-Crafts catalyzed condensation of urea with naphthalene or phenols.

Examples of suitable detergents and/or dispersants include polybutenylsuccinic acid amides; polybutenyl phosphonic acid derivatives; long chain alkyl substituted aromatic sulfonic acids and their salts; and metal salts of alkyl sulfides, of alkyl phenols, and of condensation products of alkyl phenols and aldehydes.

Examples of suitable antifoam agents include silicone polymers and acrylates.

Examples of suitable anti-wear and extreme pressure resistance agents include sulfurized fatty acids and fatty acid esters, such as sulfurized octyl tallate; sulfurized terpenes; sulfurized olefins; organopolysulfides; organophosphorus derivatives including amine phosphates, alkyl acid phosphates, dialkyl phosphates, aminedithiophosphates, trialkyl and friaryl phosphorothionates, trialkyl and triaryl phosphines, and dialkylphosphites, e.g., amine salts of phosphoric acid monohexyl ester, amine salts of dinonylnaphthalene sulfonate, triphenyl phosphate, trinaphthyl phosphate, diphenyl cresyl and dicresyl phenyl phosphates, naphthyl diphenyl phosphate, triphenylphosphorothionate; dithiocarbamates, such as an antimony dialkyl dithiocarbamate; chlorinated and/or fluorinated hydrocarbons, and xanthates.

An effective amount of the foregoing additive types is generally in the range from about 0.01 to about 5 wt % for the antioxidant component, about 0.01 to about 5 wt % for the corrosion inhibitor component, from about 0.001 to about 0.5 wt % for the metal deactivator component, from about 0.5 to about 5 wt % for the lubricity additives, from about 0.01 to about 2 wt % for each of the viscosity index enhancers and pour and/or floc point depressants, from about 0.1 to about 5 wt % for each of the detergents and dispersants, from about 0.001 to about 0.1 wt % for antifoam agents, and from about 0.1 to about 2 wt % for each of the anti-wear and extreme pressure resistance components. All these percentages are by weight and are based on the total composition. It is to be understood that more or less than the stated amounts of additives may be more suitable to particular circumstances, and that a single molecular type or a mixture of types may be used for each type of additive component. As used herein, the term "effective amount" means the amount of each component which upon combination with the other component or components, results in the formation of the present compositions.

Many of the aforementioned additives are multifunctional. For example, certain additives may impart both anti-wear and extreme pressure resistance properties, or function both as a metal deactivator and a corrosion inhibitor. Cumulatively, all additives preferably do not exceed about 8% by weight, or more preferably do not exceed about 5% by weight, of the total composition.

Manufacture and Use

The refrigerant composition of the present disclosure can be used as an original OEM refrigerant or for a drop-in replacement for equipment using R-410A. The composition of the present application can also be used, with modifications, as a drop-in for HFC refrigerants such as R-22, R-404A, R-421A, R-421B, R-416A, R-417A, R-422A, R-422C, etc.

FIG. 10 is a block diagram of the manufacture of the refrigerant composition of the disclosure in a single vessel. In step 10, the vessel is charged with refrigerant components R-125, R-134a, R-32, R-227ea, R-152a and R-1234ze. Subsequently, in step 20, the appropriate amount of $CO_2$ is injected into the vessel to attain 100 wt % of the refrigerant composition of the disclosure.

The refrigerant composition of the disclosure can be used as a drop-in replacement for R-410A. As is shown in FIG. 11, step 30 is the selection of a substitute refrigerant formed from R-125, R-134a, R-32, R-227ea, R-152a, $CO_2$ and R-1234ze. Next, in step 40 the refrigerant of the disclosure is supplied under pressure to a cylinder and an R-410A compatible outlet and recharging manifold. Then, in step 50, the substitute refrigerant of the disclosure is added to the R-410A compatible apparatus.

Charging the air conditioner or refrigerator is performed using a charging cylinder designed to meter out a desired amount of a specific refrigerant by weight. Compensation for temperature variations is accomplished by reading the pressure on the gauge of the cylinder and dialing, using a calibrated chart, to the corresponding pressure reading for the refrigerant being used. When charging a refrigeration or air conditioning system with refrigerant, often the pressure in the system reaches a point where it is equal to the pressure in the charging cylinder from which the system is being charged. In order to get more refrigerant into the system to complete the charge, heat must be applied to the cylinder. In an exemplary embodiment, a standard 25 or 30 lb cylinder can be used, which is charged under pressure with the refrigerant composition of the current disclosure. This cylinder is fitted with an outlet compatible with R-410A. The outlet is connected to a recharging manifold of the apparatus to be charged.

Accordingly, the disclosure has shown that a drop-in replacement for R-410A unexpectedly produces a dramatic drop in GWP while not sacrificing performance in air conditioning systems.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A refrigerant composition, comprising:
   about 14-16 wt % pentafluoroethane;
   about 14-16 wt % 1,1,1,2-tetrafluoroethane;
   about 25-27 wt % difluoromethane;
   about 3-5% 1,1,1,2,3,3,3-heptafluoropropane;
   about 2-4 wt % 1,1-difluoroethane;
   about 6-8 wt % $CO_2$; and
   about 29-31 wt % 1,3,3,3-tetrafluoropropene.

2. The refrigerant composition of claim 1, wherein the refrigerant composition comprises:
   about 15 wt % pentafluoroethane;
   about 15 wt % 1,1,1,2-tetrafluoroethane;
   about 26 wt % difluoromethane;
   about 4 wt % 1,1,1,2,3,3,3-heptafluoropropane;
   about 3 wt % 1,1-difluoroethane;
   about 7 wt % $CO_2$; and
   about 30 wt % 1,3,3,3-tetrafluoropropene.

3. The refrigerant composition of claim 1, wherein the refrigerant composition has a liquid phase pressure of about 222 psia at 70° F.

4. The refrigerant composition of claim 1, wherein the refrigerant composition has a vapor phase pressure of about 139 psia at 70° F.

5. The refrigerant composition of claim 1, wherein the refrigerant composition has a liquid phase density of about 1.10 g/cm$^3$ at 70° F.

6. The refrigerant composition of claim 1, wherein the refrigerant composition has a vapor phase density of about 0.037 g/cm$^3$ at 70° F.

7. The refrigerant composition of claim 1, wherein the refrigerant composition has a liquid phase enthalpy of about 0.2323 kJ/g at 70° F.

8. The refrigerant composition of claim 1, wherein the refrigerant composition has a vapor phase enthalpy of about 0.4283 kJ/g at 70° F.

9. The refrigerant composition of claim 1, wherein the refrigerant composition has a liquid phase entropy of about $6.177 \times 10^{-4}$ kJ/gR at 70° F.

10. The refrigerant composition of claim 1, wherein the refrigerant composition has a vapor phase entropy of about $9.988 \times 10^{-4}$ kJ/gR at 70° F.

11. The refrigerant composition of claim 1, wherein the refrigerant composition has a global warming potential of about 1000 to about 1100.

12. The refrigerant composition of claim 1, wherein at least one of the components contains at least partially reclaimed material to yield a global warming potential of about 400-750.

13. The refrigerant composition of claim 1, wherein the refrigerant composition contains about 10 wt % reclaimed R-410A to yield a global warming potential of about 630.

14. A refrigerant composition having low flammability, comprising:
   about 14-16 wt % pentafluoroethane;
   about 14-16 wt % 1,1,1,2-tetrafluoroethane;
   about 25-27 wt % difluoromethane;
   about 3-5% 1,1,1,2,3,3,3-heptafluoropropane;
   about 2-4 wt % 1,1-difluoroethane;
   about 6-8 wt % $CO_2$; and
   about 29-31 wt % 1,3,3,3-tetrafluoropropene,
   wherein the refrigerant composition has a global warming potential of about 1000 to about 1100.

15. The refrigerant composition of claim 14, wherein the refrigerant composition comprises:
   about 15 wt % pentafluoroethane;
   about 15 wt % 1,1,1,2-tetrafluoroethane;

about 26 wt % difluoromethane;
about 4 wt % 1,1,1,2,3,3,3-heptafluoropropane;
about 3 wt % 1,1-difluoroethane;
about 7 wt % $CO_2$; and
about 30 wt % 1,3,3,3-tetrafluoropropene.

16. The refrigerant composition of claim 14, wherein the refrigerant composition has a liquid phase pressure of about 222 psia at 70° F.

17. The refrigerant composition of claim 14, wherein the refrigerant composition has a vapor phase pressure of about 139 psia at 70° F.

18. The refrigerant composition of claim 14, wherein the refrigerant composition has a liquid phase density of about 1.10 $g/cm^3$ at 70° F., and the refrigerant composition has a vapor phase density of about 0.037 $g/cm^3$ at 70° F.

19. The refrigerant composition of claim 14, wherein the refrigerant composition contains about 10 wt % reclaimed R-410A to yield a global warming potential of about 630.

20. A refrigerant composition, comprising:
about 14-16 wt % pentafluoroethane;
about 14-16 wt % 1,1,1,2-tetrafluoroethane;
about 25-27 wt % difluoromethane;
about 3-5% 1,1,1,2,3,3,3-heptafluoropropane;
about 2-4 wt % dimethyl ether;
about 6-8 wt % $CO_2$; and
about 29-31 wt % 1,3,3,3-tetrafluoropropene.

* * * * *